(12) United States Patent
High et al.

(10) Patent No.: US 11,679,969 B2
(45) Date of Patent: Jun. 20, 2023

(54) SHOPPING FACILITY ASSISTANCE SYSTEMS, DEVICES AND METHODS

(71) Applicant: Walmart Apollo, LLC, Bentonville, AR (US)

(72) Inventors: Donald R. High, Noel, MO (US); Michael D. Atchley, Eureka Springs, AR (US); Shuvro Chakrobartty, Frisco, TX (US); Karl Kay, Gentry, AR (US); Brian G. McHale, Chadderton Oldham (GB); Robert C. Taylor, Round Rock, TX (US); John P. Thompson, Bentonville, AR (US); Eric E. Welch, Rogers, AR (US); David C. Winkle, Leesburg, FL (US)

(73) Assignee: Walmart Apollo, LLC, Bentonville, AR (US)

(*) Notice: Subject to any disclaimer, the term of this patent is extended or adjusted under 35 U.S.C. 154(b) by 58 days.

(21) Appl. No.: 17/346,954

(22) Filed: Jun. 14, 2021

(65) Prior Publication Data
US 2021/0300740 A1 Sep. 30, 2021

Related U.S. Application Data

(63) Continuation of application No. 16/361,015, filed on Mar. 21, 2019, now Pat. No. 11,046,562, which is a
(Continued)

(51) Int. Cl.
*B66F 9/06* (2006.01)
*G01C 21/20* (2006.01)
(Continued)

(52) U.S. Cl.
CPC .............. *B66F 9/063* (2013.01); *A47F 3/08* (2013.01); *A47F 10/04* (2013.01); *A47F 13/00* (2013.01);
(Continued)

(58) Field of Classification Search
CPC .. B66F 9/063; A47F 3/08; A47F 10/04; A47F 13/00; A47F 2010/005;
(Continued)

(56) References Cited

U.S. PATENT DOCUMENTS

| 1,001,732 A | 8/1911 | Cummings |
| 1,506,095 A | 8/1924 | Stevenson |

(Continued)

FOREIGN PATENT DOCUMENTS

| CA | 2524037 | 5/2006 |
| CA | 2625885 | 4/2007 |

(Continued)

OTHER PUBLICATIONS

U.S. Appl. No. 15/060,953, filed Mar. 4, 2016, High.
(Continued)

*Primary Examiner* — Russell Frejd
(74) *Attorney, Agent, or Firm* — Fitch, Even, Tabin & Flannery LLP

(57) ABSTRACT

Apparatuses, components and methods are provided herein useful to provide assistance to customers and/or workers in a shopping facility. In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units
(Continued)

through the shopping facility space based at least on inputs from the plurality of user interface units.

20 Claims, 18 Drawing Sheets

Related U.S. Application Data continuation of application No. 15/060,953, filed on Mar. 4, 2016, now Pat. No. 10,280,054.

(60) Provisional application No. 62/129,726, filed on Mar. 6, 2015, provisional application No. 62/129,727, filed on Mar. 6, 2015, provisional application No. 62/138,877, filed on Mar. 26, 2015, provisional application No. 62/138,885, filed on Mar. 26, 2015, provisional application No. 62/152,421, filed on Apr. 24, 2015, provisional application No. 62/152,465, filed on Apr. 24, 2015, provisional application No. 62/152,440, filed on Apr. 24, 2015, provisional application No. 62/152,630, filed on Apr. 24, 2015, provisional application No. 62/152,711, filed on Apr. 24, 2015, provisional application No. 62/152,610, filed on Apr. 24, 2015, provisional application No. 62/152,667, filed on Apr. 24, 2015, provisional application No. 62/157,388, filed on May 5, 2015, provisional application No. 62/165,579, filed on May 22, 2015, provisional application No. 62/165,416, filed on May 22, 2015, provisional application No. 62/165,586, filed on May 22, 2015, provisional application No. 62/171,822, filed on Jun. 5, 2015, provisional application No. 62/175,182, filed on Jun. 12, 2015, provisional application No. 62/182,339, filed on Jun. 19, 2015, provisional application No. 62/185,478, filed on Jun. 26, 2015, provisional application No. 62/194,131, filed on Jul. 17, 2015, provisional application No. 62/194,119, filed on Jul. 17, 2015, provisional application No. 62/194,121, filed on Jul. 17, 2015, provisional application No. 62/194,127, filed on Jul. 17, 2015, provisional application No. 62/202,744, filed on Aug. 7, 2015, provisional application No. 62/202,747, filed on Aug. 7, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/205,539, filed on Aug. 14, 2015, provisional application No. 62/207,858, filed on Aug. 20, 2015, provisional application No. 62/214,826, filed on Sep. 4, 2015, provisional application No. 62/214,824, filed on Sep. 4, 2015, provisional application No. 62/292,084, filed on Feb. 5, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/303,021, filed on Mar. 3, 2016.

(51) Int. Cl.

| | |
|---|---|
| *G06Q 50/30* | (2012.01) |
| *G06Q 30/0601* | (2023.01) |
| *G06Q 10/087* | (2023.01) |
| *G06Q 10/02* | (2012.01) |
| *E01H 5/12* | (2006.01) |
| *G01S 1/72* | (2006.01) |
| *G06Q 10/1093* | (2023.01) |
| *G05D 1/02* | (2020.01) |
| *G06Q 10/0631* | (2023.01) |
| *E01H 5/06* | (2006.01) |
| *G06Q 10/083* | (2023.01) |
| *G06Q 50/28* | (2012.01) |
| *B62B 5/00* | (2006.01) |
| *G06Q 30/02* | (2023.01) |
| *G01S 1/02* | (2010.01) |
| *H04N 5/77* | (2006.01) |
| *G06Q 10/30* | (2023.01) |
| *H04N 7/18* | (2006.01) |
| *G06Q 30/016* | (2023.01) |
| *H04W 4/80* | (2018.01) |
| *G01S 1/70* | (2006.01) |
| *H02J 7/00* | (2006.01) |
| *G10L 13/00* | (2006.01) |
| *G06V 20/20* | (2022.01) |
| *G06V 20/40* | (2022.01) |
| *G06V 20/52* | (2022.01) |
| *G06V 20/56* | (2022.01) |
| *G06V 20/58* | (2022.01) |
| *G06V 20/64* | (2022.01) |
| *G06V 30/224* | (2022.01) |
| *G06F 18/214* | (2023.01) |
| *G06T 7/73* | (2017.01) |
| *G06T 7/593* | (2017.01) |
| *H04W 4/33* | (2018.01) |
| *H04W 4/30* | (2018.01) |
| *H04W 4/40* | (2018.01) |
| *H04N 13/282* | (2018.01) |
| *B60L 53/36* | (2019.01) |
| *B60L 53/63* | (2019.01) |
| *A47F 3/08* | (2006.01) |
| *A47F 10/04* | (2006.01) |
| *A47F 13/00* | (2006.01) |
| *A47L 11/40* | (2006.01) |
| *B07C 5/28* | (2006.01) |
| *B07C 5/342* | (2006.01) |
| *B60P 3/06* | (2006.01) |
| *B65F 3/00* | (2006.01) |
| *G05B 19/048* | (2006.01) |
| *G05D 1/00* | (2006.01) |
| *G05D 1/04* | (2006.01) |
| *G06F 3/01* | (2006.01) |
| *G08G 1/00* | (2006.01) |
| *G10L 15/22* | (2006.01) |
| *G10L 17/22* | (2013.01) |
| *H04B 10/116* | (2013.01) |
| *H04L 67/12* | (2022.01) |
| *H04L 67/141* | (2022.01) |
| *H04L 67/143* | (2022.01) |
| *H04W 4/02* | (2018.01) |
| *H04W 4/021* | (2018.01) |
| *H04W 4/029* | (2018.01) |
| *G01S 5/16* | (2006.01) |
| *G01S 5/18* | (2006.01) |
| *B62B 3/14* | (2006.01) |
| *G06F 16/903* | (2019.01) |
| *A47F 10/00* | (2006.01) |
| *A47F 10/02* | (2006.01) |
| *G05B 19/12* | (2006.01) |
| *G06F 21/60* | (2013.01) |
| *G06K 7/10* | (2006.01) |

| | |
|---|---|
| G06K 7/14 | (2006.01) |
| G06Q 20/12 | (2012.01) |
| H04B 1/38 | (2015.01) |
| H04L 9/40 | (2022.01) |

(52) U.S. Cl.
CPC .............. *A47L 11/4011* (2013.01); *B07C 5/28* (2013.01); *B07C 5/3422* (2013.01); *B60L 53/36* (2019.02); *B60L 53/63* (2019.02); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206* (2013.01); *G01S 1/02* (2013.01); *G01S 1/70* (2013.01); *G01S 1/7034* (2019.08); *G01S 1/72* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/028* (2013.01); *G05D 1/0214* (2013.01); *G05D 1/0219* (2013.01); *G05D 1/0234* (2013.01); *G05D 1/0246* (2013.01); *G05D 1/0255* (2013.01); *G05D 1/0276* (2013.01); *G05D 1/0289* (2013.01); *G05D 1/0291* (2013.01); *G05D 1/0293* (2013.01); *G05D 1/0297* (2013.01); *G05D 1/04* (2013.01); *G06F 3/017* (2013.01); *G06F 18/214* (2023.01); *G06Q 10/02* (2013.01); *G06Q 10/0631* (2013.01); *G06Q 10/06311* (2013.01); *G06Q 10/083* (2013.01); *G06Q 10/087* (2013.01); *G06Q 10/1095* (2013.01); *G06Q 10/30* (2013.01); *G06Q 30/016* (2013.01); *G06Q 30/0281* (2013.01); *G06Q 30/0601* (2013.01); *G06Q 30/0605* (2013.01); *G06Q 30/0613* (2013.01); *G06Q 30/0617* (2013.01); *G06Q 30/0619* (2013.01); *G06Q 30/0631* (2013.01); *G06Q 30/0633* (2013.01); *G06Q 30/0635* (2013.01); *G06Q 30/0639* (2013.01); *G06Q 30/0641* (2013.01); *G06Q 50/28* (2013.01); *G06Q 50/30* (2013.01); *G06T 7/593* (2017.01); *G06T 7/74* (2017.01); *G06V 20/20* (2022.01); *G06V 20/40* (2022.01); *G06V 20/52* (2022.01); *G06V 20/56* (2022.01); *G06V 20/58* (2022.01); *G06V 20/647* (2022.01); *G06V 30/224* (2022.01); *G08G 1/20* (2013.01); *G10L 13/00* (2013.01); *G10L 15/22* (2013.01); *G10L 17/22* (2013.01); *H02J 7/0013* (2013.01); *H04B 10/116* (2013.01); *H04L 67/12* (2013.01); *H04L 67/141* (2013.01); *H04L 67/143* (2013.01); *H04N 5/77* (2013.01); *H04N 7/18* (2013.01); *H04N 7/183* (2013.01); *H04N 7/185* (2013.01); *H04N 13/282* (2018.05); *H04W 4/02* (2013.01); *H04W 4/30* (2018.02); *H04W 4/33* (2018.02); *H04W 4/40* (2018.02); *H04W 4/80* (2018.02); *A47F 2010/005* (2013.01); *A47F 2010/025* (2013.01); *A47L 2201/04* (2013.01); *B07C 2501/0045* (2013.01); *B07C 2501/0054* (2013.01); *B07C 2501/0063* (2013.01); *B60Y 2410/10* (2013.01); *B62B 3/1404* (2013.01); *B62B 5/005* (2013.01); *B65F 2210/168* (2013.01); *G01S 5/16* (2013.01); *G01S 5/18* (2013.01); *G01S 2201/01* (2019.08); *G05B 19/124* (2013.01); *G05B 2219/23363* (2013.01); *G05B 2219/39107* (2013.01); *G05D 2201/0203* (2013.01); *G05D 2201/0216* (2013.01); *G06F 16/90335* (2019.01); *G06F 21/606* (2013.01); *G06K 7/10297* (2013.01); *G06K 7/10821* (2013.01); *G06K 7/1413* (2013.01); *G06Q 10/06315* (2013.01); *G06Q 20/12* (2013.01); *G06T 2207/10028* (2013.01); *G06V 20/44* (2022.01); *G10L 2015/223* (2013.01); *H02J 7/00034* (2020.01); *H04B 1/38* (2013.01); *H04L 63/06* (2013.01); *H04L 63/08* (2013.01); *H04L 63/0846* (2013.01); *H04W 4/021* (2013.01); *H04W 4/029* (2018.02); *Y02W 30/82* (2015.05); *Y02W 90/00* (2015.05); *Y04S 10/50* (2013.01); *Y10S 901/01* (2013.01)

(58) Field of Classification Search
CPC .............. A47F 2010/025; A47L 11/4011; A47L 2201/04; B07C 5/28; B07C 5/3422; B07C 2501/0045; B07C 2501/0054; B07C 2501/0063; B60L 53/36; B60L 53/63; B60P 3/06; B62B 5/0026; B62B 5/0069; B62B 5/0076; B62B 3/1404; B62B 5/005; B65F 3/00; B65F 2210/168; E01H 5/061; E01H 5/12; G01C 21/206; G01S 1/70; G01S 1/7034; G01S 1/72; G01S 5/16; G01S 5/18; G01S 2201/01; G05B 19/048; G05B 19/124; G05B 2219/23363; G05B 2219/39107; G05D 1/0011; G05D 1/0016; G05D 1/0022; G05D 1/0027; G05D 1/0061; G05D 1/0088; G05D 1/021; G05D 1/0214; G05D 1/0219; G05D 1/0234; G05D 1/0246; G05D 1/0255; G05D 1/0276; G05D 1/028; G05D 1/0289; G05D 1/0291; G05D 1/0293; G05D 1/0297; G05D 1/04; G05D 2201/0203; G05D 2201/0216; G06F 3/017; G06F 16/90335; G06F 21/606; G06K 9/6256; G06K 7/10297; G06K 7/10821; G06K 7/1413; G06Q 10/02; G06Q 10/0631; G06Q 10/06311; G06Q 10/083; G06Q 10/087; G06Q 10/1095; G06Q 10/30; G06Q 30/016; G06Q 30/0281; G06Q 30/0601; G06Q 30/0605; G06Q 30/0613; G06Q 30/0617; G06Q 30/0619; G06Q 30/0631; G06Q 30/0633; G06Q 30/0635; G06Q 30/0639; G06Q 30/0641; G06Q 50/28; G06Q 50/30; G06Q 10/06315; G06Q 20/12; G06T 7/593; G06T 7/74; G06T 2207/10028; G06V 10/10; G06V 10/242; G06V 20/00; G06V 20/20; G06V 20/40; G06V 20/44; G06V 20/52; G06V 20/56; G06V 20/58; G06V 20/647; G06V 30/224; G08G 1/20; G10L 13/00; G10L 15/22; G10L 17/22; G10L 2015/223; H02J 7/0013; H02J 7/00034; H04B 10/116; H04B 1/38; H04L 67/12; H04L 67/141; H04L 67/143; H04L 63/06; H04L 63/08; H04L 63/0846; H04N 5/77; H04N 7/18; H04N 7/185; H04N 13/282; H04W 4/02; H04W 4/21; H04W 4/29; H04W 4/30; H04W 4/33; H04W 4/40; H04W 4/80; B60Y 2410/10; Y02W 30/82; Y02W 90/00; Y04S 10/50; Y04S 901/01; Y02T 10/7072; Y02T 10/70; Y02T 90/12

See application file for complete search history.

(56) References Cited

U.S. PATENT DOCUMENTS

| | | |
|---|---|---|
| 1,506,102 A | 8/1924 | Wise |
| 1,506,105 A | 8/1924 | Zerbe |
| 1,506,120 A | 8/1924 | Hardinge |
| 1,506,126 A | 8/1924 | Kuenz |
| 1,506,128 A | 8/1924 | Lauterbur |
| 1,506,132 A | 8/1924 | Oishei |
| 1,506,135 A | 8/1924 | Raschick |
| 1,506,140 A | 8/1924 | Smith |
| 1,506,144 A | 8/1924 | Weeks |
| 1,506,147 A | 8/1924 | Abbott |
| 1,506,150 A | 8/1924 | Beaty |
| 1,506,167 A | 8/1924 | Ellwood |
| 1,506,168 A | 8/1924 | Erikstrup |
| 1,506,172 A | 8/1924 | Fredette |
| 1,506,177 A | 8/1924 | Heintz |
| 1,506,179 A | 8/1924 | Howe |
| 1,506,180 A | 8/1924 | Humphreys |
| 1,506,184 A | 8/1924 | Kellner |
| 1,506,190 A | 8/1924 | Marcuse |
| 1,506,198 A | 8/1924 | Nordell |
| 1,527,499 A | 2/1925 | Woods |
| 1,527,500 A | 2/1925 | Woods |
| 1,527,501 A | 2/1925 | Zeh |
| 1,527,504 A | 2/1925 | Backhaus |
| 1,528,295 A | 3/1925 | Greenwood |
| 1,528,892 A | 3/1925 | Pigott |
| 1,542,381 A | 6/1925 | Gabriel |
| 1,544,691 A | 7/1925 | Smith |
| 1,544,717 A | 7/1925 | Behrman |
| 1,544,720 A | 7/1925 | Brandt |
| 1,547,127 A | 7/1925 | Metzger |
| 1,569,222 A | 1/1926 | Dent |
| 1,583,670 A | 5/1926 | Davol |
| 1,774,653 A | 9/1930 | Marriott |
| 2,669,345 A | 2/1954 | Brown |
| 3,765,546 A | 10/1973 | Westerling |
| 3,866,780 A | 2/1975 | Miller |
| 4,071,740 A | 1/1978 | Paul |
| 4,158,416 A | 6/1979 | Sergio |
| 4,588,349 A | 5/1986 | Reuter |
| 4,672,280 A | 6/1987 | Honjo |
| 4,771,840 A | 9/1988 | Keller |
| 4,777,416 A | 10/1988 | Georgeii |
| 4,791,482 A | 12/1988 | Barry |
| 4,868,544 A | 9/1989 | Havens |
| 4,911,608 A | 3/1990 | Krappitz |
| 5,080,541 A | 1/1992 | Andre |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,860,485 A | 1/1999 | Ebbenga |
| 5,917,174 A | 6/1999 | Moore |
| 5,920,261 A | 7/1999 | Hughes |
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,197 B1 | 5/2003 | Frank |
| 6,571,693 B1 | 6/2003 | Kaldenberg |
| 6,584,375 B2 | 6/2003 | Bancroft |
| 6,584,376 B1 | 6/2003 | Vankommer |
| 6,587,835 B1 | 7/2003 | Treyz |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,850,899 B1 | 2/2005 | Chow |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 | 6/2006 | Martins |
| 7,101,113 B2 | 9/2006 | Hughes |
| 7,101,139 B1 | 9/2006 | Benedict |
| 7,117,902 B2 | 10/2006 | Osborne |
| 7,145,562 B2 | 12/2006 | Schechter |
| 7,147,154 B2 | 12/2006 | Myers |
| 7,177,820 B2 | 2/2007 | McIntyre |
| 7,184,586 B2 | 2/2007 | Jeon |
| 7,205,016 B2 | 4/2007 | Garwood |
| 7,206,753 B2 | 4/2007 | Bancroft |
| 7,222,363 B2 | 5/2007 | Rice |
| 7,233,241 B2 | 6/2007 | Overhultz |
| 7,234,609 B2 | 6/2007 | Delazzer |
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,431,208 B2 | 10/2008 | Feldman |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |
| 7,556,219 B2 | 7/2009 | Page |
| 7,587,756 B2 | 9/2009 | Peart |
| 7,613,544 B2 | 11/2009 | Park |
| 7,627,515 B2 | 12/2009 | Borgs |
| 7,636,045 B2 | 12/2009 | Sugiyama |
| 7,648,068 B2 | 1/2010 | Silverbrook |
| 7,653,603 B1 | 1/2010 | Holtkamp, Jr. |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,716,064 B2 | 5/2010 | McIntyre |
| 7,726,563 B2 | 6/2010 | Scott |
| 7,762,458 B2 | 7/2010 | Stawar |

(56) References Cited

U.S. PATENT DOCUMENTS

| | | |
|---|---|---|
| 7,783,527 B2 | 8/2010 | Bonner |
| 7,787,985 B2 | 8/2010 | Tsujimoto |
| 7,817,394 B2 | 10/2010 | Mukherjee |
| 7,826,919 B2 | 11/2010 | Dandrea |
| 7,835,281 B2 | 11/2010 | Lee |
| 7,894,932 B2 | 2/2011 | Mountz |
| 7,894,939 B2 | 2/2011 | Zini |
| 7,957,837 B2 | 6/2011 | Ziegler |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stifter |
| 8,065,353 B2 | 11/2011 | Eckhoff-Hornback |
| 8,069,092 B2 | 11/2011 | Bryant |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,269,456 B2 | 9/2012 | Hui |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |
| 8,380,349 B1 | 2/2013 | Hickman |
| 8,393,846 B1 | 3/2013 | Coots |
| 8,412,400 B2 | 4/2013 | Dandrea |
| 8,423,280 B2 | 4/2013 | Edwards |
| 8,425,153 B1 | 4/2013 | South |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 | 5/2013 | Francis, Jr. |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,572,712 B2 | 10/2013 | Rice |
| 8,577,538 B2 | 11/2013 | Lenser |
| 8,587,662 B1 | 11/2013 | Moll |
| 8,588,969 B2 | 11/2013 | Frazier |
| 8,594,834 B1 | 11/2013 | Clark |
| 8,606,314 B2 | 12/2013 | Barnes, Jr. |
| 8,606,392 B2 | 12/2013 | Wurman |
| 8,639,382 B1 | 1/2014 | Clark |
| 8,645,223 B2 | 2/2014 | Ouimet |
| 8,649,557 B2 | 2/2014 | Hyung |
| 8,656,550 B2 | 2/2014 | Jones |
| 8,670,866 B2 | 3/2014 | Ziegler |
| 8,671,507 B2 | 3/2014 | Jones |
| 8,676,377 B2 | 3/2014 | Siegel |
| 8,676,420 B2 | 3/2014 | Kume |
| 8,676,480 B2 | 3/2014 | Lynch |
| 8,700,230 B1 | 4/2014 | Hannah |
| 8,708,285 B1 | 4/2014 | Carreiro |
| 8,718,814 B1 | 5/2014 | Clark |
| 8,724,282 B2 | 5/2014 | Hiremath |
| 8,732,039 B1 | 5/2014 | Chen |
| 8,744,626 B2 | 6/2014 | Johnson |
| 8,751,042 B2 | 6/2014 | Lee |
| 8,763,199 B2 | 7/2014 | Jones |
| 8,770,976 B2 | 7/2014 | Moser |
| 8,775,064 B2 | 7/2014 | Zeng |
| 8,798,786 B2 | 8/2014 | Wurman |
| 8,798,840 B2 | 8/2014 | Fong |
| 8,814,039 B2 | 8/2014 | Bishop |
| 8,818,556 B2 | 8/2014 | Sanchez |
| 8,820,633 B2 | 9/2014 | Bishop |
| 8,825,226 B1 | 9/2014 | Worley, III |
| 8,831,984 B2 | 9/2014 | Hoffman |
| 8,838,268 B2 | 9/2014 | Friedman |
| 8,843,244 B2 | 9/2014 | Phillips |
| 8,851,369 B2 | 10/2014 | Biship |
| 8,882,432 B2 | 11/2014 | Bastianii |
| 8,886,390 B2 | 11/2014 | Wolfe |
| 8,892,240 B1 | 11/2014 | Vliet |
| 8,892,241 B2 | 11/2014 | Weiss |
| 8,899,903 B1 | 12/2014 | Saad |
| 8,918,202 B2 | 12/2014 | Kawano |
| 8,918,230 B2 | 12/2014 | Chen |
| 8,930,044 B1 | 1/2015 | Peeters |
| 8,965,561 B2 | 2/2015 | Jacobus |
| 8,972,045 B1 | 3/2015 | Mountz |
| 8,972,061 B2 | 3/2015 | Rosenstein |
| 8,983,647 B1 | 3/2015 | Dwarakanath |
| 8,989,053 B1 | 3/2015 | Skaaksrud |
| 9,002,506 B1 | 4/2015 | Agarwal |
| 9,008,827 B1 | 4/2015 | Dwarakanath |
| 9,008,829 B2 | 4/2015 | Worsley |
| 9,014,848 B2 | 4/2015 | Farlow |
| 9,053,506 B2 | 6/2015 | Van Nest |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 9,205,886 B1 | 12/2015 | Hickman |
| 9,278,839 B2 | 3/2016 | Gilbride |
| 9,305,280 B1 | 4/2016 | Berg |
| 9,329,597 B2 | 5/2016 | Stoschek |
| 9,415,869 B1 | 8/2016 | Chan |
| 9,494,936 B2 | 11/2016 | Kerzner |
| 9,495,703 B1 | 11/2016 | Kaye |
| 9,519,882 B2 | 12/2016 | Galluzzo |
| 9,534,906 B2 | 1/2017 | High |
| 9,550,577 B1 | 1/2017 | Beckman |
| 9,573,684 B2 | 2/2017 | Kimchi |
| 9,578,282 B1 | 2/2017 | Sills |
| 9,607,285 B1 | 3/2017 | Wellman |
| 9,623,923 B2 | 4/2017 | Riedel |
| 9,649,766 B2 | 5/2017 | Stubbs |
| 9,656,805 B1 | 5/2017 | Evans |
| 9,658,622 B2 | 5/2017 | Walton |
| 9,659,204 B2 | 5/2017 | Wu |
| 9,663,292 B1 | 5/2017 | Brazeau |
| 9,663,293 B2 | 5/2017 | Wurman |
| 9,663,295 B1 | 5/2017 | Wurman |
| 9,663,296 B1 | 5/2017 | Dingle |
| 9,747,480 B2 | 8/2017 | McAllister |
| 9,757,002 B2 | 9/2017 | Thompson |
| 9,785,911 B2 | 10/2017 | Galluzzo |
| 9,796,093 B2 | 10/2017 | Mascorro Medina |
| 9,801,517 B2 | 10/2017 | High |
| 9,827,678 B1 | 11/2017 | Gilbertson |
| 9,875,502 B2 | 1/2018 | Kay |
| 9,875,503 B2 | 1/2018 | High |
| 9,896,315 B2 | 3/2018 | High |
| 9,908,760 B2 | 3/2018 | High |
| 9,948,917 B2 | 4/2018 | Inacio De Matos |
| 9,994,434 B2 | 6/2018 | High |
| 10,017,322 B2 | 7/2018 | High |
| 10,071,891 B2 | 9/2018 | High |
| 10,071,892 B2 | 9/2018 | High |

(56) References Cited

U.S. PATENT DOCUMENTS

| | | |
|---|---|---|
| 10,071,893 B2 | 9/2018 | High |
| 10,081,525 B2 | 9/2018 | High |
| 10,130,232 B2 | 11/2018 | Atchley |
| 10,138,100 B2 | 11/2018 | Thompson |
| 10,147,069 B2 | 12/2018 | Galluzzo |
| 10,189,691 B2 | 1/2019 | High |
| 10,189,692 B2 | 1/2019 | High |
| 10,214,400 B2 | 2/2019 | High |
| 10,239,738 B2 | 3/2019 | High |
| 10,239,739 B2 | 3/2019 | High |
| 10,239,740 B2 | 3/2019 | McHale |
| 10,280,054 B2 | 5/2019 | High |
| 10,287,149 B2 | 5/2019 | Thompson |
| 10,303,415 B1 | 5/2019 | Ananthanarayanan |
| 10,315,897 B2 | 6/2019 | High |
| 10,336,592 B2 | 7/2019 | Atchley |
| 10,346,794 B2 | 7/2019 | High |
| 10,351,399 B2 | 7/2019 | High |
| 10,351,400 B2 | 7/2019 | High |
| 10,358,326 B2 | 7/2019 | Atchley |
| 10,424,009 B1 | 9/2019 | Paton |
| 10,435,279 B2 | 10/2019 | Taylor |
| 10,466,092 B1 | 11/2019 | Shiee |
| 10,486,951 B2 | 11/2019 | High |
| 10,508,010 B2 | 12/2019 | High |
| 10,570,000 B2 | 2/2020 | High |
| 10,597,270 B2 | 3/2020 | High |
| 10,611,614 B2 | 4/2020 | High |
| 10,633,231 B2 | 4/2020 | High |
| 10,669,140 B2 | 6/2020 | High |
| 10,815,104 B2 | 10/2020 | Thompson |
| 11,034,563 B2 | 6/2021 | High |
| 11,046,562 B2 | 6/2021 | High |
| 2001/0028301 A1 | 10/2001 | Geiger |
| 2001/0042024 A1 | 11/2001 | Rogers |
| 2002/0060542 A1 | 5/2002 | Song |
| 2002/0084323 A1 | 7/2002 | Benyak |
| 2002/0095342 A1 | 7/2002 | Feldman |
| 2002/0154974 A1 | 10/2002 | Fukuda |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0170961 A1 | 11/2002 | Dickson |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0050611 A1 | 3/2004 | Kamen |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0203633 A1 | 10/2004 | Knauerhase |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0086051 A1 | 4/2005 | Brulle-Drews |
| 2005/0104547 A1 | 5/2005 | Wang |
| 2005/0149414 A1 | 7/2005 | Schrodt |
| 2005/0154265 A1 | 7/2005 | Miro |
| 2005/0177446 A1 | 8/2005 | Hoblit |
| 2005/0216126 A1 | 9/2005 | Koselka |
| 2005/0222712 A1 | 10/2005 | Orita |
| 2005/0230472 A1 | 10/2005 | Chang |
| 2005/0238465 A1 | 10/2005 | Razumov |
| 2005/0246248 A1 | 11/2005 | Vesuna |
| 2005/0267826 A1 | 12/2005 | Levy |
| 2006/0107067 A1 | 5/2006 | Safal |
| 2006/0147087 A1 | 7/2006 | Goncalves |
| 2006/0163350 A1 | 7/2006 | Melton |
| 2006/0178777 A1 | 8/2006 | Park |
| 2006/0206235 A1 | 9/2006 | Shakes |
| 2006/0210382 A1 | 9/2006 | Mountz |
| 2006/0220809 A1 | 10/2006 | Stigall |
| 2006/0221072 A1 | 10/2006 | Se |
| 2006/0231301 A1 | 10/2006 | Rose |
| 2006/0235570 A1 | 10/2006 | Jung |
| 2006/0241827 A1 | 10/2006 | Fukuchi |
| 2006/0244588 A1 | 11/2006 | Hannah |
| 2006/0279421 A1 | 12/2006 | French |
| 2006/0293810 A1 | 12/2006 | Nakamoto |
| 2007/0005179 A1 | 1/2007 | McCrackin |
| 2007/0017855 A1 | 1/2007 | Pippin |
| 2007/0017984 A1 | 1/2007 | Mountz |
| 2007/0045018 A1 | 3/2007 | Carter |
| 2007/0061210 A1 | 3/2007 | Chen |
| 2007/0069014 A1 | 3/2007 | Heckel |
| 2007/0072662 A1 | 3/2007 | Templeman |
| 2007/0085682 A1 | 4/2007 | Murofushi |
| 2007/0112461 A1 | 5/2007 | Zini |
| 2007/0125727 A1 | 6/2007 | Winkler |
| 2007/0150368 A1 | 6/2007 | Arora |
| 2007/0152057 A1 | 7/2007 | Cato |
| 2007/0222679 A1 | 9/2007 | Morris |
| 2007/0269177 A1 | 11/2007 | Braiman |
| 2007/0269299 A1 | 11/2007 | Ross |
| 2007/0284442 A1 | 12/2007 | Herskovitz |
| 2007/0288123 A1 | 12/2007 | D'Andrea |
| 2007/0288127 A1 | 12/2007 | Haq |
| 2007/0293978 A1 | 12/2007 | Wurman |
| 2008/0011836 A1 | 1/2008 | Adema |
| 2008/0031491 A1 | 2/2008 | Ma |
| 2008/0041644 A1 | 2/2008 | Tudek |
| 2008/0042836 A1 | 2/2008 | Christoper |
| 2008/0075566 A1 | 3/2008 | Benedict |
| 2008/0075568 A1 | 3/2008 | Benedict |
| 2008/0075569 A1 | 3/2008 | Benedict |
| 2008/0077511 A1 | 3/2008 | Zimmerman |
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0228600 A1 | 9/2008 | Treyz |
| 2008/0243301 A1 | 10/2008 | Lanigan |
| 2008/0267759 A1 | 10/2008 | Morency |
| 2008/0281515 A1 | 11/2008 | Ann |
| 2008/0281664 A1 | 11/2008 | Campbell |
| 2008/0292439 A1 | 11/2008 | Dunkel |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0132250 A1 | 5/2009 | Chiang |
| 2009/0134572 A1 | 5/2009 | Obuchi |
| 2009/0138375 A1 | 5/2009 | Schwartz |
| 2009/0154708 A1 | 6/2009 | Kolar |
| 2009/0155033 A1 | 6/2009 | Olsen |
| 2009/0164902 A1 | 6/2009 | Cohen |
| 2009/0177323 A1 | 7/2009 | Ziegler |
| 2009/0210536 A1 | 8/2009 | Allen |
| 2009/0240571 A1 | 9/2009 | Bonner |
| 2009/0259571 A1 | 10/2009 | Ebling |
| 2009/0265193 A1 | 10/2009 | Collins |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0131103 A1 | 5/2010 | Herzog |

(56) References Cited

U.S. PATENT DOCUMENTS

| | | |
|---|---|---|
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1 | 7/2010 | Schwab |
| 2010/0191582 A1 | 7/2010 | Dicker |
| 2010/0211441 A1 | 8/2010 | Sprigg |
| 2010/0222925 A1 | 9/2010 | Anezaki |
| 2010/0262278 A1 | 10/2010 | Winkler |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0316470 A1 | 12/2010 | Lert |
| 2010/0324773 A1 | 12/2010 | Choi |
| 2011/0010023 A1 | 1/2011 | Kunzig |
| 2011/0022201 A1 | 1/2011 | Reumerman |
| 2011/0055103 A1 | 3/2011 | Swafford, Jr. |
| 2011/0098920 A1 | 4/2011 | Chuang |
| 2011/0153081 A1 | 6/2011 | Romanov |
| 2011/0163160 A1 | 7/2011 | Zini |
| 2011/0176803 A1 | 7/2011 | Song |
| 2011/0225071 A1 | 9/2011 | Sano |
| 2011/0238211 A1 | 9/2011 | Shirado |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288682 A1 | 11/2011 | Pinter |
| 2011/0288684 A1 | 11/2011 | Farlow |
| 2011/0288763 A1 | 11/2011 | Hui |
| 2011/0295424 A1 | 12/2011 | Johnson |
| 2011/0301757 A1 | 12/2011 | Jones |
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1 | 2/2012 | Ota |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0166241 A1 | 6/2012 | Livingston |
| 2012/0185094 A1 | 7/2012 | Rosenstein |
| 2012/0185355 A1 | 7/2012 | Kilroy |
| 2012/0190386 A1 | 7/2012 | Anderson |
| 2012/0192260 A1 | 7/2012 | Kontsevich |
| 2012/0197431 A1 | 8/2012 | Toebes |
| 2012/0203661 A1 | 8/2012 | Baharloo |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0296511 A1 | 11/2012 | More |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0030915 A1 | 1/2013 | Statler |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0076726 A1 | 3/2013 | Ferrara |
| 2013/0080289 A1 | 3/2013 | Roy |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0144595 A1 | 6/2013 | Lord |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0173049 A1 | 7/2013 | Brunner |
| 2013/0174371 A1 | 7/2013 | Jones |
| 2013/0181370 A1 | 7/2013 | Rafie |
| 2013/0211953 A1 | 8/2013 | Abraham |
| 2013/0218453 A1 | 8/2013 | Geelen |
| 2013/0231779 A1 | 9/2013 | Purkayastha |
| 2013/0235206 A1 | 9/2013 | Smith |
| 2013/0238130 A1 | 9/2013 | Dorschel |
| 2013/0245810 A1 | 9/2013 | Sullivan |
| 2013/0254304 A1 | 9/2013 | Van Ness |
| 2013/0276004 A1 | 10/2013 | Boncyk |
| 2013/0300729 A1 | 11/2013 | Grimaud |
| 2013/0302132 A1 | 11/2013 | D'Andrea |
| 2013/0309637 A1 | 11/2013 | Minvielle |
| 2013/0317642 A1 | 11/2013 | Asaria |
| 2013/0333961 A1 | 12/2013 | O'Donnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0133943 A1 | 5/2014 | Razumov |
| 2014/0135984 A1 | 5/2014 | Hirata |
| 2014/0136414 A1 | 5/2014 | Abhyanker |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0177907 A1 | 6/2014 | Argue |
| 2014/0177924 A1 | 6/2014 | Argue |
| 2014/0180478 A1 | 6/2014 | Letsky |
| 2014/0180528 A1 | 6/2014 | Argue |
| 2014/0180865 A1 | 6/2014 | Argue |
| 2014/0180914 A1 | 6/2014 | Abhyanker |
| 2014/0201001 A1 | 7/2014 | Rellas |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0239733 A1 | 8/2014 | Mach |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0258854 A1 | 9/2014 | Li |
| 2014/0266616 A1 | 9/2014 | Jones |
| 2014/0267409 A1 | 9/2014 | Fein |
| 2014/0274309 A1 | 9/2014 | Nguyen |
| 2014/0277693 A1 | 9/2014 | Naylor |

(56) References Cited

U.S. PATENT DOCUMENTS

| | | |
|---|---|---|
| 2014/0277742 A1 | 9/2014 | Wells |
| 2014/0277841 A1 | 9/2014 | Klicpera |
| 2014/0285134 A1 | 9/2014 | Kim |
| 2014/0289009 A1 | 9/2014 | Campbell |
| 2014/0297090 A1 | 10/2014 | Ichinose |
| 2014/0297362 A1 | 10/2014 | Kumar |
| 2014/0304107 A1 | 10/2014 | McAllister |
| 2014/0306654 A1 | 10/2014 | Partovi |
| 2014/0309809 A1 | 10/2014 | Dixon |
| 2014/0319889 A1 | 10/2014 | Giampavolo |
| 2014/0330456 A1 | 11/2014 | Lopez Morales |
| 2014/0330677 A1 | 11/2014 | Boncyk |
| 2014/0344011 A1 | 11/2014 | Dogin |
| 2014/0344118 A1 | 11/2014 | Parpia |
| 2014/0350725 A1 | 11/2014 | Lafary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0006319 A1 | 1/2015 | Thomas |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0070170 A1 | 3/2015 | Margalit |
| 2015/0073589 A1 | 3/2015 | Khodl |
| 2015/0084584 A1 | 3/2015 | Monks |
| 2015/0088310 A1 | 3/2015 | Pinter |
| 2015/0088703 A1 | 3/2015 | Yan |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield, Jr. |
| 2015/0123973 A1 | 5/2015 | Larsen |
| 2015/0134403 A1 | 5/2015 | Schwartz |
| 2015/0142249 A1 | 5/2015 | Ooga |
| 2015/0203140 A1 | 7/2015 | Holtan |
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0228004 A1 | 8/2015 | Bednarek |
| 2015/0229906 A1 | 8/2015 | Inacio De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0278908 A1 | 10/2015 | Nice |
| 2015/0297052 A1 | 10/2015 | Eidmohammadi |
| 2015/0307276 A1 | 10/2015 | Hognaland |
| 2015/0317708 A1 | 11/2015 | Eramian |
| 2015/0325128 A1 | 11/2015 | Lord |
| 2015/0336668 A1 | 11/2015 | Pasko |
| 2015/0360865 A1 | 12/2015 | Massey |
| 2015/0379468 A1 | 12/2015 | Harvey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1 | 4/2016 | Chamberlin |
| 2016/0101940 A1 | 4/2016 | Grinnell |
| 2016/0110701 A1 | 4/2016 | Herring |
| 2016/0114488 A1 | 4/2016 | Mascorro Medina |
| 2016/0132854 A1 | 5/2016 | Singh |
| 2016/0158635 A1 | 6/2016 | Aders |
| 2016/0165988 A1 | 6/2016 | Glasgow |
| 2016/0167557 A1 | 6/2016 | Mecklinger |
| 2016/0167577 A1 | 6/2016 | Simmons |
| 2016/0176638 A1 | 6/2016 | Toebes |
| 2016/0189114 A1 | 6/2016 | Cattone |
| 2016/0189115 A1 | 6/2016 | Cattone |
| 2016/0196755 A1 | 7/2016 | Navot |
| 2016/0207193 A1 | 7/2016 | Wise |
| 2016/0210602 A1 | 7/2016 | Siddique |
| 2016/0224857 A1 | 8/2016 | Zhang |
| 2016/0236867 A1 | 8/2016 | Brazeau |
| 2016/0247182 A1 | 8/2016 | Peterson |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |
| 2016/0288687 A1 | 10/2016 | Scherle |
| 2016/0297610 A1 | 10/2016 | Grosse |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1 | 12/2016 | Lert |
| 2016/0364732 A1 | 12/2016 | Jagatheesan |
| 2016/0364785 A1 | 12/2016 | Wankhede |
| 2016/0364786 A1 | 12/2016 | Wankhede |
| 2016/0375579 A1 | 12/2016 | Muttik |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0079202 A1 | 3/2017 | Balutis |
| 2017/0080846 A1 | 3/2017 | Lord |
| 2017/0101120 A1 | 4/2017 | Hannah |
| 2017/0107055 A1 | 4/2017 | Magens |
| 2017/0110017 A1 | 4/2017 | Kimchi |
| 2017/0120443 A1 | 5/2017 | Kang |
| 2017/0129602 A1 | 5/2017 | Alduaiji |
| 2017/0137235 A1 | 5/2017 | Thompson |
| 2017/0148075 A1 | 5/2017 | High |
| 2017/0158430 A1 | 6/2017 | Raizer |
| 2017/0166399 A1 | 6/2017 | Stubbs |
| 2017/0176986 A1 | 6/2017 | High |
| 2017/0178066 A1 | 6/2017 | High |
| 2017/0178082 A1 | 6/2017 | High |
| 2017/0183159 A1 | 6/2017 | Weiss |
| 2017/0193434 A1 | 7/2017 | Shah |
| 2017/0225321 A1 | 8/2017 | Deyle |
| 2017/0283171 A1 | 10/2017 | High |
| 2017/0300759 A1 | 10/2017 | Beard |
| 2017/0318446 A1 | 11/2017 | Lee |
| 2017/0355081 A1 | 12/2017 | Fisher |
| 2018/0009108 A1 | 1/2018 | Yamamoto |
| 2018/0020896 A1 | 1/2018 | High |
| 2018/0068357 A1 | 3/2018 | High |
| 2018/0075403 A1 | 3/2018 | Mascorro Medina |
| 2018/0099846 A1 | 4/2018 | High |
| 2018/0170729 A1 | 6/2018 | High |
| 2018/0170730 A1 | 6/2018 | High |

(56) References Cited

U.S. PATENT DOCUMENTS

| | | |
|---|---|---|
| 2018/0273292 A1 | 9/2018 | High |
| 2018/0282139 A1 | 10/2018 | High |
| 2018/0346299 A1 | 12/2018 | High |
| 2018/0346300 A1 | 12/2018 | High |
| 2019/0002256 A1 | 1/2019 | High |
| 2019/0082281 A1 | 3/2019 | Beran |
| 2019/0084814 A1 | 3/2019 | Thompson |
| 2019/0112171 A1 | 4/2019 | High |
| 2019/0119083 A1 | 4/2019 | High |
| 2019/0169005 A1 | 6/2019 | High |
| 2019/0185302 A1 | 6/2019 | McHale |
| 2019/0210849 A1 | 7/2019 | High |
| 2019/0218081 A1 | 7/2019 | High |
| 2019/0256334 A1 | 8/2019 | High |
| 2019/0263644 A1 | 8/2019 | Atchley |
| 2019/0284034 A1 | 9/2019 | High |
| 2019/0292030 A1 | 9/2019 | High |
| 2021/0009391 A1 | 1/2021 | Thompson |
| 2021/0146543 A1 | 5/2021 | Cristache |
| 2021/0269293 A1 | 9/2021 | High |
| 2021/0300740 A1 | 9/2021 | High |

FOREIGN PATENT DOCUMENTS

| | | | |
|---|---|---|---|
| CA | 2833670 A | | 10/2012 |
| CN | 100999277 | | 7/2007 |
| CN | 102079433 | | 6/2011 |
| CN | 202847767 | | 4/2013 |
| CN | 103136923 | | 5/2013 |
| CN | 103213115 | | 7/2013 |
| CN | 203166399 | | 8/2013 |
| CN | 203191819 | | 9/2013 |
| CN | 203401274 | | 1/2014 |
| CN | 203402565 | | 1/2014 |
| CN | 103625808 | | 3/2014 |
| CN | 203468521 | | 3/2014 |
| CN | 103696393 | | 4/2014 |
| CN | 103723403 | | 4/2014 |
| CN | 203512491 | | 4/2014 |
| CN | 103770117 A | | 5/2014 |
| CN | 203782622 | | 8/2014 |
| CN | 104102188 | | 10/2014 |
| CN | 104102219 | | 10/2014 |
| CN | 102393739 | | 12/2014 |
| CN | 204054062 | | 12/2014 |
| CN | 204309852 | | 12/2014 |
| CN | 204331404 | | 5/2015 |
| CN | 105460051 | | 4/2016 |
| DE | 102013013438 | | 2/2015 |
| EP | 861415 | | 5/1997 |
| EP | 1136052 | | 9/2001 |
| EP | 0887491 | | 4/2004 |
| EP | 1439039 | | 7/2004 |
| EP | 1447726 | | 8/2004 |
| EP | 2148169 | | 1/2010 |
| EP | 2106886 | | 3/2011 |
| EP | 2309487 | | 4/2011 |
| EP | 2050544 | | 8/2011 |
| EP | 2498158 | | 9/2012 |
| EP | 2571660 | | 3/2013 |
| EP | 2590041 | | 5/2013 |
| EP | 2608163 | | 6/2013 |
| EP | 2662831 | | 11/2013 |
| EP | 2728533 A | | 5/2014 |
| EP | 2730377 | | 5/2014 |
| EP | 2886020 | | 6/2015 |
| FR | 2710330 | | 3/1995 |
| GB | 1382806 | | 2/1971 |
| GB | 2530626 | | 3/2016 |
| GB | 2542472 | | 3/2017 |
| GB | 2542905 | | 5/2017 |
| JP | 62247458 | | 10/1987 |
| JP | H10129996 | | 5/1998 |
| JP | 2003288396 | | 10/2003 |
| JP | 2005350222 | | 12/2005 |
| JP | 2009284944 | | 12/2009 |
| JP | 2010105644 | | 5/2010 |
| JP | 2010231470 | | 10/2010 |
| KR | 20120100505 A | | 9/2012 |
| WO | 8503277 A | | 8/1985 |
| WO | 9603305 | | 7/1995 |
| WO | 1997018523 | | 5/1997 |
| WO | 9855903 | | 12/1998 |
| WO | 0043850 A2 | | 7/2000 |
| WO | 2000061438 | | 10/2000 |
| WO | 0132366 | | 5/2001 |
| WO | 2004092858 | | 10/2004 |
| WO | 2005102875 | | 11/2005 |
| WO | 2006056614 | | 6/2006 |
| WO | 2006120636 | | 11/2006 |
| WO | 2006137072 | | 12/2006 |
| WO | 2007007354 | | 1/2007 |
| WO | 2007047514 | | 4/2007 |
| WO | 2007149196 | | 12/2007 |
| WO | 2008118906 | | 10/2008 |
| WO | 2008144638 | | 11/2008 |
| WO | 2008151345 | | 12/2008 |
| WO | 2009022859 | | 2/2009 |
| WO | 2009027835 | | 3/2009 |
| WO | 2009103008 | | 8/2009 |
| WO | 2011063527 | | 6/2011 |
| WO | 2012075196 | | 6/2012 |
| WO | 2013138193 | | 9/2013 |
| WO | 2013138333 | | 9/2013 |
| WO | 2013176762 | | 11/2013 |
| WO | 2014022366 | | 2/2014 |
| WO | 2014022496 | | 2/2014 |
| WO | 2014045225 | | 3/2014 |
| WO | 2014046757 | | 3/2014 |
| WO | 2014101714 | | 7/2014 |
| WO | 2014116947 | | 7/2014 |
| WO | 2014138472 | | 9/2014 |
| WO | 2014165286 | | 10/2014 |
| WO | 2015021958 | | 2/2015 |
| WO | 2015104263 | | 7/2015 |
| WO | 2015155556 | | 10/2015 |
| WO | 2016009423 | | 1/2016 |
| WO | 2016015000 | | 1/2016 |
| WO | 2016144765 | | 9/2016 |

OTHER PUBLICATIONS

U.S. Appl. No. 15/061,025, filed Mar. 4, 2016, High.
U.S. Appl. No. 15/061,054, Mar. 4, 2016, Kay.
U.S. Appl. No. 15/061,203, filed Mar. 4, 2015, High.
U.S. Appl. No. 15/061,265, filed Mar. 4, 2016, High.
U.S. Appl. No. 15/061,285, filed Mar. 4, 2016, High.
U.S. Appl. No. 15/061,325, filed Mar. 4, 2016, High.
U.S. Appl. No. 15/061,350, filed Mar. 4, 2016, Thompson.
U.S. Appl. No. 15/061,402, filed Mar. 4, 2016, High.
U.S. Appl. No. 15/061,406, filed Mar. 4, 2016, High.
U.S. Appl. No. 15/061,443, filed Mar. 4, 2016, High.
U.S. Appl. No. 15/061,474, filed Mar. 4, 2016, High.
U.S. Appl. No. 15/061,507, filed Mar. 4, 2016, High.
U.S. Appl. No. 15/061,671, filed Mar. 4, 2016, High.
U.S. Appl. No. 15/061,677, filed Mar. 4, 2016, Taylor.
U.S. Appl. No. 15/061,686, filed Mar. 4, 2016, High.
U.S. Appl. No. 15/061,688, filed Mar. 4, 2016, Thompson.
U.S. Appl. No. 15/061,722, filed Mar. 4, 2016, High.
U.S. Appl. No. 15/061,770, filed Mar. 4, 2016, Atchley.
U.S. Appl. No. 15/061,792, filed Mar. 4, 2016, Winkle.
U.S. Appl. No. 15/061,801, filed Mar. 4, 2016, High.
U.S. Appl. No. 15/061,805, filed Mar. 4, 2016, Atchley.
U.S. Appl. No. 15/061,844, filed Mar. 4, 2016, High.
U.S. Appl. No. 15/061,848, filed Mar. 4, 2016, McHale.
U.S. Appl. No. 15/061,908, filed Mar. 4, 2016.
U.S. Appl. No. 15/061,980, filed Mar. 4, 2016, Thompson.
U.S. Appl. No. 15/274,991, filed Jan. 12, 2017, Donald R. High.
U.S. Appl. No. 15/275,009, filed Sep. 23, 2016, High.
U.S. Appl. No. 15/275,019, filed Sep. 23, 2016, High.
U.S. Appl. No. 15/275,047, filed Sep. 23, 2016, High.

(56) References Cited

OTHER PUBLICATIONS

U.S. Appl. No. 15/282,951, filed Sep. 30, 2016, High.
U.S. Appl. No. 15/288,923, filed Oct. 7, 2016, High.
U.S. Appl. No. 15/423,812, filed Feb. 3, 2017, High.
U.S. Appl. No. 15/446,914, filed Mar. 1, 2017, High.
U.S. Appl. No. 15/447,175, filed Mar. 2, 2017, High.
U.S. Appl. No. 15/447,202, filed Mar. 2, 2017, High.
U.S. Appl. No. 15/471,278, filed Mar. 28, 2017, High.
U.S. Appl. No. 15/692,226, filed Aug. 31, 2017, High.
U.S. Appl. No. 15/698,068, filed Sep. 7, 2017, High.
U.S. Appl. No. 15/836,708, filed Dec. 8, 2017, High.
U.S. Appl. No. 15/892,250, filed Feb. 8, 2018, High.
U.S. Appl. No. 15/894,155, filed Feb. 12, 2018, High.
U.S. Appl. No. 15/990,274, filed May 25, 2018, High.
U.S. Appl. No. 16/001,774, filed Jun. 6, 2018, High.
U.S. Appl. No. 16/059,431, filed Aug. 9, 2018, High.
U.S. Appl. No. 16/100,064, filed Aug. 9, 2018, High.
U.S. Appl. No. 16/109,290, filed Aug. 22, 2018, High.
U.S. Appl. No. 16/191,192, filed Nov. 14, 2018, Thompson.
U.S. Appl. No. 16/216,147, filed Dec. 11, 2018, High.
U.S. Appl. No. 16/224,536, filed Dec. 18, 2018, High.
U.S. Appl. No. 16/269,262, filed Feb. 6, 2019, High.
U.S. Appl. No. 16/282,888, filed Feb. 22, 2019, McHale.
U.S. Appl. No. 16/359,828, filed Mar. 20, 2019, Donald R High.
U.S. Appl. No. 16/361,015, filed Mar. 21, 2019, Donald R. High.
U.S. Appl. No. 16/399,854, filed Apr. 30, 2019, Donald R. High.
U.S. Appl. No. 16/408,335, filed May 9, 2019, Michael D. Atchley.
U.S. Appl. No. 16/434,816, filed Jun. 7, 2019, Donald R. High.
U.S. Appl. No. 16/442,134, filed Jun. 14, 2019, Donald R. High.
U.S. Appl. No. 16/845,428, filed Apr. 10, 2020, Donald R High.
U.S. Appl. No. 16/858,403, filed Apr. 24, 2020, Donald R High.
U.S. Appl. No. 17/030,799, filed Sep. 24, 2020, John P Thompson.
U.S. Appl. No. 17/081,657, filed Oct. 27, 2020, Donald R High.
U.S. Appl. No. 17/321,290, filed May 14, 2021, Donald R. High.
U.S. Appl. No. 17/346,954, filed Jun. 14, 2021, Donald R. High.
Abbrobotics; "ABB Robotics—Innovative Packaging Solutions", https://www.youtube.com/watch?v=e5jif-IUvHY, published on May 16, 2013, pp. 1-5.
Ang, Fitzwatler, et al.; "Automated Waste Sorter With Mobile Robot Delivery Waste System", De La Salle University Research Congress 2013, Mar. 7-9, 2013, pp. 1-7.
Ansari, Sameer, et al.; "Automated Trash Collection & Removal in Office Cubicle Environments", Squad Collaborative Robots, Sep. 27, 2013, pp. 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate To An Inch", Popular Science, www.popsci.com/technology/article/2013-08/global-positioning-down-inches, Aug. 16, 2013, pp. 1-2.
Avezbadalov, Ariel, et al.; "Snow Shoveling Robot", engineering.nyu.edu/mechatronics/projects/ME3484/2006/Snow Shoveling Robot/Mechatronics Snow Robot Presentation Update 12-19-06.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, May 9, 2011, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Budgee; "The Robotic Shopping Cart Budgee"; https://www.youtube.com/watch?v=2dYNdVPF4VM; published on Mar. 20, 2015; pp. 1-6.
Burns, Tom; "irobot roomba 780 review best robot vacuum floor cleaning robot review video demo", https://www.youtube.com/watch?v=MkwtlyVAaEY, published on Feb. 13, 2013, pp. 1-10.
Bytelight; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.
Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot By Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtClxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Davis, Jo; "The Future of Retail: In Store Now", Online Brands, http://onlinebrands.co.nz/587/future-retail-store-now/, Nov. 16, 2014, pp. 1-5.
Denso; "X-mobility", Oct. 10, 2014, pp. 1-2, including machine translation.
DHL; "Self-Driving Vehicles In Logistics: A DHL perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
DroneWatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhulCDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Emspak, Jesse; "Electric Trucks Plus Drones Could Make Deliveries 'Green'"; https://www.livescience.com/48510-delivery-drones-electric-trucks.html; Oct. 29, 2014; pp. 1-5.

(56) References Cited

OTHER PUBLICATIONS

Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, May 19, 2015, pp. 1-3.
Fellow Robots; "Oshbot Progress—Fellow Robots", https://vimeo.com/139532370, published Sep. 16, 2015, pp. 1-5.
Follow Inspiration; "wiiGO"; https://www.youtube.com/watch?v=dhHXIdpknC4; published on Jun. 16, 2015; pp. 1-7.
Fora.tv; "A Day in the Life of a Kiva Robot", https://www.youtube.com/watch?v=6KRjuuEVEZs, published on May 11, 2011, pp. 1-11.
GAMMA2VIDEO; "FridayBeerBot.wmv", https://www.youtube.com/watch?v=KXXIIDYatxQ, published on Apr. 27, 2010, pp. 1-7.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, Jun. 14, 2010, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, 2009, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.

Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva replenishment is more productive and accurate than replenishing pick faces in traditional distribution operations", http//www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Kiva's warehouse automation system is the most powerful and flexible A . . . ", http://www.kivasystems.com/solutions/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kiva's Robot Hit Their Stride; photo by Wade Roush; https://xconomy.com/boston/2008/04/21/kivas-robots-hit-their-strideer-slide/ Year: 2008).
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Kohtsuka, Takafumi, et al.; "Design of a Control System for Robot Shopping Carts", Knowledge-Based and Intelligent Information and Engineering Systems, 15th International Conference, KES 2011, Kaiserslautern, Germany, Sep. 12-14, 2011, pp. 4.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino And Bluetooth HC-05", Robotics_Projects_C/C++_Android, Jan. 23, 2016, pp. 1-14.
Kumar, Swagat; "Robotics-as-a-Service: Transforming the Future of Retail", Tata Consultancy Services, http://www.tcs.com/resources/white_papers/Pages/Robotics-as-Service.aspx, printed on May 13, 2015, pp. 1-4.
Lejepekov, Fedor; "Yuki-taro. Snow recycle robot.", https://www.youtube.com/watch?v=gl2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-GO—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavathi, P.; "Automatic Docking System with Recharging and Battery Replacement for Surveillance Robot", International Journal of Electronics and Computer Science Engineering, 2012, pp. 1148-1154.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.

(56) References Cited

OTHER PUBLICATIONS

Nakajima, Madoka & Haruyama, Shinichiro; "New indoor navigation system for visually impaired people using visible light communication", EURASIP Journal on Wireless Communications and Networking, 2013, pp. 1-10.
NEUROBTV; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 15-18, 2007; pp. 1506-1511.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Onozato, Taishi et al.; "A Control System for the Robot Shopping Cart"; 2010 IRAST International Congress on Computer Applications and Computational Science (CACS 2010); 2010; pp. 907-910.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Owano, Nancy; "Hearbo robot can tell beeps, notes, and spoken word (w/ Video)", Phys.org, Nov. 21, 2012, https://phys.org/news/2012-11-hearbo-robot-beeps-spoken-word.html, pp. 1-4.
PCT; App No. PCT/US2016/020919; International Search Report & Written Opinion dated May 17, 2016.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=oBHYwYlo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
Sebaali, G., et al.; "Smart Shopping Cart", Department of Electrical and Computer Engineering, American University of Beirut, 2014, pp. 1-6.
Shandrow, Kim Lachance; "This shopping cart of the future creepily follows you around stores"; https://www.entrepreneur.com/article/241335; Dec. 31, 2014; pp. 1-13.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, Aug. 14, 2014, pp. 1-5.
SK Telecom Co.; "SK Telecom Launches Smart Cart Pilot Test in Korea"; http://www.sktelecom.com/en/press/press_detail.do?idx=971; Oct. 4, 2011; pp. 1-2.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the NEW Stewart Golf X9 Follow", https://www.youtube.com/watch?v=HHivFGtiuE, published on Apr. 9, 2014, pp. 1-9.
Sun, Eric; "Smart Bin & Trash Route" system—RMIT 2012 Green Inventors Competition, http://www.youtube.com/watch?v=OrTA57alO0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Technion; "Autonomous Tracking Shopping Cart—Shopping Made Easy from Technion"; https://www.youtube.com/watch?v=pQcb9fofmXg; published on Nov. 23, 2014; pp. 1-10.
UKIPO; App. No. 1714769.5; Office Action dated Mar. 27, 2018.
UKIPO; App. No. 1715523.5; Office Action dated Mar. 26, 2018.
UKIPO; App. No. GB1714769.5; Office Action dated Feb. 28, 2019.
UKIPO; App. No. GB1715523.5; Office Action dated Mar. 4, 2019.
UKIPO; App. No. GB1815686.9; Combined Search and Examination Report dated Mar. 4, 2019.
UKIPO; App. No. GB1815687.7; Combined Search and Examination Report dated Mar. 5, 2019.
UKIPO; App. No. GB1908036.5; Combined Search and Examination Report dated Jul. 11, 2019.
UKIPO; App. No. GB1908036.5; Examination Report dated Aug. 19, 2019.
UKIPO; App. No. GB1908038.1; Combined Search and Examination Report dated Jul. 15, 2019.
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
USPTO; U.S. Appl. No. 15/060,953; Notice of Allowance dated Dec. 21, 2018.
USPTO; U.S. Appl. No. 15/060,953; Office Action dated Feb. 7, 2018.
USPTO; U.S. Appl. No. 15/060,953; Office Action dated Jul. 27, 2018.
USPTO; U.S. Appl. No. 16/361,015; Notice of Allowance dated Feb. 24, 2021.
USPTO; U.S. Appl. No. 16/361,015; Office Action dated Sep. 22, 2020.
Vasilescu, Iuliu, et al.; "Autonomous Modular Optical Underwater Robot (AMOUR) Design, Prototype and Feasibility Study", Apr. 18, 2005, pp. 1-7.
VMECAVacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.

(56) References Cited

OTHER PUBLICATIONS

Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wikipedia; "Leeds Kirkgate Market"; https://en.wikipedia.org/wiki/Leeds_Kirkgate_Market; Retrieved on Apr. 5, 2017; 8 pages.
Wired; "High-Speed Robots Part 1: Meet BettyBot in "Human Exclusion Zone" Warehouses—The Window—WIRED", https://www.youtube.com/watch?v=8gy5tYVR-28, published on Jul. 2, 2013, pp. 1-6.
Workhorse Group; "HorseFly by Workhorse—Drone Delivery Concept"; https://www.youtube.com/watch?v=epqZ-luhzKQ; published on Oct. 13, 2015; pp. 1-8.
Workhorse; "HorseFly"; http://workhorse.com/aerospace; Feb. 2017; pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.
Zito, Daniel; "Workhorse Group Obtains Section 333 Exemption From Federal Aviation Administration to Test HorseFly(TM) UAS;" https://web.archive.org/web/20160626120625/http://globenewswire.com:80/news-release/2015/12/09/794112/10158200/en/Workhorse-Group-Obtains-Section-333-Exemption-From-Federal-Aviation-Administration-to-Test-HorseFly-TM-UAS.html; published Dec. 9, 2015; pp. 1-3.
U.S. Appl. No. 17/551,130, filed Dec. 14, 2021, Donald R High.

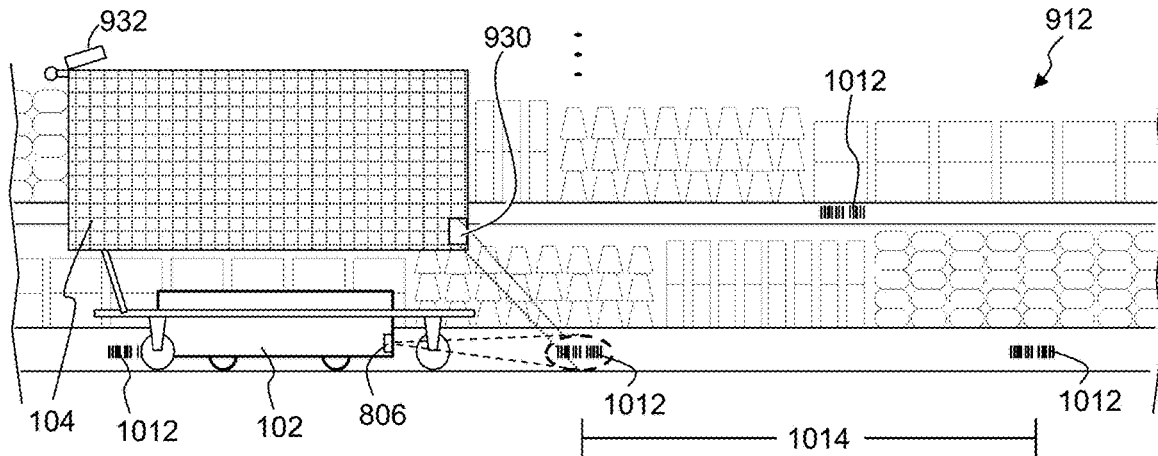
FIG. 10
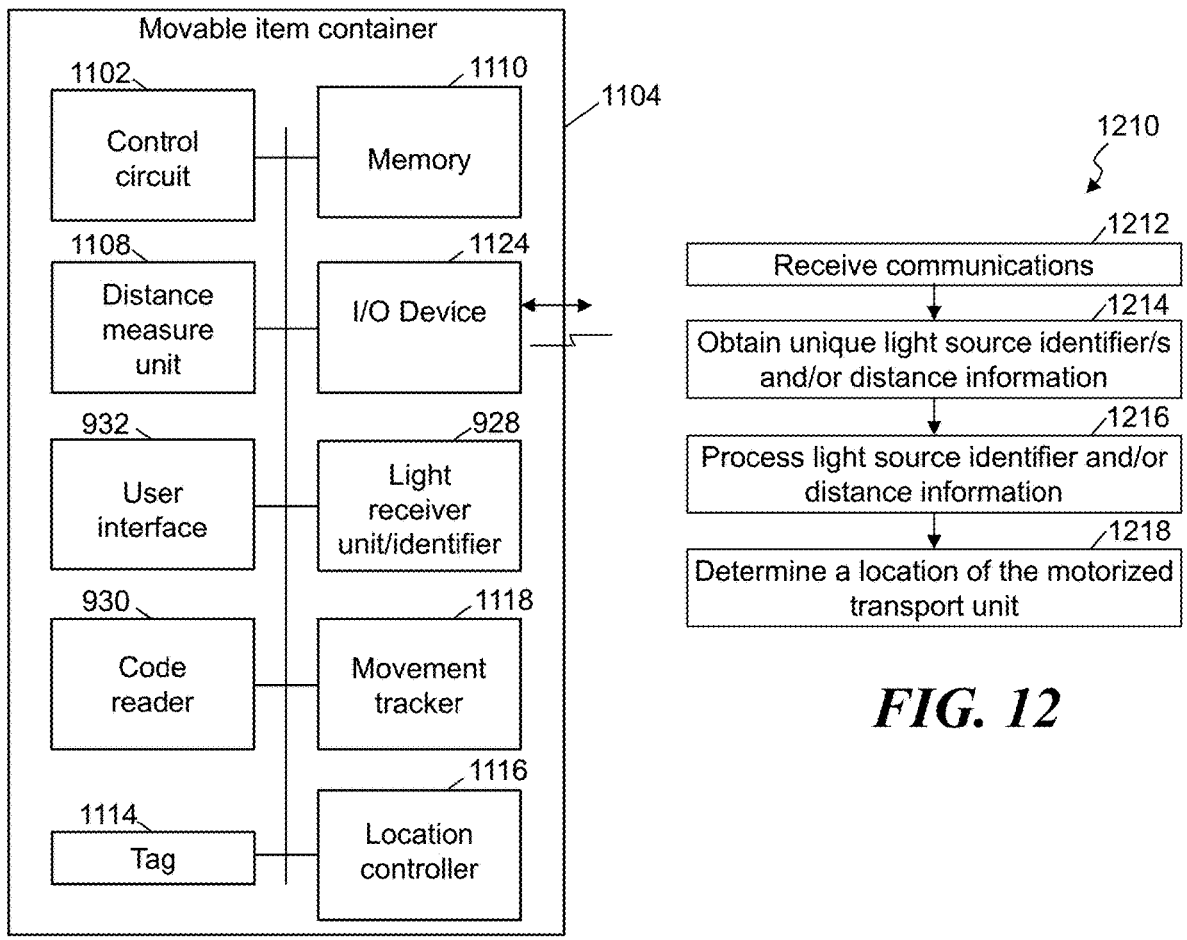
FIG. 11
FIG. 12

|      |      |      |      |      |
|------|------|------|------|------|
| 1601 | 1602 | 1603 | 1604 | 1605 |
| 1606 | 1607 | 1608 | 1609 | 1610 |
| 1611 | 1612 | 1613 | 1614 | 1615 |
| 1616 | 1617 | 1618 | 1619 | 1620 |
| 1621 | 1622 | 1623 | 1624 | 1625 |

| Section ID | Accessibility | Access Restriction setting | Temporary inaccessibility |
|------------|---------------|----------------------------|---------------------------|
| 1608 | Inaccessible | - | - |
| 1612 | Accessible | Inaccessible between 8am-11pm | None |
| 1614 | Accessible | Inaccessible to MTUs escorting a customer | None |
| 1623 | Accessible | None | Inaccessible to MTUs carrying a cart |

FIG. 16B

SHOPPING FACILITY ASSISTANCE SYSTEMS, DEVICES AND METHODS

RELATED APPLICATIONS

This application is a continuation of U.S. application Ser. No. 16/361,015, filed Mar. 21, 2019, which is now U.S. Pat. No. 11,046,562, which is incorporated in its entirety herein by reference and which is a continuation of U.S. application Ser. No. 15/060,953, filed Mar. 4, 2016, now U.S. Pat. No. 10,280,054, which is incorporated in its entirety herein by reference and which claims the benefit of each of the following U.S. Provisional applications, each of which is incorporated herein by reference in its entirety: U.S. Provisional Application No. 62/129,726, filed Mar. 6, 2015; U.S. Provisional Application No. 62/129,727, filed Mar. 6, 2015; U.S. Provisional Application No. 62/138,877, filed Mar. 26, 2015; U.S. Provisional Application No. 62/138,885, filed Mar. 26, 2015; U.S. Provisional Application No. 62/152,421, filed Apr. 24, 2015; U.S. Provisional Application No. 62/152,465, filed Apr. 24, 2015; U.S. Provisional Application No. 62/152,440, filed Apr. 24, 2015; U.S. Provisional Application No. 62/152,630, filed Apr. 24, 2015; U.S. Provisional Application No. 62/152,711, filed Apr. 24, 2015; U.S. Provisional Application No. 62/152,610, filed Apr. 24, 2015; U.S. Provisional Application No. 62/152,667, filed Apr. 24, 2015; U.S. Provisional Application No. 62/157,388, filed May 5, 2015; U.S. Provisional Application No. 62/165,579, filed May 22, 2015; U.S. Provisional Application No. 62/165,416, filed May 22, 2015; U.S. Provisional Application No. 62/165,586, filed May 22, 2015; U.S. Provisional Application No. 62/171,822, filed Jun. 5, 2015; U.S. Provisional Application No. 62/175,182, filed Jun. 12, 2015; U.S. Provisional Application No. 62/182,339, filed Jun. 19, 2015; U.S. Provisional Application No. 62,185,478, filed Jun. 26, 2015; U.S. Provisional Application No. 62/194,131, filed Jul. 17, 2015; U.S. Provisional Application No. 62/194,119, filed Jul. 17, 2015; U.S. Provisional Application No. 62/194,121, filed Jul. 17, 2015; U.S. Provisional Application No. 62/194,127, filed Jul. 17, 2015; U.S. Provisional Application No. 62/202,744, filed Aug. 7, 2015; U.S. Provisional Application No. 62/202,747, filed Aug. 7, 2015; U.S. Provisional Application No. 62/205,548, filed Aug. 14, 2015; U.S. Provisional Application No. 62/205,569, filed Aug. 14, 2015; U.S. Provisional Application No. 62/205,555, filed Aug. 14, 2015; U.S. Provisional Application No. 62/205,539, filed Aug. 14, 2015; U.S. Provisional Application No. 62/207,858, filed Aug. 20, 2015; U.S. Provisional Application No. 62/214,826, filed Sep. 4, 2015; U.S. Provisional Application No. 62/214,824, filed Sep. 4, 2015; U.S. Provisional Application No. 62/292,084, filed Feb. 5, 2016; U.S. Provisional Application No. 62/302,547, filed Mar. 2, 2016; U.S. Provisional Application No. 62/302,567, filed Mar. 2, 2016; U.S. Provisional Application No. 62/302,713, filed Mar. 2, 2016; and U.S. Provisional Application No. 62/303,021, filed Mar. 3, 2016.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein:

FIG. 10 illustrates an exemplary motorized transport unit positioned proximate a movable item container, with a machine readable code reader of the motorized transport unit detecting a first machine readable code, in accordance with some embodiments;

FIG. 11 shows a simplified block diagram of an exemplary movable item container and/or interface unit of a movable item container, in accordance with some embodiments;

FIG. 12 shows a simplified flow diagram of an exemplary process of determining a location and/or controlling movement of the motorized transport unit, movable item container, customer, user interface unit, or other such object, in accordance with some embodiments.

FIGS. 16A and 16B comprise illustrations of a grid map of a shopping space in accordance with some embodiments.

Figure 1:
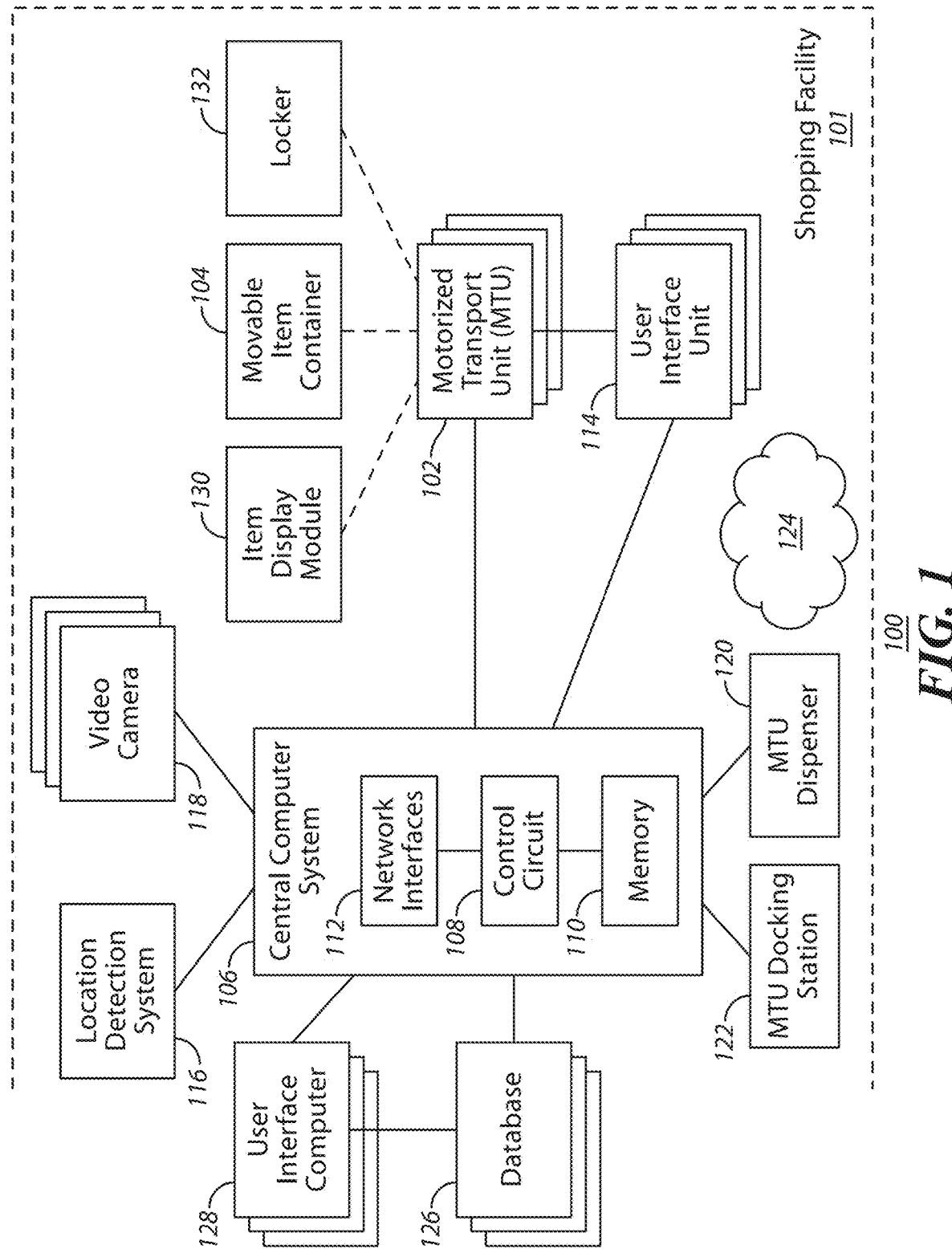
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations, parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the shopping area may include product storage units, shelves, racks, modules, bins, etc., and other walls, dividers, partitions, etc. that may be configured in different layouts or physical arrangements. In other example, persons or other movable objects may be freely and independently traveling through the shopping facility space. And in other example, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-22B expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Mass.

In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
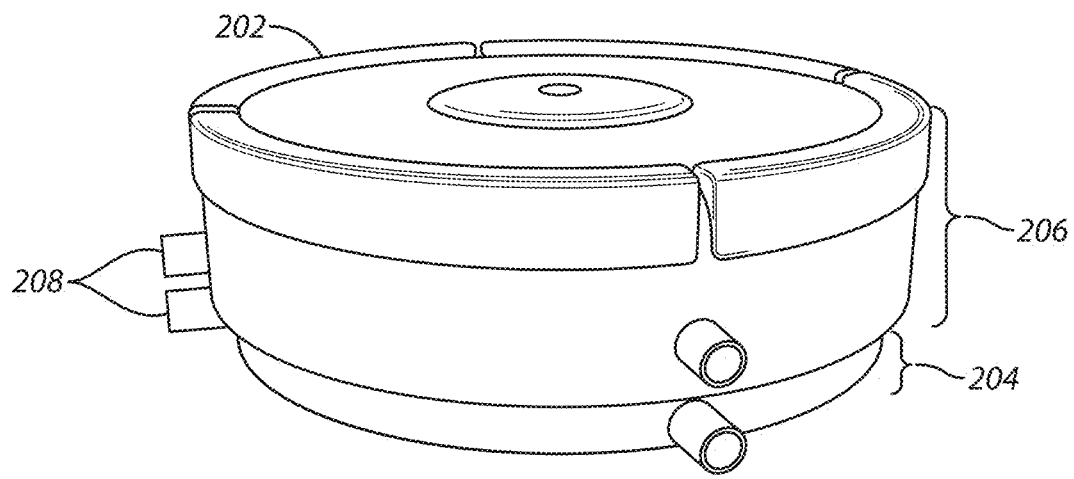
FIGS. 2A and 2B are illustrations of a motorized transport unit of the system of FIG. 1 in a retracted orientation and an extended orientation in accordance with some embodiments.
Figure 2B:
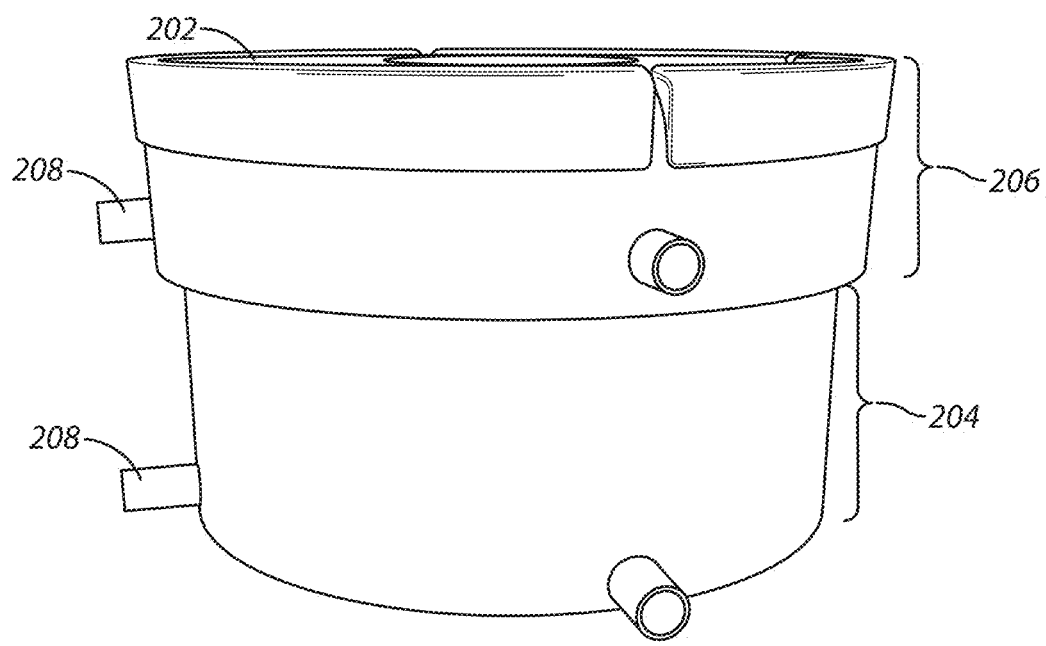

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3B:
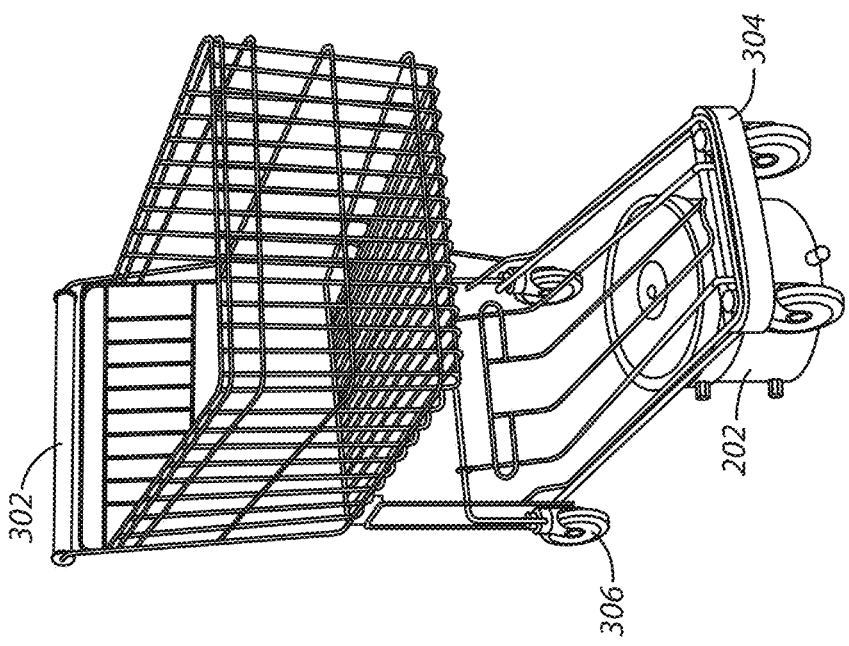
FIGS. 3A and 3B are illustrations of the motorized transport unit of FIGS. 2A and 2B detachably coupling to a movable item container, such as a shopping cart, in accordance with some embodiments.
Figure 3A:
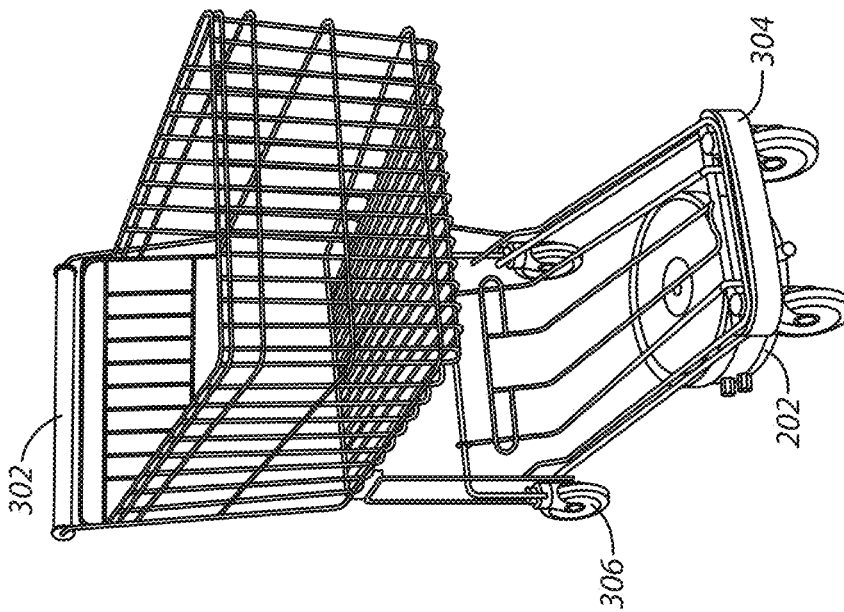

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
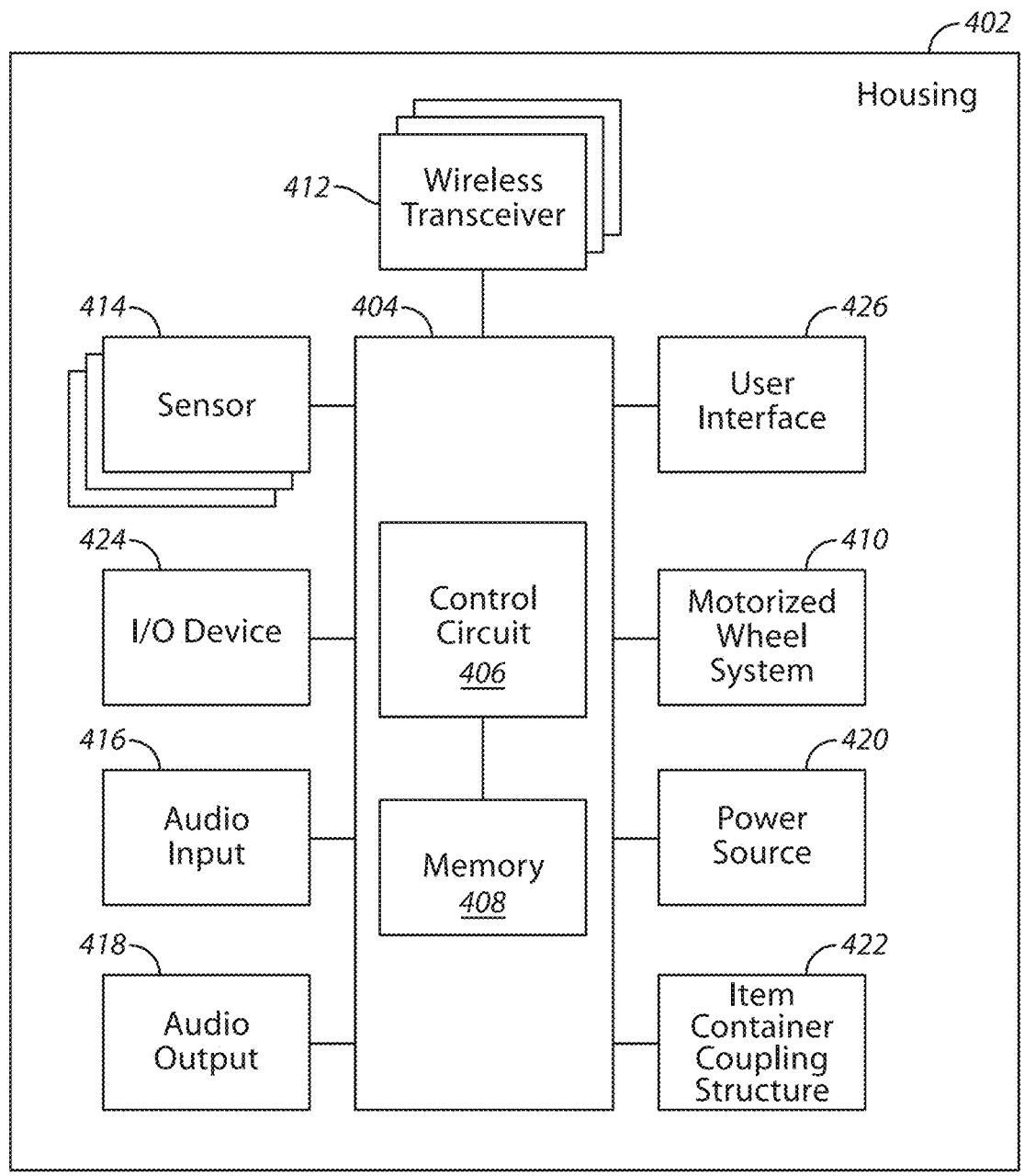
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
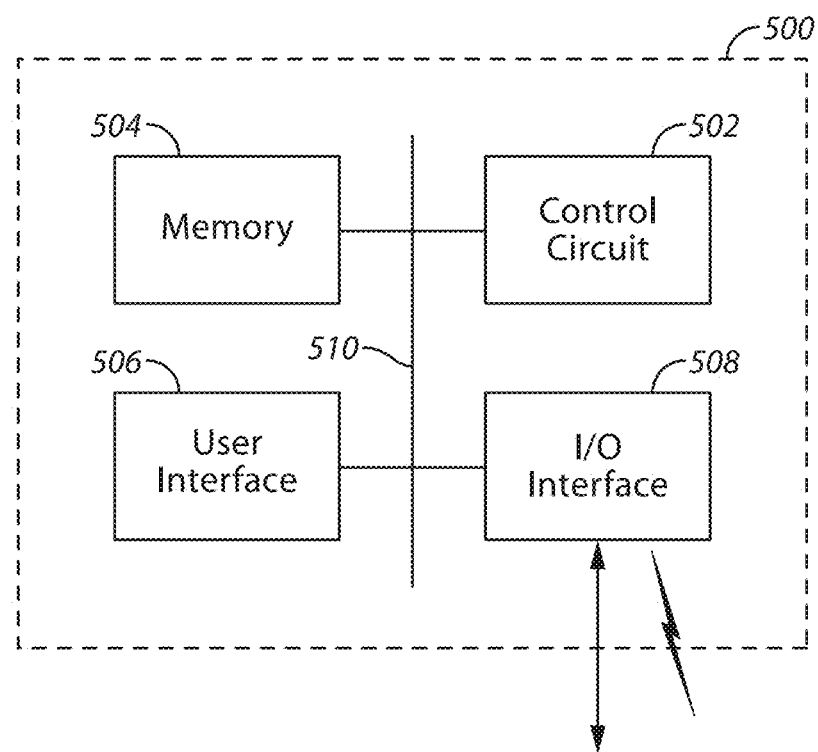
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit is loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

In accordance with some embodiments, further details are now provided for one or more of these and other features.

For example, generally speaking, pursuant to various embodiments, systems, apparatuses, processes and methods are provided herein that allow for more accurate location determination, tracking and/or prediction relative to a shopping facility, such as a retail store location, shopping mall, distribution center, shopping campus or the like. The accurate location of motorized transport units, movable item containers, customers, associates and/or other objects allows for more accurate tracking, control and distribution of at least motorized transport units and movable item containers. In some embodiments the central computer system 106 in cooperation with the location detection system allows the central computer system to determine a location of the motorized transport units 102 at the shopping facility. Further, the central computer system may also be configured to determine a location of one or more of the movable item containers, user interface units, and the like.

Figure 6:
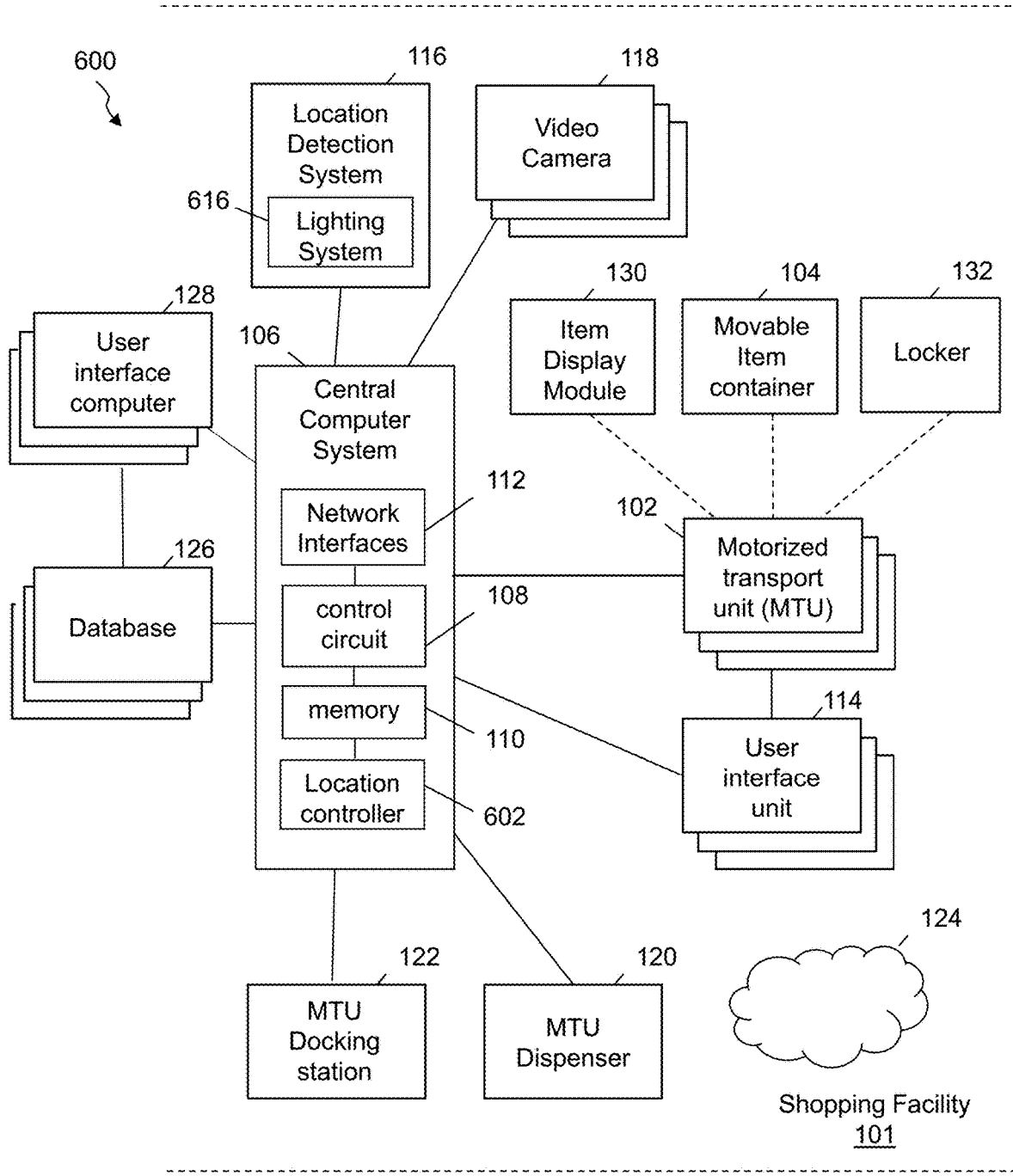
FIG. 6 illustrates a simplified block diagram of an exemplary shopping facility management system for use in determining a location of a self-propelled motorized transport unit and/or other objects within a shopping facility, in accordance with some embodiments.

FIG. 6 illustrates a block diagram of an exemplary shopping assistance system 600, similar to that of FIG. 1, as configured in accordance with various embodiments of these teachings. In some embodiments, the shopping assistance system 600 includes the components of FIG. 1, with the addition of a location controller 602. The location controller may be part of the central computer system 106, while in other embodiments, the location controller may be separate from and in communication with the central computer system. Accordingly, the shopping facility assistance system 100 (sometimes also referred to as a shopping facility management system) can be configured to determine a location of at least the self-propelled motorized transport units 102 associated with the shopping facility, in accordance with some embodiments.

Further, some embodiments include a lighting system or network 616, which may be part of the location detection system 116 or separate from the location detection system. The lighting system 616 includes one or more light units that emit light with information encoded into the emitted light. The information can include light source identifier information, area identifier or number, location information, and/or other such information or combination of such information. In some implementations, the light sources of the lighting system are configured to further provide lighting to the shopping facility. In some embodiments, however, the lighting system may cause non-visible light to be emitted that can include the relevant information and can be detected. Typically, the motorized transport units include light detectors to detect the light from the lighting system and communicate at least some of the information to the location controller. Accordingly, in some embodiments, the motorized transport units are configured to wirelessly communicate with the location controller, or the central computer system, which can forward relevant information to the location controller. Further, in some embodiments, location controller 602 is configured to communicate with user interface units 114, such as through one or more wireless communication protocols (e.g., Wi-Fi, Bluetooth, etc.), which can be part of or separate from a distributed communication network (e.g., wireless network 124).

The location controller 602 may also be communicationally coupled with one or more databases 126. The databases 126 can store substantially any relevant information such as but not limited to store mapping information, lighting patterns, light source identifiers, light source mapping, motorized transport unit identifying information, capabilities of the motorized transport units, movable item container identifying information, product information, location information, commands, codes, code location mapping, software, applications, executables, log and/or historic information, customer information (e.g., preferences, log-in information, contact information, etc.), other such relevant information, and typically a combination of two or more of such information. Similarly, some or all of the information stored and/or accessible through the databases may be stored at one or more of the location controller 602, the central computer system 106, the motorized transport units 102, the movable item containers 104, the user interface units, and the like.

As described above, the motorized transport units 102 are self-propelled and configured to move themselves throughout at least some, if not all of the shopping facility. In some embodiments, the motorized transport units 102 wirelessly receive commands from the location controller 602 (or the control circuit) to direct the motorized transport units to desired locations and/or along desired routes within or outside of the shopping facility. The motorized transport units may additionally or alternatively be configured to operate autonomously and/or at least partially autonomously from the central computer system (CCS). Further, in some embodiments, the motorized transport units 102 are configured to be fixed with or removably cooperated with the movable item containers 104 to move the movable item containers throughout authorized areas of the shopping facility, and in some instances outside of the shopping facility. The movable item containers 104 are configured to be used by customers and/or shopping facility associates or other employees in transporting products through the shopping facility. For example, in some embodiments, the movable item containers can be baskets, bins, wheeled carts, wheeled pallets, advertising systems, and/or other such movable item containers. For simplicity, the embodiments below are described with respect to carts or shopping carts. It will be appreciated by those skilled in the art, however, that the movable item containers are not limited to carts, but can be other objects configured to carry products.

In operation, the motorized transport units 102 and/or the movable item containers provide information to the location controller 602 to allow the location controller to determine, in association with one or more mappings of the shopping facility (and in some instances surrounding areas of the shopping facility), a location of the motorized transport units and/or movable item containers. In some embodiments, the motorized transport units 102 are configured with one or more detection systems that can provide relevant information to the location controller.

Figure 7:
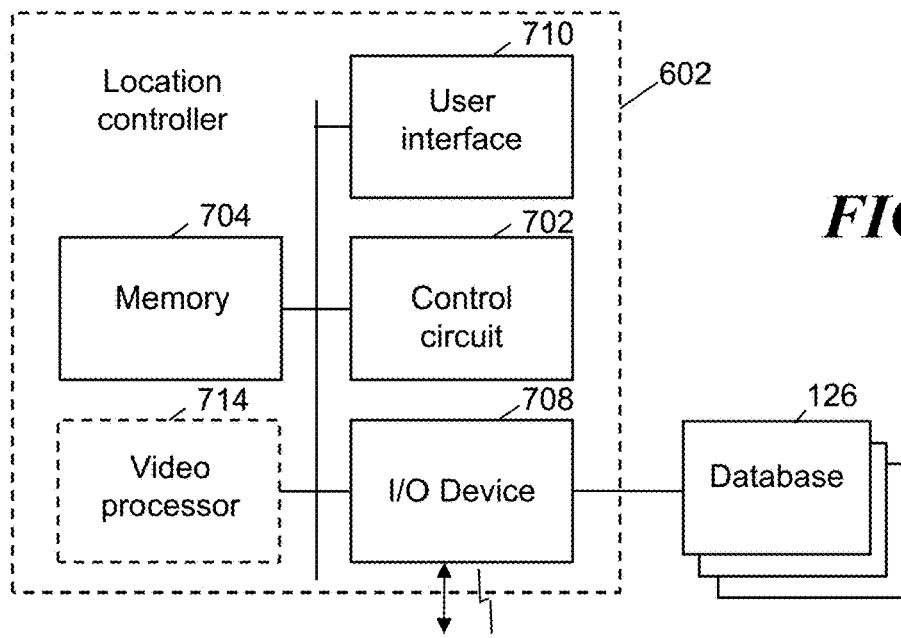
FIG. 7 shows a simplified block diagram of an exemplary location controller in accordance with some embodiments.

FIG. 7 shows a simplified block diagram of an exemplary location controller 602 in accordance with some embodiments. The location controller includes at least one control circuit 702, at least one memory 704, and at least one input/output (I/O) device or interface 708. The control circuit typically comprises one or more processors and/or microprocessors. Generally, the memory 704 stores the operational code or set of instructions that is executed by the control circuit 702 and/or processor to implement the functionality of the location controller. In some embodiments, the memory 704 may also store some or all of particular data that may be needed to make any of the determinations and/or corrections described herein. Such data may be pre-stored in the memory or be received, for example, from the motorized transport units 102, the movable item containers 104, customer and/or shopping facility associate user interface units 114, the databases 126, or other sources, or combinations of such sources. It is understood that the control circuit and/or processor may be implemented as one or more processor devices as are well known in the art. Similarly, the memory 704 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 704 is shown as internal to the location controller; however, the memory 704 can be internal, external or a combination of internal and external memory. Additionally, the location controller may include a power supply (not shown) or it may receive power from an external source.

The control circuit 702 and the memory 704 may be integrated together, such as in a microcontroller, application specification integrated circuit, field programmable gate array or other such device, or may be separate devices coupled together. The I/O device 708 allows wired and/or wireless communication coupling of the location controller to external components, such as the databases 126, the motorized transport units 102, the user interface units 114, the movable item containers 104, and other such components, including when relevant the video camera 118 or video system, lighting system 616, and the like. Accordingly, the I/O device 708 may include any known wired and/or wireless interfacing device, circuit and/or connecting device. In some embodiments, a user interface 710 is included in and/or coupled with the location controller 602, which may be used for user input and/or output display. For example, the user interface 710 may include any known input devices, such one or more buttons, knobs, selectors, switches, keys, touch input surfaces and/or displays, etc. Additionally, the user interface may include one or more output display devices, such as lights, visual indicators, display screens, etc. to convey information to a user, such as status information, location information, mapping information, product location information, product information, video content, operating status information, notifications, errors, conditions and/or other such information. While FIG. 7 illustrates the various components being coupled together via a bus, it is understood that the various components may actually be coupled to the control circuit 702 and/or one or more other components directly.

Generally, the location controller 602 and/or the control circuit 702 can comprise a fixed-purpose hard-wired platform or can comprise a partially or wholly programmable platform. These architectural options are well known and understood in the art and require no further description here. The location controller and/or control circuit can be configured (for example, by using corresponding programming as will be well understood by those skilled in the art) to carry out one or more of the steps, actions, and/or functions described herein.

The location controller 602 receives one or more inputs corresponding to one or more motorized transport units and identifies a relevant location of the one or more motorized transport units. The information may be received from the motorized transport unit, a movable item controller, a user interface unit 114, databases 126, video cameras 118, lighting system 616 and/or other such sources. Utilizing precise knowledge of the shopping facility and the layout of the shopping facility, and in some instances product location information, the location controller is configured to determine a location of one or more motorized transport units and/or movable item containers. For example, in some embodiments, one or more motorized transport units and/or movable item containers are configured to detect light from light sources of the lighting system 616 and extract a unique light source identifier or other relevant location information (e.g., area number, mapping or grid coordinate information, zone identifier, etc.) from the light detected from one or more light sources. Similarly, in some embodiments, one or more of the motorized transport units and/or movable item containers are configured to measure distances and provide relative distance information to the location controller 602. Still further, in some implementations, one or more of the motorized transport units and/or movable item containers are configured to detect and/or read one or more location markers and/or codes, and provide that information to the location controller.

Figure 8:
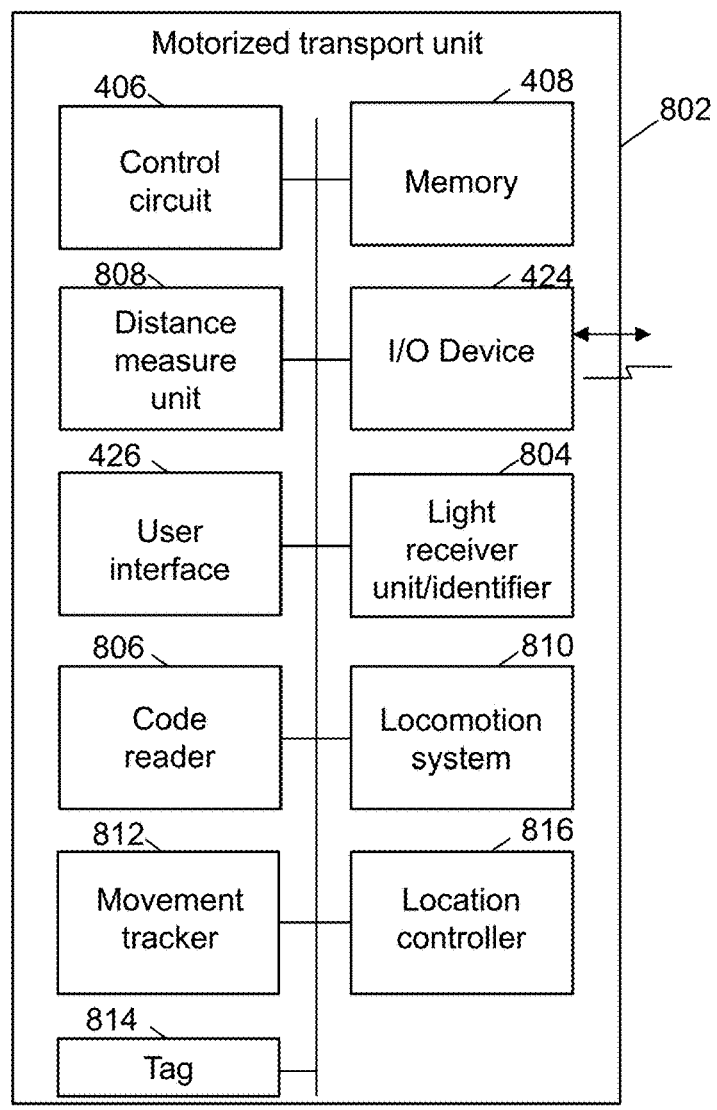
FIG. 8 shows a simplified block diagram of an exemplary motorized transport unit, in accordance with some embodiments.

FIG. 8 shows a simplified block diagram of an exemplary motorized transport unit 804, similar to the motorized transport unit in FIG. 4, in accordance with some embodiments, and includes the components of the motorized transport unit illustrated in FIG. 4. Further, the motorized transport unit typically includes one or more sensors and/or measurement units 414, such as but not limited to one or more distance measurement units 808, light receiver units 804, optical and/or machine readable code readers 806, other such measurement units, and typically a combination of such measurement units. Further, the motorized transport unit includes a locomotion systems 810 or motor controllers (such as a motorized wheel system 410), and may include one or more movement tracker units 812. Further, in some embodiments, the motorized transport unit 802 includes a tag 814 or other device that may be detectable, such as by location tracking units distributed throughout the shopping facility, by one or more movable item containers 104, or other systems of the shopping facility assistance system 100. In some embodiments, the tag 814 is an RFID tag or other tag, and can in some instances provide a unique identifier of the motorized transport unit 802.

The control circuit 406 typically comprises one or more processors and/or microprocessors. Generally, the memory 408 stores the operational code or set of instructions that is executed by the control circuit 406 and/or processor to implement the functionality of the motorized transport unit 802. In some embodiments, the memory 408 may also store some or all of particular data that may be needed to make any of the determinations, measurements and/or communications described herein. Such data may be pre-stored in the memory or be determined, for example, from detected light, measurements, and the like, and/or communicated to the motorized transport unit, such as from the movable item container 104, a user interface unit 114, the location controller 602, other source or combination of such sources. It is understood that the control circuit 406 and/or processor may be implemented as one or more processor devices as are well known in the art. Similarly, the memory 408 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 408 is shown as internal to the motorized transport unit 802; however, the memory 408 can be internal, external or a combination of internal and external memory. Additionally, the motorized transport unit typically includes a power supply (not shown) or it may receive power from an external source. While FIG. 8 illustrates the various components being coupled together via a bus, it is understood that the various components may actually be coupled to the control circuit 406 and/or one or more other components directly.

Generally, the control circuit 406 and/or electronic components of the motorized transport unit 802 can comprise fixed-purpose hard-wired platforms or can comprise a partially or wholly programmable platform. These architectural options are well known and understood in the art and require no further description here. The motorized transport unit and/or control circuit can be configured (for example, by using corresponding programming as will be well understood by those skilled in the art) to carry out one or more of the steps, actions, and/or functions described herein.

The control circuit 406 and the memory 408 may be integrated together, such as in a microcontroller, application specification integrated circuit, field programmable gate array or other such device, or may be separate devices coupled together. The I/O device 424 allows wired and/or wireless communication coupling of the motorized transport unit to external components, such as the location controller 602, the user interface units 114, the movable item containers 104, and other such components. Typically, the I/O device 424 provides at least wireless communication, and in some instances may include any known wired and/or wireless interfacing device, circuit and/or connecting device, such as but not limited to one or more transmitters, receivers, transceivers, etc. In some embodiments, a user interface 426 is included in and/or coupled with the motorized transport unit 802, which may be used for user input and/or output display. For example, the user interface 426 may include any known input devices, such one or more buttons, knobs, selectors, switches, keys, touch input surfaces and/or displays, etc. Additionally, the user interface may include one or more output display devices, such as lights, visual indicators, display screens, etc. to convey information to a user, such as status information, location information, mapping information, product location information, product information, video content, other communication information (e.g., text messages), operating status information, notifications, errors, conditions, shopping list, advertising, product recommendations, and/or other such information.

As introduced above, in some embodiments, the motorized transport unit includes one or more distance measurement units 808 configured to measure relative distances between the motorized transport unit and one or more external objects. For example, the distance measurement unit can be used to measure relative distances between the motorized transport unit and a shelf or rack within the shopping facility, another motorized transport unit, a wall, a structural support column, movable item containers, the customer associated with the motorized transport unit, other customers not associated with the motorized transport unit and/or substantially any other external object. In some implementations the motorized transport unit includes a laser distance measurement unit that uses a laser to measure distances between the motorized transport unit and an external object. Further, in some embodiments, the motorized transport unit includes multiple distance measurement units positioned to measure distances around the motorized transport unit (e.g., four distance measurement units positioned with a first measuring in a direction of travel, a second measuring in a direction 180 degrees away from the direction of travel, and third and fourth measuring at ninety degrees from the direction of travel). In other implementations, one or more distance measurement units may be capable of measure distances at multiple different directions or angles. The measured relative distance information can be communicated to the remote location controller 602 allowing the remote location controller to track movement of the motorized transport unit and/or use the distance information to determine a current and/or predicted location of the motorized transport unit.

One or more of the distance measurement unit or units 808 may include, in some embodiments, a light emitter and a light detector that detects light reflected by one or more objects. For example, the distance measurement unit may comprise a laser emitter and detector that allows for accurate measurement of distances between the emitter and detector. The distance measurement unit can be configured to determine the relative distance from the light emitter to the external object. The distance measurement unit and/or the control circuit 406 may further modify distance information based on known dimensions of the motorized transport unit and/or a location of the detector relative to one or more exterior surfaces of the motorized transport unit.

In some embodiments, the motorized transport unit 802 includes one or more light receiver units and/or light source identifiers configured to detect light from one or more light sources (e.g., from the lighting system 616) and extract and/or determine a unique light source identifier from the detected light. The light is typically received from predefined light sources of the lighting system that emit light with encoded unique light source identifiers within the emitted light. For example, a plurality of light sources can be overhead lights mounted and distributed across the ceiling of the shopping facility with the emitted light being directed down toward the floor. Further, the light sources can emit visible light providing lighting within the shopping facility. Typically, the encoding is implemented such that it is not detectable to humans. The light receiver unit 804 detects the light and extracts the unique light source identifier encoded in the emitted light. As a further example, a signal can be encoded in the light output from one or more LED or bulb light sources. The light receiver unit 804, which in some instances can comprise one or more cameras, light sensors, photodiodes, etc., detects and decodes this signal to obtain a light source identifier and/or location information that can be used in determining a position relative to the light source. Similarly, other light receiver units or devices can alternatively or additionally be used such as a camera on a user interface unit 114, a light receiver unit on other devices (e.g., movable item container, detectors carried by shopping facility associates, etc.) to detect the light source identifiers and/or signals.

The detected light source identifier can then be communicated to the location controller 602 to potentially be used in determining a location of the motorized transport unit based on a known location of the light source associated with the detected light source identifier. In other implementations, one or more light sources may be positioned closer to the floor and direct light parallel to or at an angle to the floor. Often, the light receiver unit 804 is configured to detect light source identifiers from multiple different light sources that in at least some instances are simultaneously impinging on the light receiver unit and/or simultaneously detectable by the light receiver unit 804. In some implementations, the encoded information may provide location information in addition to or in alternative to the light source identifier. The location information can include, for example coordinates, grid information or other such information that typically correspond with a shopping facility mapping. The location information to be encoded may be programmed into the light sources at installation, or communicated from the location controller 602, the central computer system 106 or other source.

The motorized transport unit 802 further includes the locomotion system 810 that includes and controls one or more motors of the motorized transport unit to at least cause the motorized transport unit to move throughout one or more areas within and/or exterior to the shopping facility. Typically, the locomotion system controls the one or more motors in accordance with one or more commands, position information, mapping coordinates, destination locations and the like. In some embodiments, the location controller 602 and/or central computer system 106 is configured to issue movement commands based on a determined and/or predicted location of the motorized transport unit. The locomotion system 810 can control the one or more motors to implement the one or more movement commands. In some embodiments, the motorized transport unit 802 further includes the movement tracker unit 812 that is configured to track one or more parameters corresponding to the movement and/or orientation of the motorized transport unit. For example, the movement tracker unit may include and/or communicate with one or more accelerometers, gyroscopes, compass, wheel or tread velocity or rate meters, odometer based on wheel and/or tread movement, global positioning satellite (GPS) information, Wi-Fi signal evaluation, and/or other such movement parameters. These parameters can be used in determining, predicting, and/or fine tuning a location of the motorized transport unit.

Figure 9A:
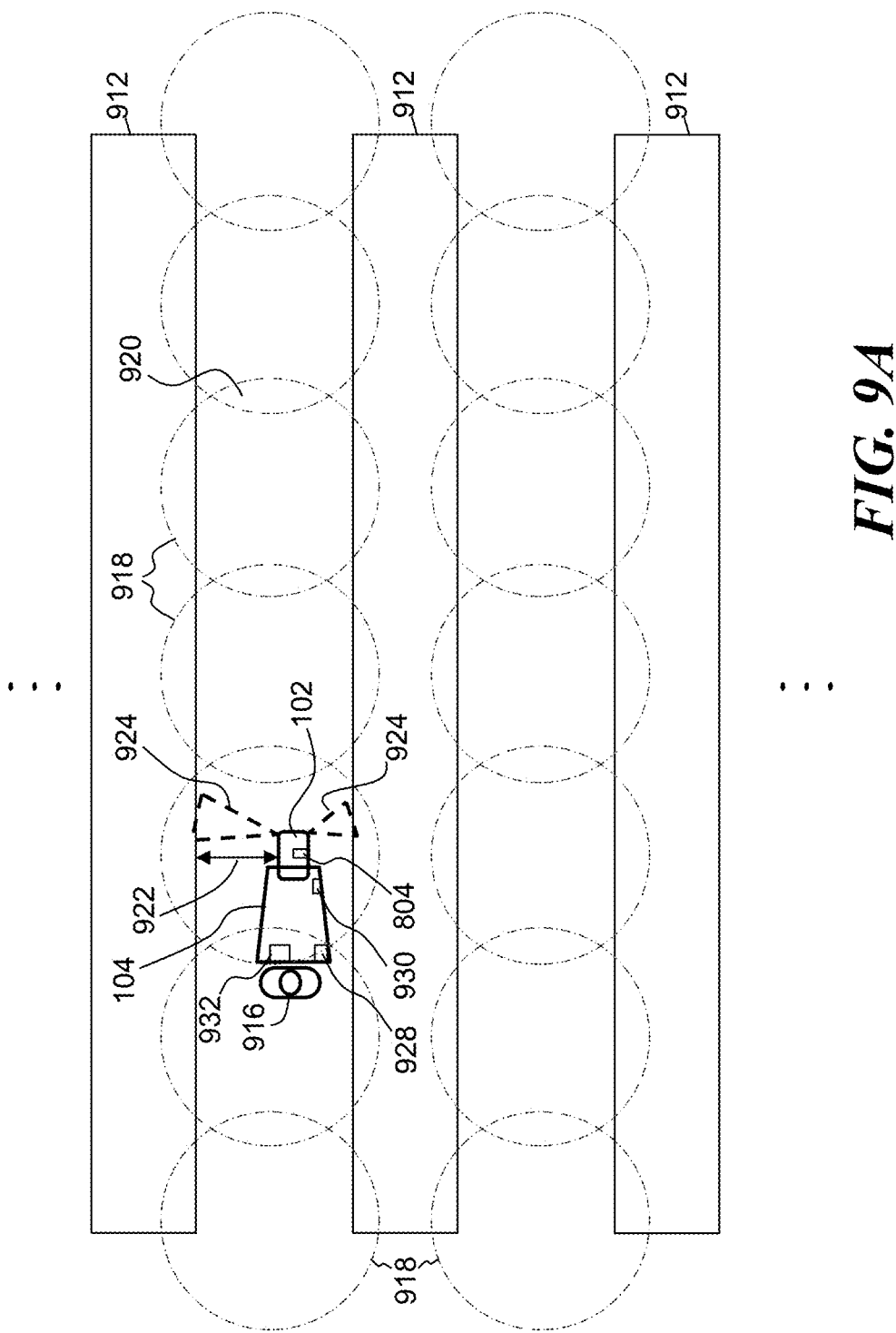
FIG. 9A shows a simplified overhead view of an exemplary layout of a shopping facility with multiple shelves and illustrating an exemplary light pattern from light sources, in accordance with some embodiments.

FIG. 9A shows a simplified overhead view of an exemplary layout of a shopping facility with multiple shelves 912, racks, or other such product supporting and/or display structures (generally referred to below as shelves) separated by aisles or walkways, in accordance with some embodiments. Further illustrated is a customer 916 proximate a movable item container 104 that is cooperated with a motorized transport unit configured, in part, to move the movable item container throughout at least portions of the shopping facility. As introduced above, some shopping facilities include a lighting system 616 with multiple light sources distributed throughout one or more areas of the shopping facility and that emit light that can be detected by the light receiver unit 804 of the motorized transport unit. FIG. 9A additionally shows examples of illumination areas 918 each representative of an area that is illuminated by separate light sources of the lighting system 616. The light receiver unit 804 detects the light from one or more light sources and extracts and/or identifies a unique light source identifier from the light of each of the one or more light sources. In some embodiments, the light sources encode the unique light source identifier through one or more methods such as wavelength modulation, light intensity modulation, flashing, strobing or other such encoding. In some implementations, the lighting system 616 includes lighting from and/or controlled in accordance with ByteLight, Inc. of Boston, Mass.

Figure 9B:
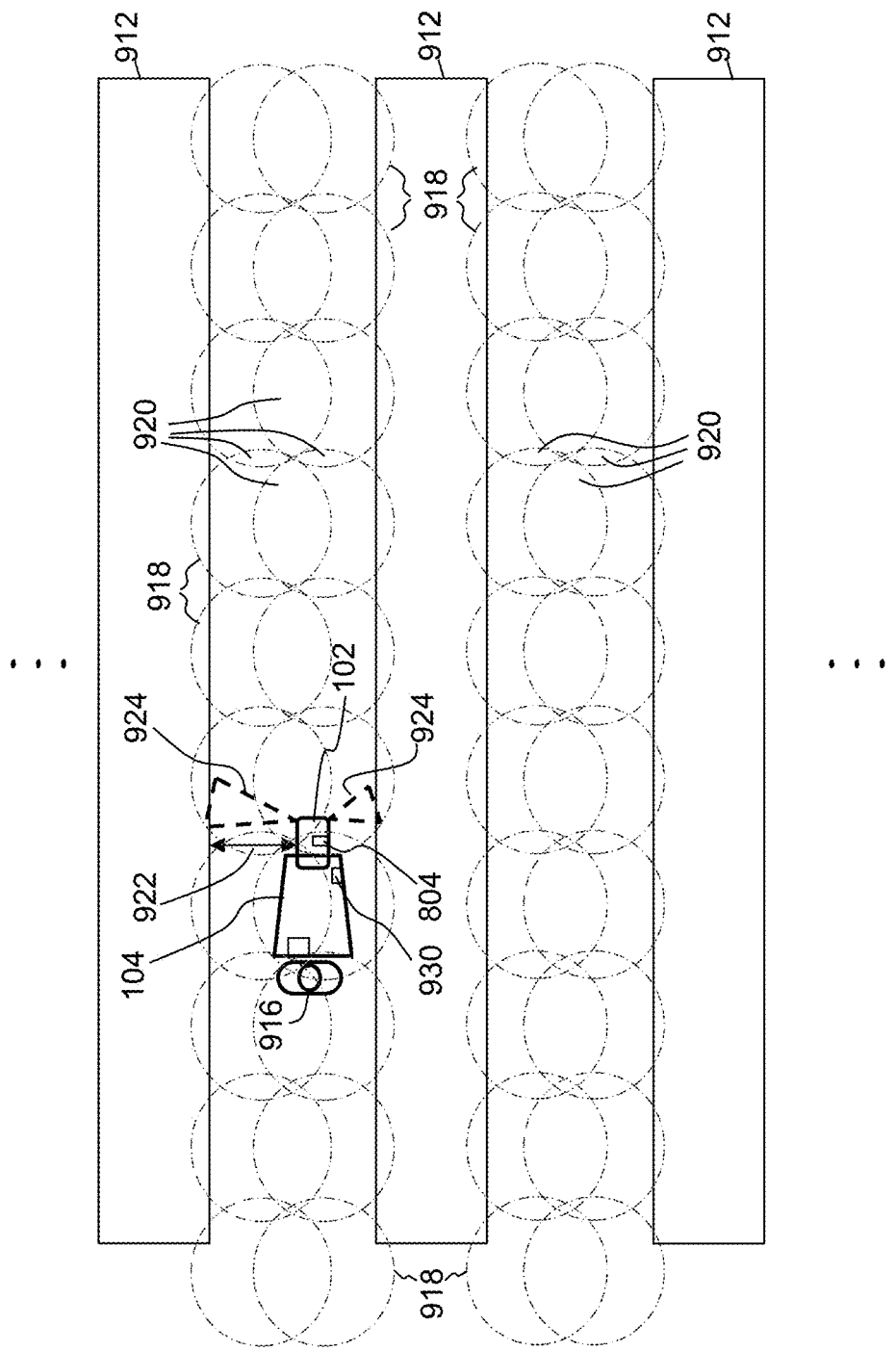
FIG. 9B shows a simplified overhead view of an exemplary layout of a shopping facility with multiple shelves and illustrating an alternative exemplary light pattern, in accordance with some embodiments.

Substantially any number of light sources can be incorporated into the shopping facility to provide corresponding light or illumination areas 918. Similarly, the light sources are typically positioned such that the illumination areas 918 of two or more light sources overlap achieving overlapping light areas 920. In some embodiments, the light receiver unit 804 is configured to detect and/or extract multiple different light source identifiers from an overlapping light area 920 corresponding to the multiple light sources emitting the light creating the overlapping light areas such that the light from multiple light sources are simultaneously impinging on and/or detectable by the light receiver unit. FIG. 9B shows a simplified overhead view of an exemplary layout of a shopping facility with multiple shelves 912 separated by aisles or walkways with a larger number of illumination areas 918 and larger number and area of overlapping light areas 920, in accordance with some embodiments. Further, in some instances, increased concentrations of light sources may be positioned at areas of higher expected traffic, and/or for other reasons (e.g., other information that may be used to determine location may not readily be available in some areas), which may result in increased numbers and/or areas of overlapping light emitted from multiple light sources. Again, the overlapping light areas may enhance the precision in the determined location of the motorized transport unit. Some embodiments associate the illumination areas 918 with a mapping of the shopping facility providing a mapping of the light pattern of at least some of the light sources, and/or establish a separate mapping of the light pattern that can be associated with the shopping facility mapping.

In some embodiments, the one or more extracted light source identifiers are communicated from the motorized transport unit to the location controller 602. The location controller can be configured with and/or have access to detailed orientation information about the location, relative to at least the floor spacing and/or a mapping of the shopping facility, of each light source emitting light with an encoded light source identifier, and/or the area on the floor and/or within the shopping facility mapping of the illumination area 918. Utilizing the one or more light source identifiers, the location controller 602 can determine a location of the motorized transport unit within a degree of error, which can vary depending on the size of the illumination areas 918, and the size of overlapping light areas 920. Typically, the location controller is capable of obtaining greater precision with greater numbers of overlapping areas. Additionally or alternatively, in some embodiments, the motorized transport unit maintains some shopping facility mapping information and/or layout information, and can be configured to determine location information of the motorized transport unit.

FIGS. 9A-B further also show representative distance measurements 922 being measured by one or more distance measurement units 808. As described above, the relative distance information obtained through the distance measurements units can be communicated to the remote location controller 602. The location controller 602 can utilize this distance information in determining and/or predicting a location of the motorized transport unit.

Referring back to FIG. 8, the motorized transport unit 802, in some embodiments, includes a machine readable code reader 806 (sometimes referred to as a code reader) configured to detect and/or read machine readable codes positioned and distributed throughout at least some of the areas into which the motorized transport unit is configured and/or authorized to travel. The code reader 806 can be configured to extract code information from the one or more machine readable codes that are read and/or detected, while in other embodiments, the control circuit extracts and/or identifies the code information. In some embodiments, the code reader reads and/or extracts code information corresponding to each machine readable code of a plurality of unique machine readable codes that are positioned at different locations distributed throughout at least a portion of the shopping facility and detected by the code reader 806 of the motorized transport unit. The machine readable code reader 806 can be configured to optically read the machine readable codes of a plurality of unique machine readable codes that are positioned at different locations distributed throughout at least a portion of the shopping facility.

FIG. 10 illustrates an exemplary motorized transport unit (for example, motorized transport unit 802) positioned proximate a movable item container 104, with a machine readable code reader 806 of the motorized transport unit detecting a machine readable code 1012 of a plurality of machine readable codes spaced along a shelf 912, in accordance with some embodiments. Typically, each machine readable code is unique and/or distinguishable from the other of the machine readable codes. In some implementations, the machine readable codes 1012 can be positioned a predefined distance 1014 apart. Their positioning within the shopping facility and/or the mapping of the shopping facility can be known (at least at the location controller 602), or other such positioning information or combinations of such positioning information may be known or determined. The machine readable codes 1012 can be substantially any relevant machine readable code, such as but not limited to, two dimensional barcode, active radio frequency identifiers (RFID), near field communication (NFC) identifiers, ultra-wideband (UWB) identifiers, Bluetooth identifiers, images, or other such optically readable, radio frequency detectable or other such code, or combination of such codes. In some instances, the machine readable code 1012 may be exclusively associated with location, while in other instances, the machine readable code may correspond to other purposes, such as product identification corresponding to product placed at that position on the shelf 912. With detailed knowledge of the products distributed throughout the shopping facility, the location controller may be configured to identify the location of the motorized transport unit based on the machine readable codes that are used to identify products on the shelves 912. Additionally or alternatively, in some embodiments, the code reader 806 comprises a camera, video camera or other image capturing unit that is configured to capture an image of the machine readable code 1012. The code reader 806, the control circuit 406 and/or the location controller 602 can be configured to perform an evaluation on the image and/or video captured (e.g., image recognition) to determine relevant code information. Similarly, the image capturing unit can be configured to capture images of products on the shelves, predefined portions of a shelf, rack, endcap, marketing structure, or other such images that can similarly be evaluated. For example, in many embodiments, the location controller 602 has detailed knowledge of product placement throughout the shopping facility for numerous products if not all of the products available at the shopping facility relative to a layout and/or mapping of the shopping facility. Using an identification of one or more products from a captured image the location controller may use this product identifying information in estimating and/or predicting a location of the motorized transport unit. Similarly, the product location information may be used independent of or in combination with one or more other information that can be used by the location controller in determining a location of the motorized transport unit.

FIGS. 9A and 9B further illustrate one or more representative optical scans 924, lights, radio signals, or the like that are used to read one or more machine readable codes 1012. In some instances, for example, the motorized transport unit 802 includes one or more barcode readers that are configured to detect bar codes positioned alone a base of the shelves 912 or just above floor level, typically at known and/or at one of one or more predefined heights.

The obtained code information can be communicated from the I/O device 424 of the motorized transport unit (e.g., through a wireless transceiver (e.g., Wi-Fi, Bluetooth, cellular, etc.)) to the location controller 602 and/or the central computer system 106. The location controller 602 again can be configured with and/or have access to detailed location, position and/or orientation information corresponding to each of the plurality of machine readable codes relative to at least the floor spacing and/or a mapping of the shopping facility. Further, in some embodiments, the location controller may take into consideration the capabilities and/or limitations (e.g., range, angle, distance and/or other such limitations) of the machine readable code reader 806. Utilizing the code information, the location controller 602 can determine a location of the motorized transport unit 802 within a degree of error, which can vary depending on one or more factors, such as but not limited to the limitations of the code reader 806, the number, placement, distribution and/or orientation of the machine readable codes and other such factors. Further, in some embodiments, the location controller is capable of obtaining greater location precision by location information determined based on the machine readable codes in addition to one other relevant location information, such as but not limited to location information corresponding to one or more the light source identifiers, distance measurement information, GPS information, Wi-Fi information or other such information, and often a combination of such location information. Further, the distance measurement unit, the light receiver unit, code reader, movement tracker unit, and the like may not preform evaluations and/or determinations. Instead, these components may simply forward relevant information to the control circuit where the control circuit can utilize the information to make the relevant determinations and/or identifications (e.g., extract light source IDs, extract bar code information, determine relevant distance, determine movement and/or other such functions). In other implementations, the control circuit causes the processed or unprocessed information to the location controller for use by the location controller.

Illustrated in FIGS. 9A-B and 10, in some embodiments as further described herein, the movable item container 104 may additionally or alternatively include one or more components similar to the motorized transport unit, such as a light receiver unit 928, a machine readable code reader 930 (sometimes referred to as a code reader), a user interface 932 or user interface unit, or other such components or combinations of such components. In some embodiments, the code reader 930 of the movable item container 104 is used instead of the code reader 806 of the motorized transport unit, while in other implementations may be used in combination with the code reader 806 of the motorized transport unit.

In some embodiments, the motorized transport unit (and/or the movable item container) is incapable of determining its own location and is dependent on the one or more commands from the location controller. Alternatively, however, some embodiments of the motorized transport unit may optionally include an internal location controller 816 configured to allow the motorized transport unit to determine its own approximate location and/or provide feedback to the location controller 602. The internal location controller 816 may take some or all of the information from one or more of the distance measurement unit 808, the light receiver unit 804, code reader 806, and/or movement tracker unit 812. Utilizing locally stored and/or remotely accessed mapping of the shopping facility, the internal location controller can determine and/or predict a location of the motorized transport unit. In some instances, the locally determined location information can be compared with location information determined through the location controller 602.

Again, the motorized transport unit can be configured to communicate the measured distance information, the unique light source identifier(s), the code information corresponding to one or more machine readable codes, the movement tracking information and/or other such relevant information to the separate and remote location controller 602. The location controller 602 receives communications from the motorized transport unit and extracts relevant location information. Typically, the location controller is in communication with multiple motorized transport units that operate at the shopping facility (e.g., more than four). Further, the location controller may receive additional location information from other sources, such as from one or more movable item containers 104, user interface units 114, video processing unit, shopping facility associate communications, RFID tag readers, sensors, or the like, or combinations of such information. In some instances, the location controller is further configured to determine additional location information, such as through the evaluation of video content, application of one or more movement prediction algorithms and the like.

The location controller obtains and/or extracts relevant location information from the communications from the motorized transport unit and/or from other sources. The location controller can utilize the relevant location information in combination with detailed knowledge of the shopping facility (e.g., layout information, mapping information, coordinates, product placement within the shopping facility, advertisement placement, and/or other such information) in determining a location of a relevant motorized transport unit. The location controller may process some or all of the location information relevant to mapping in determining location information. For example, the location controller can process the one or more unique light source identifiers and identify a location of the corresponding light source and/or a corresponding location of the illumination area 918. Similarly, the location controller can use the distance information to further define and/or obtain a more precise location of the motorized transport unit (e.g., knowing that the motorized transport unit is within an area defined by an illumination area 918, a more precise location can be determined based on distance measurements between the motorized transport unit and each of two shelves on opposing sides of the motorized transport unit). Still further precision may be determined in the processing of the location information, such as identifying the motorized transport unit is within an overlapping light area 920 of two or more light sources and/or the detection of code information from one or more machine readable codes, in cooperation with distance measurements. Similarly, the movement tracking information may further be used to obtain specific amounts of movement from one or more previous location determinations. Additionally, some embodiments utilize previous location information in cooperation with newly received location information to adjust and/or clarify a determined location (e.g., knowing from movement tracking information that the motorized transport unit traveled three inches and has now just detected entering an overlapping light area 920, a more precise identification of location may be determined). In some embodiments, the location controller can determine a location of the motorized transport unit to within two feet, and typically within less than half a foot. Further, when utilizing a combination of the location information, the location controller can determine a location of the motorized transport unit to within less than one inch, and in some instances to within less than $1/16$ of an inch. Further, the location determination can be an automated process that is continuously performed such that a current location of the motorized transport unit is determined at least once every ten seconds, and typically at least once every second. For example, in some implementations, the location of the motorized transport unit can be continuously determined four to ten times a second.

Again, in some embodiments, the location information received at the location controller may include code information (e.g., based on machine readable codes 1012, images, product identification, etc.). Such code information can be obtained from the communications from the motorized transport unit and/or other sources (e.g., user interface unit, movable item container, etc.) that correspond to one or more specific machine readable codes of a plurality of unique machine readable codes that are positioned at different locations distributed throughout at least a portion of the shopping facility and detected by the motorized transport unit. Based on the code information relative to the mapping, a location of the first machine readable code within the shopping facility can be identified. The location controller can use this information individually or in combination with other location information in determining, relative to the mapping of the shopping facility, the location of the motorized transport unit within the shopping facility. Again, typically multiple sources of location information are utilized, for example, determining a location as a function of at least one unique light source identifier, relative distance information and an identified location of one or more machine readable codes.

Some embodiments take into consideration communication connections with one or more wireless network access points or antennas. Information regarding which of one or more wireless network access points the motorized transport unit is wirelessly coupled with can be communicated to the location controller. This information can be communicated from the motorized transport unit or by the one or more network access points. The location controller 602 can use the connection information in determining a relative location of the motorized transport unit relative to the shopping facility mapping. For example, a trilateration and/or triangulation can be performed based on the connection information, which can include signal quality information, signal strength information and other such information about the wireless communication provided through the one or more network access points. In some instances, for example, location information can be determined by calculating one or more distances and angles between two or more reference nodes or access points whose positions are known.

Other location identifying information may be detected and/or used to determine location information and/or identify a location. For example, some embodiments utilize Bluetooth Low Energy Beacons (e.g., Bluetooth 4.0), which may provide a low energy mode in which a beacon device and/or access point emits a signal that includes a unique identifier, a major code, a minor code, a signal strength and/or other such information. For example, some embodiments employ an iOS, Android or other such beacon receivers, which can be used to determine proximity to the beacon (at an unknown, far, near or immediate distance), or to determine precise location when correlating signals from multiple beacons. Similarly, some embodiments may utilize audible, ultrasonic or other such sound beacons that transmit sound, ultrasound, etc. The sound beacon can be detected by motorized transport unit 102, a user interface unit 114 or the like through an onboard microphone and audio signal processor. Some embodiments may utilize magnetic resonance. For example, a compass or other magnetically sensitive device or system can be incorporated with the motorized transport unit 102, movable item container 104, and/or user interface unit 114 to detect variations in the magnetic fields (e.g., Earth's magnetic field, generated magnetic fields, etc.). The detected changes can be used to determine location with respect to the shopping facility's structural, positioning of magnetic field generators, and/or mapping of magnetic field variations through some or all of the shopping facility, and in some instances surrounding area(s).

Further, some embodiments utilize dead reckoning. For example, the motorized transport unit, movable item container, user interface unit, etc. can leverage onboard accelerometers to detect orientation and direction and speed of travel. As described above and further below, some embodiments utilize GPS. The motorized transport unit may include a GPS system or a smart device that enables GPS. Some embodiments may utilize video recognition as at least part of the location information that is used to determine relative location. The shopping facility may be configured to multiple cameras (within and without the shopping facility) that can be used in part to determine and/or confirm a location of the motorized transport unit, movable item container or other objects. In instances, for example, the motorized transport unit may include identifying markings (e.g., alphanumeric characters, code, coloring, etc.) that can be recognized and correlated to a location that is captured by the video camera and/or surrounding markings, products, structures and the like. In some embodiments, a visual recognition can be utilized. For example, the motorized transport unit can be configured to visually recognize its location by comparing sensor input to known image information. Typically, one or more mappings (e.g., two-dimensional, three-dimensional, grid, etc.). The two-dimensional mapping can be used to identify and/or show horizontal location, while the three-dimensional mapping can be used to identify and/or shows vertical location as some shopping facilities have multiple levels. As also introduced above, some embodiments may utilize sign posts, location tags and the like. These location sign posts, location tags, etc. (active RFID, NFC, UWB, Bluetooth, two-dimensional barcodes, images, etc.) can be placed throughout and around the shopping facility and detected by the motorized transport unit, movable item container, user interface unit and/or other devices. Again, some embodiments utilize location information from a combination of two or more of these sources, systems and/or techniques.

In some embodiments, the location controller 602 may additionally or alternatively receive information that can be used to determine location from the movable item container 104 (e.g., an interface unit or other smart unit cooperated with the movable item container). Further, in some instances, the movable item container 104 communicates with the motorized transport unit and one or both can relay information to the location controller.

FIG. 11 shows a simplified block diagram of an exemplary movable item container 1104 and/or user interface unit of a movable item container, in accordance with some embodiments. The movable item container 1104 can includes one or more control circuits 1102, one or more memory 1110, and one or more input/output (I/O) devices or interfaces 1124. Further, the movable item container may optionally also include one or more distance measurement units 1108, user interface 932, light receiver units 928, optical and/or machine readable code readers 930, movement tracker unit 1118, or a combination thereof. Further, in some embodiments, the movable item container includes one or more tags 1114 or other device that can be detected by the motorized transport unit or other systems of the shopping facility assistance system 100. In some embodiments, the tag 1114 is an RFID tag or other tag, and can in some instances provide a unique identifier of the movable item container 1104.

The control circuit 1102 of the movable item container typically comprises one or more processors and/or microprocessors. Generally, the memory 1110 stores the operational code or set of instructions that is executed by the control circuit 1102 and/or processor to implement the functionality of the movable item container 1104. In some embodiments, the memory 1110 may also store some or all of particular data that may be needed to make any of the determinations, measurements and/or communications described herein. Such data may be pre-stored in the memory or be determined, for example, from detected light, measurements, and the like, and/or communicated to the movable item container 1104, such as from the motorized transport unit, a user interface unit 114, the location controller 602, other source or combination of such sources. It is understood that the control circuit 1102 and/or processor may be implemented as one or more processor devices as are well known in the art. Similarly, the memory 1110 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 1110 is shown as internal to the movable item container 1104 and/or an interface unit cooperated with the movable item container; however, the memory 1110 can be internal, external or a combination of internal and external memory. Additionally, a power supply (not shown) is typically included to power one or more of the components, or power may be received from an external source. While FIG. 11 illustrates the various components being coupled together via a bus, it is understood that the various components may actually directly couple with the control circuit 1102 and/or one or more other components.

Generally, the control circuit 1102 and/or electronic components of the movable item container 1104 can comprise fixed-purpose hard-wired platforms or can comprise a partially or wholly programmable platform. These architectural options are well known and understood in the art and require no further description here. The motorized transport unit and/or control circuit can be configured (for example, by using corresponding programming as will be well understood by those skilled in the art) to carry out one or more of the steps, actions, and/or functions described herein.

The control circuit can be configured, in part, to provide overall control and/or coordinate operation of the components of the movable item container. For example, the control circuit can instruct and/or activate one or more transmitters, receivers, transceivers of the I/O device 1124 to communicate with the location controller 602, the central computer system 106 of the shopping facility assistance system 100, one or more the motorized transport units, user interface units 114, and the like. As another example, the control circuit may activate the light receiver unit 928, the code reader 930 or other components, which may be initiated in response to instructions from the location controller 602, a motorized transport unit, the user interface unit 114 or other device.

The distance measurement unit 1108 is configured to measure relative distances between the distance measurement unit and/or the movable item container 1104 and external objects. This distance information can be provided to the location controller and used in determining a location of the movable item container and/or a motorized transport unit cooperated with the movable item container. In some embodiments, the distance measurement unit 1108 is similar to the distance measurement unit 808 of the motorized transport unit.

In some embodiments, the distance measurement unit 1108, the light receiver unit 928, code reader 930 and movement tracker unit 1118 can be configured to operate similar to the distance measurement unit 808, the light receiver unit 804, code reader 806 and movement tracker unit 812 of the motorized transport unit 802, and provide similar distance, light source identifier, code and/or movement information.

Further, one or more of the distance measurement unit 1108, the light receiver unit 928, code reader 930 and movement tracker unit 1118 of the movable item container 1104 can be configured to operate independent of or in cooperation with one or more of the distance measurement unit 808, the light receiver unit 804, code reader 806 and movement tracker unit 812 of a motorized transport unit. For example, the light receiver unit 928 may be configured to operate in place of the light receiver unit 804 of a motorized transport unit when the motorized transport unit is cooperated with the movable item container because the sensors of the light receiver unit 804 of the motorized transport unit may be obstructed by the movable item container 1104 (e.g., the motorized transport unit may be configured to partially or fully position itself under the movable item container). Similarly, the distance measurement unit 1108 of the movable item container 1104 may be activated in response to an obstruction being detected by the motorized transport unit that is interfering with measurements by the distance measurement unit 808 of the motorized transport unit.

In some embodiments, the movable item container may optionally include an internal location controller 1116. Similar to the internal location controller 816 of a motorized transport unit, the internal location controller 1116 can be configured to determine an approximate location of the movable item container 1104 and/or provide feedback to the location controller 602. The internal location controller 1116 may take some or all of the information from one or more of the distance measurement unit 1108, the light receiver unit 928, code reader 930, and/or movement tracker unit 1118. Utilizing locally stored and/or remotely accessed mapping of the shopping facility, the internal location controller can determine and/or predict a location of the movable item container. In some instances, the locally determined location information can be compared with location information determined through the location controller 602.

In some embodiments, the user interface 932 is included and/or coupled with the movable item container, which may be used for user input, output audio and/or output display. For example, the user interface 932 may include any known input devices, such one or more buttons, knobs, selectors, switches, keys, touch input surfaces, audio input and/or displays, etc. Additionally, the user interface may include one or more output display devices, such as lights, visual indicators, display screens, etc. to convey information to a user, such as status information, location information, mapping information, product location information, product information, directions (e.g., to a product, to a parking space where customer parked, etc.), video content, other communication information (e.g., text messages), operating status information, notifications, errors, conditions, shopping list, advertising, product recommendations, video content, communications with other individuals (e.g., face time or other visual view of one or more remote individuals, shopping facility associates, etc.), and/or other such information. In some implementations, at least a portion of the user interface 932 is positioned on the movable item container to be readily viewed and accessed by the customer. For example, at least a portion of the user interface 932 may be mounted on a handle bar of the movable item container that is used by the customer to push the movable item contain through the shopping facility. In many instances, this makes the user interface 932 of the movable item container more visible and accessible to the customer than a user interface on the motorized transport unit. Accordingly, the user interface 932 cooperated with the movable item container may be used instead of the motorized transport unit when the motorized transport unit is cooperated with a movable item container.

Location parameters and/or information that can be utilized in determine a location of the motorized transport unit and/or movable item container may also be obtained and/or received from other sources. For example, in some embodiments, information may be provided by the portable user interface unit 114, from cameras and/or other sensors distributed through the shopping facility, and other such sources. As another example, one or more RFID tags may be associated with each motorized transport unit 102 and/or the movable item containers. RFID tag sensors or readers can be positioned at one or more locations within and/or exterior to the shopping facility. With knowledge of a range and/or using signal quality and strength, a general location (e.g., within a six foot radius) of the motorized transport unit or movable item container may be determined and/or used in cooperation with other information in determining a more precise location. In some instances, the user interface unit 114 may be activated by a user, for example, through the activation of application software and/or program (APP) that causes one or more cameras on the user interface unit to operate to capture images and/or video in attempts allow the user interface unit to operate similar to or the same as the light receiver unit 804 of the motorized transport unit in detecting unique light source identifiers. Similarly, the user interface unit may utilize the camera to capture images of machine readable codes that can be forwarded to the location controller and/or to operate similar to the code reader 806. Still further, the user interface unit may track a current location through GPS, triangulation or the like based on signals from and/or to one or more wireless network access points, or other such information or combinations of such information. In some instances, the user interface unit may be configured to take distance measurements that can be communicated to the location controller.

This additional information may be utilized by the location controller 602 in determining a location of the motorized transport unit and/or movable item container. Further, as described above, sensors, cameras and the like may be distributed through the shopping facility and exterior to the shopping facility. Information from the sensors and cameras can be used in determining a location of the motorized transport unit. In some instances, the motorized transport unit and/or the movable item container may include unique markings (e.g., unique numbering, color combination, and/or other such markings). Video content can be evaluated by a video processor of the location controller 602 or external to the location controller to identify the motorized transport containers and/or movable item containers within the video content. Based on the camera capturing the image and other information that may be extracted from the image (e.g., recognition of products on a shelf, other shelf identifiers (e.g., numbers or the like labeled on a top of the shelves), and other such identifiers, a location of the motorized transport unit may be determined within a margin of error. Again, the location information obtained from the video information may be used in combination with one or more other location information to obtain a more precise location of the motorized transport unit.

FIG. 12 shows a simplified flow diagram of an exemplary process 1210 of determining a location and/or controlling movement of the motorized transport unit, movable item container, customer, user interface unit 114, or other such object, in accordance with some embodiments. Below the process 1210 is described with reference to determining a location of the motorized transport unit. It will be appreciated by those skilled in the art that similar steps can be performed to determine the location of a movable item container (e.g., movable item container 104), a user interface unit 114, a customer, or the like. In step 1212, one or more communications are received at the location controller 602, which is separate and distinct from the self-propelled motorized transport unit that is located relative to a shopping facility. The communications can be received from one or more motorized transport unit, movable item containers 104, user interface units 114, video camera 118 and/or video system, or other such sources.

In step 1214, one or more unique light source identifiers and/or other location information (e.g., area identifier, grid identifier, map coordinate information, grid coordinate information, etc.) are obtained from the communications. Typically, the light source identifiers each exclusively correspond to one light source within the shopping facility from light emitted by the light source, and obtained from the light detected by the motorized transport unit, movable item container, user interface unit, etc. As described above, in some embodiments the light from the one or more light sources is detected through a light receiver unit of the motorized transport unit, and the unique light source identifier from the detected light of each light source is extracted at the motorized transport unit. In some embodiments, relative distance information is additionally or alternatively obtained from the communications. The distance information can include one or more distance measurements determined by the motorized transport unit through an optical measurement corresponding to a distance between the motorized transport unit and an external object. For example, the relative distance between the motorized transport unit and the external object can be determine through a distance measurement unit of the motorized transport unit. The external object can be substantially any object, such as a shelf, rack, customer, movable item container, wall, and the like. Additionally or alternatively, in some embodiments code information is obtained from the communications or separate communications. The code information corresponds to one or more machine readable codes of a plurality of unique machine readable codes positioned at different locations distributed throughout at least a portion of the shopping facility and detected by the motorized transport unit, the movable item container 104, the user interface unit 114 or the like. For example, the machine readable code can be optically read through a machine readable code reader of the motorized transport unit, and the code information can be identified and/or extracted at the motorized transport unit. The motorized transport unit can transmit the communications comprising the light source identifier, the relative distance, the code information, and/or other information, and typically a combination of two or more of such information.

In step 1216, the at least one unique light source identifier and/or the relative distance information are processed relative to a mapping of the shopping facility. In some embodiments, a location of the one or more machine readable codes is identified based on the identified code information relative to the mapping. The location of the one or more machine readable codes can be interior to the shopping facility, but in some instances may be exterior to the shopping facility. In step 1218, a location is determined, in response to the processing, of the motorized transport unit within the shopping facility as a function of the at least one unique light source identifier and the relative distance information. Some embodiments, in determining the location of the motorized transport unit further determine, relative to the mapping of the shopping facility, the location of the motorized transport unit within the shopping facility as a function of a combination of at least two of: the one or more unique light source identifiers, the relative distance information and the identified location of the one or more machine readable codes.

In some embodiments, the location controller 602 and/or the central computer system 106 determine, relative to the mapping and the determined location of the motorized transport unit, one or more movement commands to control movement of the motorized transport unit to cause the motorized transport unit to move in a desired direction. The one or more movement commands can be communicated (e.g., wirelessly transmitted) to the motorized transport unit to cause the motorized transport unit to control its movements in accordance with the movement commands. Further, some embodiments determine a destination location within the shopping location. A route or path can be identifying, relative to the mapping, between the determined location of the motorized transport unit and the destination location. One or more movement commands can be determined to control movement of the motorized transport unit to cause the motorized transport unit to move to the destination location, which can be in accordance with the determined route. The one or more movement commands can be transmitted to the motorized transport unit to cause the motorized transport unit to control its movements in accordance with the movement commands. For example, a communications transceiver can be activated to transmit one or more movement commands (e.g., the control circuit 702 of the location controller and/or the central computer system 106 of the shopping facility assistance system 100 can cause a transceiver to communicate one or more commands).

In some embodiments, the motorized transport unit receives light source identifiers and/or location transmissions from one or more light sources (e.g., LED lights) through the light receiver unit 804 (e.g., a photo eye, one or more photodiodes, etc.). The light source identifiers and/or location information can be sent to the location controller 602. Further, in some embodiments, the customer's mobile user interface unit 114 activates a camera, photo eye, photodiode array, etc. to detect and/or receive light source identifiers and/or location transmissions from the light sources, which can also be communicated (e.g., Wi-Fi, Bluetooth, cellular) to the location controller 602. The motorized transport unit, the movable item container 104, user interface unit 114 or the like can read one or more machine readable codes 1012, signposts, location tags or the like to obtain code information and/or receive relevant location information or data.

In some implementations, the location controller 602 links a customer to a motorized transport unit and/or movable item container. A map can be displayed on the motorized transport unit, movable item container and/or the customer's mobile user interface unit 114 (e.g., through an APP) indicating where the customer is currently located and where the motorized transport unit and/or movable item container is currently located. As described above, orientation information can be determined by the motorized transport unit through the use of GPS, compass, gyroscope, motion tracking and the like. The location controller can determine a route between the customer and the motorized transport unit, a desired destination, a desired product and the like, and using the shopping facility mapping can issue commands to navigate one or both of the customer and the motorized transport unit towards each other, which may be based upon a determined most efficient pathway, based on directing a customer through relevant portions of the shopping facility (e.g., based on products), or the like. In some embodiments, the motorized transport unit incorporates semi-autonomous location services based on, for example, Simultaneous Location and Mapping (SLAM) algorithms or similar services. Location data is typically continuously updated by analyzing sensory input and comparing to available map data. The resulting self-maintained location data can improve accuracy and provide a level of fault tolerance.

In some embodiments, the shopping facility and/or the location controller have certain authorized areas designated for the motorized transport unit. Accordingly, when a customer enters such an area that the motorized transport unit is prohibited from entering the motorized transport unit will, in some instances, wait for the customer to leave the prohibited area, and may notify the customer as the customer enters those areas that it is prohibited from entering that area.

Some embodiments establish geographic location capabilities for the motorized transport unit, the movable item container, the customer, user interface unit 114, or other devices or objects at the shopping facility. Further, some embodiments utilize and/or establish a mapping of light sources (e.g., LED light transmissions) to a two-dimensional map of the shopping facility, and potentially surrounding areas (e.g., parking lot, loading dock, delivery bay, and the like). Further, objects within an area may also be mapped and associated with relevant and/or proximate light sources or illumination areas 918. Devices that receive light source transmissions (e.g., motorized transport unit, movable item container, user interface units 114, etc.) are able to transmit back the light source identifier or location number to the location controller 602. Using this light source identifier information, the location controller can identify a relevant location on a two-dimensional map and/or grid map.

The determined location of one or more motorized transport units, movable item containers, customers, shopping facility colleagues, associates and other objects allows the location controller to know where they are located, and/or allow find each other motorized transport units, movable item containers, customers, shopping facility colleagues and associates to find each other. In some instances, multiple motorized transport units, movable item containers, customers, shopping facility colleagues and/or associates can be configured and instructed to cooperatively work together (e.g., as a team) to accomplish tasks that are assigned. In some embodiments, it is beneficial when the motorized transport units know where a customer associated to that motorized transport unit is located relative to a location of the motorized transport unit, and/or where one or more other motorized transport units, movable item containers, associates, etc. are located. For example, an instruction may be broadcasted to multiple motorized transport units, and the motorized transport unit or units nearest the project to be performed can accept the task or tasks for which it is best suited, based on its proximity or capability for the work. In other embodiments, the location controller 602 and/or the central computer system 106 of the shopping facility assistance system 100 can identify a task to be performed, and with knowledge of current locations of motorized transport units and their relevant capabilities can select and assign one or more specific motorized transport units to perform the desire task or tasks. In some implementations, multiple motorized transport units will be stationed throughout the shopping facility (inside, in the parking lot, in a storage area, at a loading dock, etc.), waiting for commands or instructions, or roaming assigned areas attempting to locate tasks to be performed. Accordingly, in some embodiments, the motorized transport units comprise high functionality and/or progressively intelligent systems with capabilities integrating "smart devices", Internet, cellular communication services, indoor and outdoor location determination technology, and many other features providing safe and fun customer, member, colleague, associate interaction. Further, in some embodiments, the location controller 602, the motorized transport unit and/or the movable item container are capable of determining a location through geo-location technology, a central computer system, video analytics, three-dimensional mapping, two-dimensional shopping facility mapping and/or other such information.

Further, the motorized transport unit and the movable item containers may be configured for used both inside and outside of the shopping facility. According, the location controller utilizes relevant location information from one or more of the motorized transport units, movable item containers, user interface units 114, sensors, video data, or other such information and typically a combination of such information to support precise indoor and outdoor positioning. Outdoor positioning may take advantage of GPS, Standard Positioning Service (SPS) as well as other location information. The nominal accuracy of GPS and/or SPS receivers, however, is often within a margin of error of +/−3 meters. As such, some embodiments utilize additional location information acquired through one or more cost-effective position augmentation systems. As described above, one or more of these cost-effective position augmentation systems can be incorporated into the motorized transport unit, movable item container, user interface unit 114 and other such devices. The location determination in part allows for precision control of the motorized transport units, and can further enhance guided tracking, movement commands, obstacle avoidance (e.g., people, vehicles, other carts, trash cans, curbs, etc.), and other such control.

The location determination, in some embodiments further determined a current environment in which the motorized transport unit is positioned (e.g., based on a map). Further, a position within the environment (e.g., indoor, outdoor, gardening section, etc.) can be determined. In some embodiments, an orientation of the motorized transport unit and/or the customer are considered (e.g., north, south, east, west, etc.). Similarly, a direction of travel and/or speed may be considered. Some embodiments additionally consider how far away the motorized transport unit is away from an assigned or associated customer, colleague, associate, etc. (e.g., customer, colleague, or associate may be moving about the shopping facility). In some embodiments, a destination may further be taken into consideration in location determination, predication and/or routing. Some embodiments take into consideration potential errors and/or error conditions (e.g., positioning errors, mapping inaccessible or is incorrect, communication errors, etc.). The location determination typically takes into consideration two or more types of location information. For example, the location controller 602 can consider location information based on visible light communication, Bluetooth low energy beacons, audible beacons, ultrasonic beacons, magnetic resonance, dead reckoning, GPS, Nationwide Differential GPS (NDGPS), Wide Area Augmentation System (WAAS), video recognition, two-dimensional and/or three-dimensional maps, Near Field Communications (NFC), Ultrawide Band (UWB), Radio Frequency Identification (RFID), trilateration and/or triangulation, Received Angle of Arrival (RAOA), sign posts and/or location tags (e.g., active RFID, NFC, UWB, Bluetooth, two-dimensional barcodes, images, etc.), and other such location information.

Figure 13:
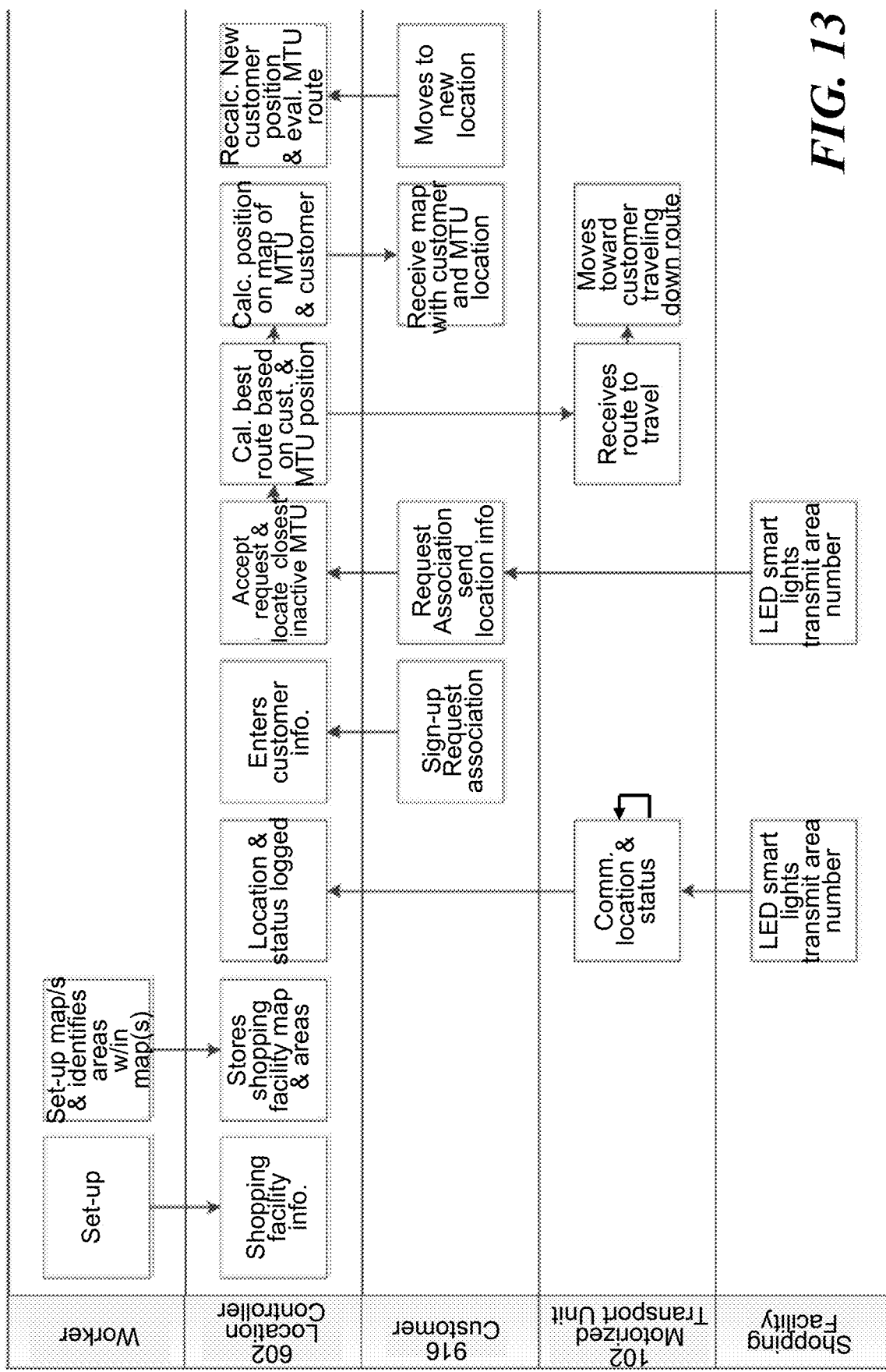
FIG. 13 shows simplified exemplary processes that may be utilized in determining a location of at least a motorized transport unit, in accordance with some embodiments.

FIG. 13 shows simplified exemplary processes that may be utilized in determining a location of at least a motorized transport unit, in accordance with some embodiments. Motorized transport units are obtained and configured for operation at the shopping facility. This can include programming, registering and/or other set-up. Typically, the location controller 602 and/or the central computer system 106 store relevant information about each motorized transport unit (e.g., unique identifier information, naming, communication protocols and/or set-up information, and other such information). Shopping facility mapping information is stored and accessible by the location controller 602 and/or the control circuit. In some instances, a shopping facility associate obtains and/or sets up the shopping facility mapping, which may include performing measurements, utilizing one or more motorized transport units to provide distance and/or measurements, and other such information.

In operation, the motorized transport unit obtains location information, such as detecting light source identifiers, communications from light sources, distance measurement information, code and/or image recognition information, or other such information, and typically a combination of such information. This location information is communicated to the location controller 602 and utilized to determine a location of the motorized transport unit, at least with respect to the shopping facility mapping information.

The central computer system 106 further receives requests from customers to sign up to use the motorized transport unit and/or request to be associated with a motorized transport unit. In some implementations a user submits the registration and/or request through an APP on the customer's mobile user interface unit 114. Additionally or alternatively, a kiosk or other such system may be provided at the shopping facility to allow the customer to register. Similarly, the customer may register through a remote user interface unit, such as a home computer, and may in some implementations reserve a motorized transport unit.

As described above, in some embodiments the customer's user interface unit 114 (and/or other devices such as the movable item container 104) may detect and/or acquire location information. For example, the one or more cameras of a user interface unit may be activated through and APP to detect light source identifiers and/or communications from light sources. Similarly, the user interface unit may capture video that may be forwarded to the motorized transport unit and/or location controller, which may be used in determining a location of the user interface unit and/or the motorized transport unit. Further, some embodiments determine a location of the customer upon receiving a request to be associated with and use a motorized transport unit. As such, the customer's user interface unit can provide relevant location information (e.g., GPS, light source identifiers, triangulation, other such information, or combinations of such information). The location controller can utilize this information to determine a location of the motorized transport device and/or the customer. In some instances, the location controller determines a route or path between the motorized transport unit and the customer. The route may be configured to direct the customer through areas of the shopping facility that may be of more interest to the customer and/or where products are placed that the customer is more likely to purchase. The location controller can provide relevant information, such as directions, movement commands, mapping coordinate information, animation information to be displayed and/or other such information to the customer's user interface unit and/or the motorized transport unit in an effort to bring the customer and the associated motorized transport unit together. As the customer and/or the motorized transport unit move through the shopping facility, the location information is automatically and typically continuously updated. Further, the location controller can update a determined location of the motorized transport unit and/or the customer, update routes, redirect one or both the customer and the motorized transport unit, and take other actions.

Further, in some instances, the location information may be updated over time. For example, the mapping can be updated based on repeated information and/or the determination of object within the shopping facility. Errors may be identified relative to location information and modifications made to correct or compensate for such errors. Other modifications can be made over time in attempts to enhance the location determination. In some instances, for example, the location controller can adjust a mapping based on repeated location information obtained from one or more motorized transport units.

The determined location supports many situations, including shopping, stocking, delivering, searching, alerting, and communicating. It has been recognized that, in at least some instances, it can be beneficial to provide mobility support for customers, shopping facility associates and the like. Utilizing the determined location information, more precise control can be provided to at least the motorized transport unit, and provide can take improve the shopping experience and/or self-service shopping to new levels of convenience. It can further provide increases in productivity in a shopping facility distribution center, and/or the like enabling teams to carry out more value add activities.

It is noted that the above description generally refers to shopping facilities; however, it will be appreciated by those skilled in the art that the location determination and/or control is not limited to shopping facilities, but can be extended to other facilities, such as distribution centers, shopping home office campuses or the like.

In some embodiments, apparatuses and methods are provided that provide control over movement of a motorized transport unit within a shopping facility. In some embodiments, an apparatus providing control over movement of a motorized transport unit within a shopping facility, comprises: a location controller separate and distinct from a self-propelled motorized transport unit, wherein the location controller comprises: a transceiver configured to receive communications from the motorized transport unit located within a shopping facility; a control circuit coupled with the transceiver; a memory coupled to the control circuit and storing computer instructions that when executed by the control circuit cause the control circuit to perform the steps of: obtain, from the communications received from the motorized transport unit, a unique light source identifier of a light source within the shopping facility detected by the motorized transport unit from light emitted by the light source, and relative distance information determined by the motorized transport unit through an optical measurement corresponding to a distance between the motorized transport unit and an external object; process the at least one unique light source identifier and the relative distance information relative to a mapping of the shopping facility; and determine, in response to the processing, a location of the motorized transport unit within the shopping facility as a function of the at least one unique light source identifier and the relative distance information.

In some embodiments, the control circuit is further configured to: obtain, from the communications from the motorized transport unit, first code information corresponding to a first machine readable code of a plurality of unique machine readable codes that are positioned at different locations distributed throughout at least a portion of the shopping facility and detected by the motorized transport unit; identify, based on the first code information relative to the mapping, a location of the first machine readable code within the shopping facility; and determine, relative to the mapping of the shopping facility, the location of the motorized transport unit within the shopping facility as a function of the at least one unique light source identifier, the relative distance information and the identified location of the first machine readable code. In some embodiments, the control circuit is further configured to: determine, relative to the mapping and the determined location of the motorized transport unit, one or more movement commands to control movement of the motorized transport unit to cause the motorized transport unit to move in a desired direction; and cause the transceiver to transmit the one or more movement commands to the motorized transport unit to cause the motorized transport unit to control its movements in accordance with the movement commands. In some embodiments, the control circuit is further configured to: determine a destination location within the shopping location; identify, relative to the mapping, a route between the determined location of the motorized transport unit and the destination location; identify one or more movement commands to control movement of the motorized transport unit to cause the motorized transport unit to move to the destination location; and cause the transceiver to transmit the one or more movement commands to the motorized transport unit to cause the motorized transport unit to control its movements in accordance with the movement commands. In some embodiments, the control circuit, in obtaining the at least one unique light source identifier, is further configured to obtain from the communications multiple unique light source identifiers detected by the motorized transport unit from light emitted from multiple separate light sources simultaneously impinging on a detector of the motorized transport unit; wherein the control circuit in determining the location of the motorized transport unit is further configured to determine the location of the motorized transport unit as a function of the multiple unique light source identifiers. In further embodiments, the control circuit, in determining the location of the motorized transport unit is further configured to identify, relative to the mapping, a location of an overlapping light area of the light emitted from the multiple light sources wherein the multiple light sources are ceiling mounted overhead lights. In some embodiments, the apparatus further comprises: the motorized transport unit located within the shopping facility, wherein the motorized transport unit comprises: a light receiver unit configured to detect the light from the light source within the shopping facility and extract the unique light source identifier from the detected light; a distance measurement unit comprising a light emitter and a light detector, wherein the distance measurement unit is configured to determine the relative distance from the light emitter to the external object; and a communication transmitter configured to transmit the communications comprising at least the light source identifier and the relative distance. In further embodiments, the motorized transport unit further comprises a machine readable code reader configured to optically read a first machine readable code of a plurality of unique machine readable codes that are positioned at different locations distributed throughout at least a portion of the shopping facility; wherein the control circuit is further configured to: obtain, from the communications from the motorized transport unit, the first code information; identify, based on the first code information relative to the mapping, a location of the first machine readable code within the shopping facility; and determine, relative to the mapping of the shopping facility, the location of the motorized transport unit within the shopping facility as a function of the at least one unique light source identifier, the relative distance information and the identified location of the first machine readable code. In some embodiments, the control circuit, in determining the location of the motorized transport unit, is further configured to: obtain an additional unique light source identifier from light emitted by an additional light source within the shopping facility and detected by a light receiver unit positioned on a movable item container removably coupled with the motorized transport unit configured to be moved by the motorized transport unit through at least a portion of the shopping facility; process the additional unique light source identifier and determine, relative to the mapping, a location within the mapping of a light pattern of the additional light source; and determine, in response to the processing, the location of the motorized transport unit within the shopping facility as a function of the at least one unique light source identifier, the relative distance information and the location within the mapping of the light pattern.

In some embodiments, an apparatus providing control over movement of a motorized transport unit within a shopping facility, comprises: a self-propelled motorized transport unit within a shopping facility, wherein the motorized transport unit comprises: a light receiver unit configured to detect light from one or more external light sources within a shopping facility and extract at least one unique light source identifier from the detected light; a distance measurement unit comprising a light emitter and a light detector, wherein the distance measurement unit is configured to determine, as a function of light detected from the light emitter, a relative distance from the light emitter to one or more remote objects; a control circuit; and a memory coupled to the control circuit and storing computer instructions that when executed by the control circuit cause the control circuit to control movement of the motorized transport unit as a function of a location of the motorized transport unit determined relative to a mapping of the shopping facility and based on the at least one light source identifier and the relative distance.

In some embodiments, the motorized transport unit further comprises a machine readable code reader configured to read a first machine readable code of a plurality of unique machine readable codes that are positioned at different locations distributed throughout at least a portion of the shopping facility, and to extract a first code information corresponding to the first machine readable code; wherein the control circuit in controlling the movement of the motorized transport unit is further configured to control the movement of the motorized transport unit as a function of the location of the motorized transport unit determined based on a location of the first machine readable code relative to the mapping and the at least one light source identifier and the relative distance. In some embodiments, the motorized transport unit further comprises: a communication transceiver configured to transmit the at least one light source identifier and the relative distance, and to receive one or more commands from a location controller that is separate and remote from the motorized transport unit and configured to determine the location of the motorized transport unit relative to the mapping as a function of the at least one light source identifier and the relative distance; and wherein the control circuit is further configured to implement the one or more commands to move the motorized transport unit in accordance with the one or more commands. In further embodiments, the motorized transport unit is incapable of determining its own location and is dependent on the one or more commands from the location controller. In further embodiments, the apparatus further comprises: the location controller separate from the motorized transport unit, wherein the location controller comprises: a transceiver configured to receive the at least one light source identifier and the relative distance; a second control circuit coupled with the transceiver; a second memory coupled to the second control circuit and storing computer instructions that when executed by the second control circuit cause the second control circuit to perform the steps of: process the at least one light source identifier and the relative distance relative to a mapping of the shopping facility; determine, in response to the processing the at least one light source identifier and the relative distance, the location of the motorized transport unit within the shopping facility; and identifying the one or more commands as a function of the determined location of the motorized transport unit. In some embodiments, the control circuit is further configured to perform the steps of: process the at least one light source identifier and the relative distance relative to a mapping of the shopping facility; determine, in response to the processing the at least one light source identifier and the relative distance, the location of the motorized transport unit within the shopping facility.

In some embodiments, a method of controlling movement of a motorized transport unit within a shopping facility, comprises: receiving, at a location controller separate and distinct from a self-propelled motorized transport unit located within a shopping facility, communications from the motorized transport unit; obtaining from the communications a unique light source identifier of a light source within the shopping facility detected by the motorized transport unit from light emitted by the light source, and relative distance information determined by the motorized transport unit through an optical measurement corresponding to a distance between the motorized transport unit and an external object; processing the at least one unique light source identifier and the relative distance information relative to a mapping of the shopping facility; and determining, in response to the processing, a location of the motorized transport unit within the shopping facility as a function of the at least one unique light source identifier and the relative distance information.

In some embodiments, the method further comprises: obtaining, from the communications received from the motorized transport unit, first code information corresponding to a first machine readable code of a plurality of unique machine readable codes positioned at different locations distributed throughout at least a portion of the shopping facility and detected by the motorized transport unit; and identifying, based on the first code information relative to the mapping, a location of the first machine readable code within the shopping facility; wherein the determining the location of the motorized transport unit further comprises determining, relative to the mapping of the shopping facility, the location of the motorized transport unit within the shopping facility as a function of the at least one unique light source identifier, the relative distance information and the identified location of the first machine readable code. In some embodiments, the method further comprises: determining, relative to the mapping and the determined location of the motorized transport unit, one or more movement commands to control movement of the motorized transport unit to cause the motorized transport unit to move in a desired direction; and transmitting the one or more movement commands to the motorized transport unit to cause the motorized transport unit to control its movements in accordance with the movement commands. In some embodiments, the method further comprises: determining a destination location within the shopping location; identifying, relative to the mapping, a route between the determined location of the motorized transport unit and the destination location; identifying one or more movement commands to control movement of the motorized transport unit to cause the motorized transport unit to move to the destination location; and transmitting the one or more movement commands to the motorized transport unit to cause the motorized transport unit to control its movements in accordance with the movement commands. In some embodiments, the method further comprises: detecting, through a light receiver unit of the motorized transport unit located within the shopping facility, light from the light source within the shopping facility; extracting, at the motorized transport unit, the unique light source identifier from the detected light; determining, through a distance measurement unit of the motorized transport unit, the relative distance between the motorized transport unit and the external object; and transmitting, from the motorized transport unit, the communications comprising at least the light source identifier and the relative distance. In some embodiments, the method further comprises: optically reading, through a machine readable code reader of the motorized transport unit, the first machine readable code; extracting, at the motorized transport unit, the first code information; and wherein the transmitting, from the motorized transport unit, the communications comprises transmitting the communications comprising at least the light source identifier, the relative distance, and the first code information.

In accordance with some embodiments, further details are now provided for one or more of these and other features. A system and method for mapping a shopping space is provided herein.

An MTU system may include a progressively intelligent system with capabilities of integrating 3D and 2D store mapping with physical locations of objects, colleagues, and associates. In some embodiments, once the central computer system maps all objects to specific locations using measurements and an indoor positioning systems (including those based on video analytics, visual light communications, WiFi, Bluetooth, Audio, Ultrawideband or other techniques), grids are applied to section the map into access ways and blocked sections. The system and the MTU may use these grids for navigation and environment recognition.

Grid units organize areas into blocked and open areas such that the automated processes can avoid using complicated methods to evaluate areas with overlapping boundaries. In some embodiments, grid units provide a more efficient and effective way of transitioning from a 2D horizontal map to a 3D vertical and horizontal map by way of grid section association. Both the 2D and 3D maps are associated to a grid section which ties the maps together. Both maps are based upon the layout and dimensions of the physical store. These maps are then used to guide MTUs, customers, store associates, and/or colleagues.

Real store positioning, 2D maps, and 3D maps may be integrated and aligned with a grid division into blocked and open sections using area identification based on indoor positioning systems and point cloud measurements. These grid units may then be identified as either blocked or open areas. Blocked sections may then be identified based on what objects they contain. Open areas are identified as open floor space for 2D models or open air space in 3D models. A partially blocked section may be considered a blocked section until a smaller grid is applied to further subdivide the grid section.

3D scanning and Computer Aided Design (CAD) models may be built for a shopping space. When 3D scanning is performed, the models of the point clouds from the scans may be used as input into a CAD program. Scalable 2D CAD maps of the store may also be entered into the Central Computer System (CCS). A grid may be placed over the CAD maps at the level of determining objects and travel paths for MTUs. The system may compute all possible travel path dimensions from a scalable model. LED smart lights may be installed that transmit a number to allow MTUs to determine their location in the shopping space. Measurements of the exact location of each indoor positioning beacon (e.g., LED smart light, Bluetooth beacon, audio beacon, etc.) may be recorded by MTUs to determine their position within the store grid. A smart device may then be used to detect the range of the indoor positioning beacon transmission to identify the circle area of the reception of the beacon's serial number. Each position within the store may then be measured, calculated, and designated based on the store CAD map. Once the radius for each individual light is calculated, the combination of radii may then be measured using the same smart device. Using these intersections of multiple LED transmission a refined area may be calculated narrowing the sections to fit the grid for making the MTU path of travel within the measurements from the CAD map. The system may use the point cloud from the 3D maps to align the 2D map with the 3D map using digital measurements. These 3D digital measurements may be used to confirm the accuracy of the 2D map when the 3D map is from an actual scan of the shopping space while the 2D maps built using CAD programs.

From an enhanced grid map, pathways may be calculated and established with more precision as to which areas a MTU can travel through and which areas are off limits. Using the CAD and grid method, a MTU in each section can determine whether it can go front or back, left or right, or if certain directions are blocked. The grid blocks around a MTU may be checked to determine which directions the MTU can travel towards on the fly.

Using the grid method for movement provides MTU with a navigational path that can be adjusted within a close (e.g. 6 inch) tolerance of a blocked object. A MTU may otherwise maintain a straight path within a grid block. Where there are partially blocked grid sections and there is a need to enter the partially blocked area, these grid sections may be further divided into sub-grid sections enabling a more precise sectioned area for navigation. The system may accomplish this by applying a grid at a smaller level of measurement granularity to the grid.

Figure 14:
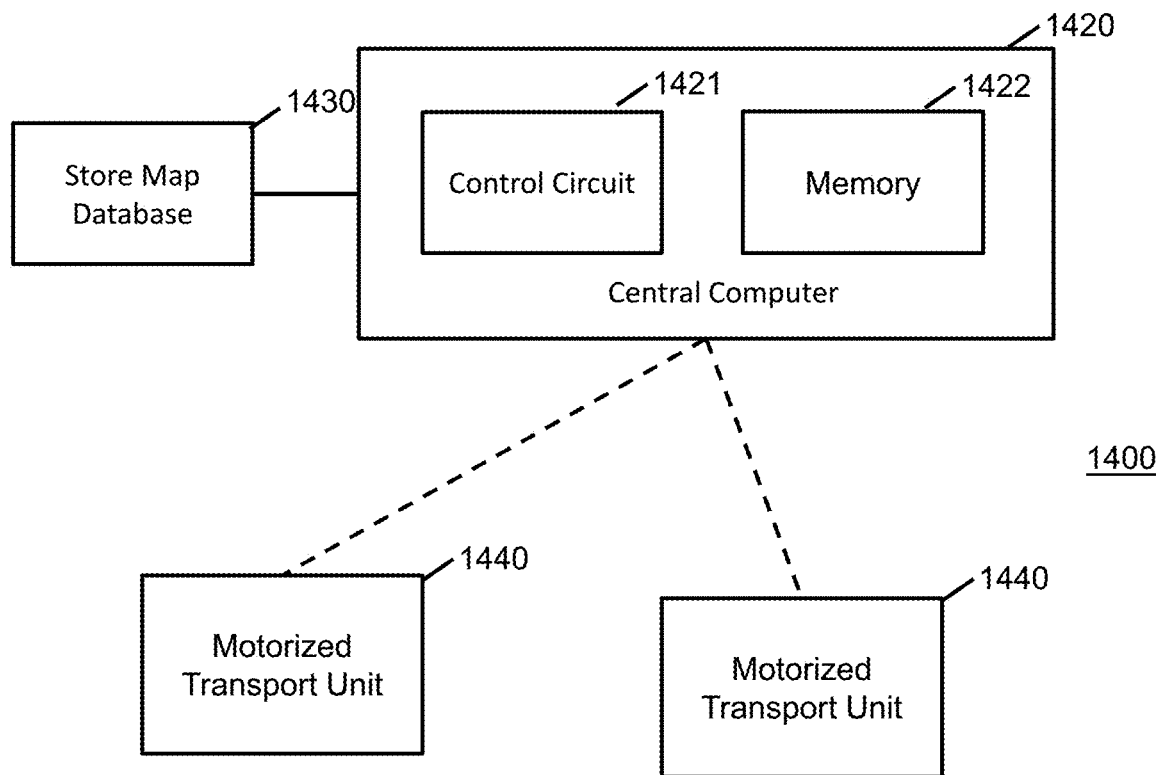
FIG. 14 comprises a block diagram of a system for mapping a shopping space in accordance with some embodiments.

FIG. 14 illustrates a block diagram of a shopping space mapping system 1400, similar to that of FIG. 1, as configured in accordance with various embodiments of the disclosure. The shopping space mapping system 1400 includes a central computer system 1420, a store map database 1430, and a number of motorized transport units 1440 each configured to perform various tasks in a shopping space based on instructions provided by the central computer system 1420. The shopping space mapping system 1400 may include or be implemented at least partially with one or more components shown in FIGS. 1, 4, and 5.

The central computer system 1420 includes a control circuit 1421 and a memory 1422, and may be generally referred to as a processor-based device, a computer, a server, and the like. In some embodiments, the central computer system 1420 may be implemented with one or more of the central computer system 106 and/or the computer device 500 described above. For example, the functionalities of the central computer system 1420 described herein may be implemented as one or more software modules and/or hardware modules in the central computer system 106.

The central computer system 1420 has stored on its memory 1422, a set of computer readable instructions that is executable by the control circuit 1421 to cause the control circuit 1421 to map a shopping space and generate and/or modify information associated with a map of the shopping space stored in the store map database 1430. The control circuit 1421 may be further configured to instruct the motorized transport unit 1440 to navigate through the shopping space based on the map information stored in the store map database 1430.

In some embodiments, the central computer system 1420 may be located inside of and serve a specific shopping space. In some embodiments, the central computer system 1420 may be at least partially implemented on a remote or cloud-based server that provides store map information to a store server and/or MTUs in one or more shopping spaces.

The store map database 1430 may generally be implemented by any non-transitory storage medium. While the store map database 1430 and the memory 1422 as shown are separate element in FIG. 14, in some embodiments, the store map database 1430 and the memory 1422 may be implemented with the same physical device(s). In some embodiments, the store map database 1430 may be implemented with one or more of the database 126, memory 110, and memory 504 described with reference to FIGS. 1 and 5 above. In some embodiments, the store map database 1430 may store maps for two or more shopping spaces. The store map database 1430 may be coupled to the central computer system 1420 via one or more of a local, wired, wireless, and networked connection.

Each motorized transport unit 1440 may be the MTU 102 described in FIG. 1, the MTU shown in FIGS. 2A-3B, and/or the MTU 402 described in FIG. 4. Generally, a MTU 1440 may be a motorized device configured travel in a shopping space according to instructions received from a central computer system 1420. In some embodiments, MTUs 1440 include one or more sensors for determining its location within the shopping space. For example, each MTU 1440 may include GPS sensors and/or sensors for receiving LED transmission from smart LED lights amounted throughout the shopping space. In some embodiments, the MTU 1440 may include other input and out devices such range sensors and optical sensors for gathering information from its surrounding.

The central computer system 1420 may further be communicatively coupled to a set of sensors (not shown). Sensors may include one or more of optical sensors, image sensors, the location detection system 116, the video camera system 118, and sensors on MTUs 120 described with reference to FIG. 1 above. Generally, the sensors are configured to provide the central computer system 1420 information to determine whether one or more sections of a shopping space can be accessed by MTUs. For example, the sensors may be a set of cameras for providing images of various sections of a shopping space to the central computer system 1420. The central computer system 1420 may analyze the images captured by the cameras and determine whether there are obstructions that make one or more area of the shopping space inaccessible to MTUs. For example, an image may show pallets, shopping carts, customers, etc. that blocks a path in the shopping space. The cameras may be stationary cameras mounted in the shopping space and/or may include cameras on the MTUs and/or user interface devices. The sensors may communicate with the central computer system through any wired or wireless communication devices.

Figure 15:
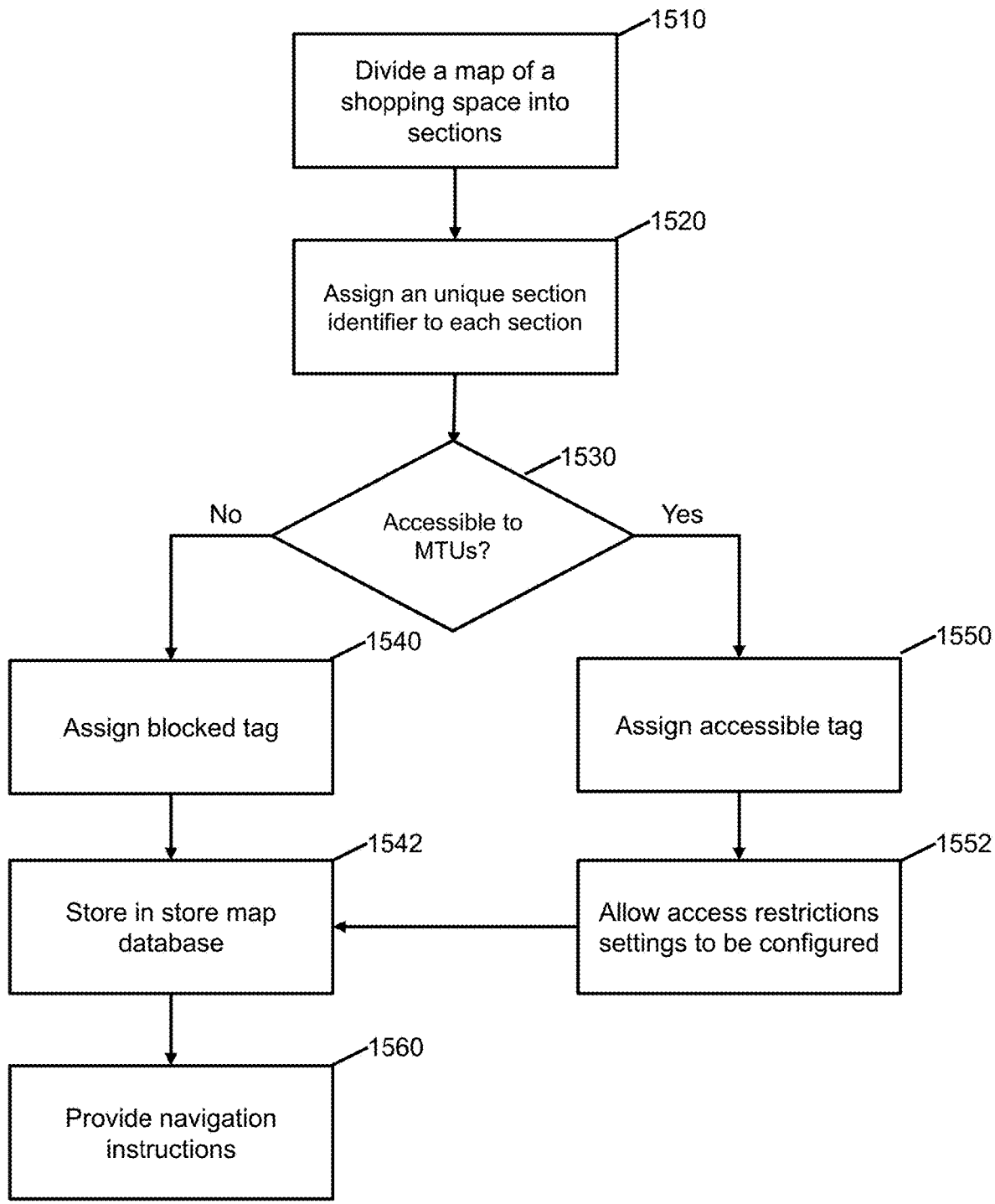
FIG. 15 comprises a flow diagram of a method for mapping a shopping space in accordance with some embodiments.

FIG. 15 shows a flow diagram of a process for mapping a shopping space in accordance with various embodiments of these teachings. The steps shown in FIG. 15 may be performed by one or more of the central computer system 1420 in FIG. 14, the central computer system 106 in FIG. 1, and the computer device 500 in FIG. 5. In some embodiments, the steps are performed by a process-based device executing a set of computer readable instructions stored on a memory device. In some embodiments, one or more of the steps may also be performed by a software program that provides a user interface for interacting with the information stored in a store map database. Generally, the steps shown in FIG. 15 are performed by a control circuit of a processor-based device.

In step 1510, the system divides a map of a shopping space into sections. The map of the shopping space may be based on one or more 2D images and/or one or more 3D scans of the actual shopping space. 2D images and 3D scans may be captured by one or more of stationary, mobile, and MTU mounted image sensors. In some embodiments, a 3D scanning device may be used to capture 3D layout of the shopping space. In some embodiments, the map of the shopping space may include a CAD model of the shopping space. In some embodiments, the map may be divided into a plurality of equal sized grid cells in step 1510. In some embodiments, the store may be divided based on coordinates of a positioning system. For example, the shopping space may have a plurality of indoor positioning beacons each transmitting a unique code that can be used by MTUs to determine its location. Each section may approximately correspond to an indoor positioning system beacon's transmission area. In some embodiments, the store map may be divided into sections based on existing structures and fixtures such as pillars, walls, shelves, etc. in the shopping space. The system may perform image analysis of the 2D and/or 3D images to determine the locations of one or more fixtures in a shopping area and use the boundaries of the fixtures as the boundaries of at least some of the sections. In some embodiments, the map of the shopping space include one or more of a retail floor, a storage area, a customer service areas, a parking lot, a restroom, a fitting room, a backroom areas, etc. In some embodiments, the map is a 3D map, and the sections are 3 dimensional blocks including locations of structures and fixtures in 3 dimensions.

In step 1520, the system assigns a unique section identifier to each section of the store map. The unique section identifier may be stored in the store map database along with location information of the section that indicates the location of each section relative to the other sections. Generally, the unique section identifier may be any alphanumeric identifier. In some embodiments, the unique section identifier may correspond to the grid coordinate of the section. In some embodiments, one or more sections may be grouped together and a unique section identifier may be assigned to the group of sections. In some embodiments, one or more sections may be divided into sub-section and a unique section identifier may be assigned to each of the sub-sections.

In step 1530, whether each section is accessible to MTUs is determined. In some embodiments, step 1530 is determined by the system using a 2D image and/or a 3D scan of the shopping space. For example, the system may identify one or more structures (e.g. walls, pillars) and/or fixtures (e.g. shelves, refrigerators, kiosks, checkout terminals) in the shopping space based on one or more images or scans of the shopping space and mark each section corresponding a structure or fixture as inaccessible to MTUs. In some embodiments, in step 1530, a section is determined to be inaccessible only if the section is physically inaccessible to any of the MTUs. In some embodiments, accessibility of sections of a store may be at least partially manually entered. For example, a user may manually mark one or more section as inaccessible in step 1530. A user may look at images of the shopping space and verify whether a section is accessible to MTUs. In some embodiments, the user may mark some sections as inaccessible to MTUs even though the section is physically accessible. For example, a user may mark the stalls that have been leased to third party vendors as inaccessible to MTUs. For each section determined to be inaccessible to MTUs in step 1530, the system assigns a blocked tag to the unique section identifier associated with that section in step 1540, and the tag is stored in the store map database in step 1542.

For each section determined to be accessible to at least some MTUs in step 1530, the system assigns an accessible tag to the unique section identifier associated with the section. In some embodiments, a section is assigned an accessible tag if the section is accessible to at least one of the MTUs that receives instructions from the system.

In step 1552, the system allows access restriction settings to be configured to each section having an accessible tag. Access restrictions may be based various conditions and characteristics associated with MTUs. In some embodiments, the access restriction may be based on time of day. For example, MTUs may be permitted to travel through checkout terminal lanes only during hours that the store is closed. In some embodiments, the access restriction may be based on the MTU's currently assigned task. A MTU may be assigned various tasks such as leading a customer, following a customer, carrying a basket, carrying a cart, carrying a passenger, scanning shelves, and cleaning up. The access restriction may, for example, allow only MTUs assigned with a cleanup task to enter restrooms and/or prohibit MTUs carrying a basket or a cart to enter restrooms. In another example, if a section corresponds to a narrow pathway, the access restriction may only allow MTUs not carrying a cart or a basket to pass through. In yet another example, the access restriction may prevent MTUs escorting a customer from entering employee only areas or going into the parking lot prior to the conclusion of the shopping trip. In some embodiments, the access restrictions may be based on the MTU's capability. For example, the access restriction may permit only MTU's with cleaning capability to enter restrooms, and MTU's with shopping cart coupling capability to enter the shopping cart storage area. In some embodiments, the access restriction may be based on whether and who the MTU is assigned to. For example, a section corresponding to a backroom storage area may be accessible only to MTUs assigned to store associates and not to MTUs assigned to customers. In some embodiments, the access restrictions may be based on the area's height clearance. For example, the store map may be a 3D store map that includes height clearance information for sections of the map. The access restriction may impose a maximum height of an MTU, including any cargo it may be carrying, that can travel through that section. For example, an MTU alone, may be permitted to travel under certain display shelves or on a raised track; while a MTU coupled to a shopping cart or escorting a customer would be not permitted to travel on these routes. Generally access restrictions settings may be configured to permit or prohibit access of MTUs based one or more conditions and MTU characteristics.

In some embodiments, the access restrictions settings may be at least partially manually configured. The system may provide a user interface for store associates and/or system administrators to enter and/or modify access restrictions associated with various sections of the stores. In some embodiments, a set of default access restrictions may be associated with a section category. A user or a system may determine a category for each section or group of sections and access restrictions may be automatically assigned based on the category. For example, the system may use image analysis to identify areas of a shopping space as parking lot, restroom, storage area etc., and automatically assign access restrictions associated with those area categories to the corresponding sections. In some embodiments, the system may use image analysis to determine sections that correspond to narrow paths or low height clearance areas, and set access restrictions based on the size of the MTU and/or MTU's cargo accordingly. For example, the system may determine that a particular aisle is below a certain width (e.g. 4 feet), and permit only MTUs not carrying a shopping cart to travel through that aisle. In some embodiments, a user may manually enter and/or modify access restrictions for sections of the shopping space. In step 1542, the access restrictions for each section identifier are stored in the store map database.

In some embodiments, after step 1542, the system is further configured to monitor for accessibility of sections of the shopping space in real-time using one or more sensors in the shopping area. For example, the system may compare images of a section captured by image sensors and a baseline image of the section to determine whether there is a temporary obstruction in the section. In some embodiments, the system may further use sensors mounted on MTUs to gather real-time accessibility information. A temporary obstruction may be one or more of, a display shelf, a pallet, a spill, a customer, a shopping cart, a MTU, etc. Generally, a temporary obstruction may by any object that makes an area at least partially inaccessible to some MTUs. If an obstruction is detected, the section may be marked as temporarily inaccessible in the store map database. In some embodiments, the temporarily inaccessible sections may also include access restrictions based on one or more characteristics of the MTUs. For example, when a spill is detected, the system may mark the section as inaccessible to all MTUs except for MTUs with a cleanup task to clean the specific spill. In another example, the system may determine that an obstruction is only a partial obstruction and permit some of the MTUs to travel through. For example, a shopping cart may be partially blocking an area such that only MTUs not carrying another shopping cart can pass through. In such case, the system may mark that section as temporarily inaccessible only to MTUs carrying a shopping cart. The system may continue to monitor the access condition of the section of the shopping space and remove the temporarily inaccessible tag from the corresponding unique section identifiers when the obstruction is removed. In some embodiments, the system may only monitor real-time accessibility information in sections with an accessible tag. For example, the system may only update accessibility information for sections of the shopping space that is accessible to at least some of the MTUs.

In step 1560, the system provides navigation instructions to MTUs based on the access restriction settings of each section of the shopping space stored in the store map database. For example, prior to providing navigation instructions to a MTU, the system may verify that each section in the path of the MTU is accessible to the MTU according to one or more of time of date, the MTU type, the MTU's assigned task, the MTU's capability, etc. If at least one section is inaccessible and/or restricted to that particular MTU, the system may determine a new path for the MTU that avoids the inaccessible sections. In some embodiments, the accessibility information may further include temporary access restrictions determined in real-time. As the MTU travels through the shopping space, the system may continue to check the store map database to ensure that the MTU does not travel through any inaccessible, restricted, and/or temporarily inaccessible sections. The system may be configured to reroute the MTU in real-time to avoid these sections.

FIG. 16A illustrates a map divided in to a plurality of sections in accordance with some embodiments. In FIG. 16A, an area of the shopping space 1600 is divided into sections and each section is assigned a unique section identifier 1601-1625. Each section may correspond to a discrete area of the shopping space with accessibility information. While sections 1601-1625 are shown as equal size squares, in some embodiments each section may be of any shape and may differ in size from each other. For example, the shape of sections may track boundaries of building structures and/or fixtures. In some embodiments, one or more sections may be grouped together and the group of sections may have a unique group identifier that allows the group to share accessibility information and access restriction settings. In some embodiments, one or more sections may be further divided into subsection and each subsection may have a subsection unique identifier that can have separate accessibility information and access restriction settings.

FIG. 16B illustrates a data table storing accessibility and access restriction information associated some sections of the map 1600. In FIG. 16B, section 1608 has an inaccessible tag; as such, no access restriction settings or temporary accessibility settings are stored for section 1608. The area of the shopping space corresponding to section 1608 may include, for example, a wall, a pillar, a permanent fixture, etc. and is inaccessible to any of the MTUs. Section 1612 has an accessible tag and an access restriction setting that restricts access between 8 am-11 pm. Section 1614 has an accessible tag and an access restriction setting that restricts access of MTUs escorting a customer. Section 1604 has an accessible tag and no access restriction setting. However, section 1623 is temporarily inaccessible to MTUs carrying a cart. The temporary inaccessibility may correspond to, for example, a partially blocked pathway.

As an example, if a MTU is currently located at section 1613 and needs to travel to section 1603, the system may first check the accessibility information of the most direct route, which is through section 1608. Since the section 1608 has an inaccessible tag, the system will then find an alternate route. The system may check the time of day to determine whether the MTU can travel through section 1612 and/or whether the MTU is currently escorting a customer to determine whether the MTU can travel through section 1614. In some embodiments, the system may check all sections on a planned route (e.g. 1614, 1609, 1604, 1603) to ensure that there is a cleared route to the destination prior to instructing the MTU to begin moving in that direction. While the MTU travels through the shopping space, the system may continue to check for any temporary inaccessible conditions and reroute the MTU responsively. For example, if a route takes a MTU through section 1623 and the "inaccessible to MTUs carrying a cart" condition is detected, the MTU may be rerouted to avoid section 1623 or be instructed to wait until the blockage clears if no alternative routes are available.

The table in FIG. 16B is provided as an illustration only. In some embodiments, the accessibility information and access restriction settings can be stored in other formats without departing from the spirit of the present disclosure. For example, the access restriction may be inclusively defined (e.g. only MTU with listed characteristics can enter) or exclusively defined (e.g. all but MTU with listed characteristics can enter). In some embodiments, the restriction settings may comprise a lookup table listing every condition and MTU characteristic that can be used to configure the setting and whether a section is accessible or inaccessible for each condition and MTU characteristic which may be stored in the map database.

In some embodiments, apparatuses and methods are provided herein useful for mapping a shopping space for movable transport unit navigation. In some embodiments, a system for mapping a shopping space is provided. The system comprises a plurality of motorized transport units, a store map database for storing a map of the shopping space, and a central computer system coupled to the plurality of motorized transport units and the store map database. The central computer system being configured to divide the map of the shopping space into a plurality of sections, assign an unique section identifier to each of the plurality of sections in the shopping space, associate, in the store map database, a blocked tag with each unique section identifier corresponding to a section of the shopping space inaccessible to the plurality of motorized transport units, associate, in the store map database, an accessible tag with each unique section identifier corresponding to a section of the shopping space accessible by at least one of the plurality of motorized transport units, for each unique section identifier having an accessible tag, allow an access restriction setting to be configured for the corresponding section, and provide navigation instructions to the plurality of motorized transport units based on access restriction settings of each section of the shopping space stored in the store map database.

In some embodiments, the access restriction setting comprises a restriction based on a motorized transport unit's currently assigned task. In some embodiments, the motorized transport unit's currently assigned task comprises one or more of: lead a customer, follow a customer, carry a basket, carry a cart, carry a passenger, scan shelves, and cleanup. In some embodiments, the access restriction setting comprises a restriction based on a motorized transport unit's capability. In some embodiments, the access restriction setting comprises a restriction based on whether the motorized transport unit is assigned to a store associate or a customer. In some embodiments, the system further comprises a plurality of image sensors. In some embodiments, blocked tags and accessible tags are associated with unique section identifiers based on analyzing images captured by the plurality of image sensors. In some embodiments, the central computer system is further configured to determine whether a section of the shopping space is temporarily inaccessible to the plurality of motorized transport units based on images captured by the plurality of image sensors. In some embodiments, whether a section is temporarily inaccessible is determined based on comparing images of the section captured by the plurality of image sensor and a baseline image of the section. In some embodiments, the map of the shopping space comprises a three-dimension map.

In some embodiments, a method for mapping a shopping space is provided. The method comprises dividing, by a central computer system, the map of the shopping space into a plurality of sections, assigning an unique section identifier to each of the plurality of sections in the shopping space, associating, in the store map database, a blocked tag with each unique section identifier corresponding to a section of the shopping space inaccessible to a plurality of motorized transport units coupled to the central computer system, associating, in the store map database, an accessible tag with each unique section identifier corresponding to a section of the shopping space accessible by at least one of the plurality of motorized transport units, for each unique section identifier having an accessible tag, allowing an access restriction setting to be configured for the corresponding section, and providing navigation instructions to the plurality of motorized transport units based on access restriction settings of each section of the shopping space stored in the store map database.

In some embodiments, the access restriction setting comprises a restriction based on a motorized transport unit's assigned task. In some embodiments, the motorized transport unit's assigned task comprises one or more of: lead a customer, follow a customer, carry a basket, carry a cart, carry a passenger, scan shelves, and cleanup. In some embodiments, the access restriction setting comprises a restriction based on a motorized transport unit's capability. In some embodiments, the access restriction setting comprises a restriction based on whether the motorized transport unit is assigned to a store associate or a customer. In some embodiments, the method further comprises associating blocked tags and accessible tags with unique section identifiers based on analyzing images captured by a plurality of image sensors coupled to the central computer system in the shopping space. In some embodiments, the method further comprises determining, by the central computer system, whether a section of the shopping space is temporarily inaccessible to a motorized transport unit based on images captured by a plurality of image sensors coupled to the central computer system in the shopping space. In some embodiments, the method further comprises determining whether a section is temporarily inaccessible based on comparing images of the section captured by the plurality of image sensor and a baseline image of the section. In some embodiments, the map of the shopping space comprises a three-dimension map.

In some embodiments, an apparatus for mapping a shopping space is provided. The apparatus comprising a non-transitory storage medium storing a set of computer readable instructions, a control circuit configured to execute the set of computer readable instructions which causes to the control circuit to: divide the map of the shopping space into a plurality of sections, assign an unique section identifier to each of the plurality of sections in the shopping space, associate, in a store map database, a blocked tag with each unique section identifier corresponding to a section of the shopping space inaccessible to a plurality of motorized transport units, associate, in the store map database, an accessible tag with each unique section identifier corresponding to a section of the shopping space accessible by at least one of the plurality of motorized transport units, for each unique section identifier having an accessible tag, allow an access restriction setting to be configured for the corresponding section, and provide navigation instructions to the plurality of motorized transport units based on access restriction settings of each section of the shopping space stored in the store map database.

In accordance with some embodiments, further details are now provided for one or more of these and other features. For example, generally speaking, pursuant to various embodiments, systems, apparatuses, processes and methods are provided herein that enable a motorized transport unit 102 to cooperate with a movable item container 104 and drive or otherwise move the item container through at least portions of the shopping facility, and in some instances outside of the shopping facility.

Referring back to FIGS. 3A-3B, in some embodiments, the motorized transport unit 202 is configured to cooperate with and lift at least a portion of the movable item container 104. The motorized transport unit 202 positions itself and/or receives routing information from the central computer system relative to the movable item container, and in some instances moves at least partially under the movable item container or an extended support with which the motorized transport unit can couple.

In some embodiments, the central computer system utilizes sensor data (e.g., video camera information, RFID information of a movable item container, one or more radio beacons (e.g., WiFi, Bluetooth, RF, etc.) at known positions throughout the shopping facility, light sources (e.g., LEDs) that emit identifier information, location identifiers (e.g., barcodes), and the like) to identify a location of a movable item container and/or one or more motorized transport units. The location information may be received directly from a detector, from one or more sensors on the movable item container, sensor data from one or more motorized transport units, other sources, or combination of such sources. Based on the detected location of the movable item container and a motorized transport unit, the central computer system can route a motorized transport unit to the location of the movable item container.

Once proximate the movable item container, the motorized transport unit then moves to a predefined location and/or orientation relative to the movable item container where the motorized transport unit can lift at least a portion of the movable item contain. In some instances, the central computer system continues to track sensor data and communicates routing information to the motorized transport unit to cause the motorized transport unit to move to the predefined location. Additionally or alternatively, the motorized transport unit may utilize its own internal sensors in positioning and/or orienting itself relative to the movable item container. For example, in some embodiments, the central computer system routes the motorized transport unit to a location proximate the movable item container. Once positioned proximate the movable item container, the motorized transport unit autonomously moves itself into position, based on sensor data (e.g., distance measurement sensor/s, camera/s, image processing, RFID scanner/s, barcode reader/s, light ID detector/s, antenna/s, directional antenna/s, other such sensors, or typically a combination of two or more of such sensors and/or sensor data). Furthermore, the central computer system may communicate sensor data to the motorized transport unit that can be used by the motorized transport unit in addition to local sensor data in orienting and positioning itself relative to the movable item container.

Figure 17:
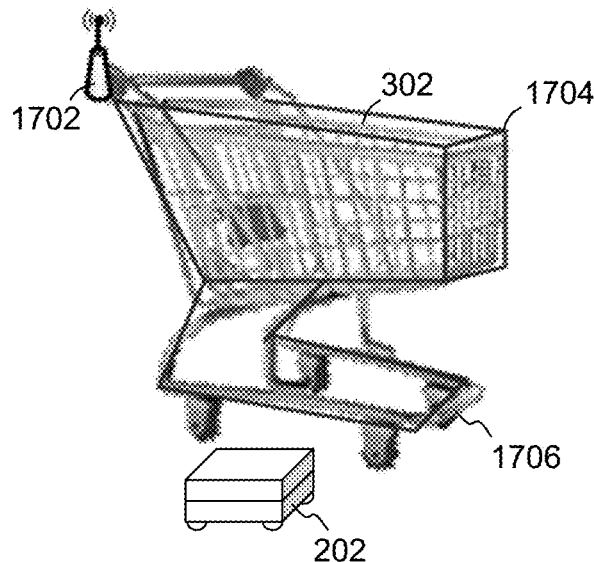
FIG. 17 illustrates some embodiments of a motorized transport unit positioned proximate a movable item container.

FIG. 17 illustrates some embodiments of a motorized transport unit 202 positioned proximate a movable item container. The movable item container may include an RFID transmitter 1702 or other such transmitter that can be detected by the motorized transport unit and/or the central computer system to obtain an identifier of the movable item container, and/or may be used in part to determine a location of the movable item container. Utilizing one or more sensors (e.g., camera/s, distance sensor/s, other such sensors, or a combination of two or more of such sensors), the motorized transport unit, once positioned proximate the movable item container, may recognize a shape of the movable item container (e.g., a virtual modeled shape 1704 that corresponds to a reference model) and based on the shape (e.g., a difference between the orientation of the detected modeled shape relative to a reference shape, such as differences in lengths, angles, etc.) can identify an orientation of the motorized transport unit relative to the movable item container. For example, the motorized transport unit can recognize the movable item container and its relative orientation based on angles and/or rotation of the model. Additionally or alternatively, some embodiments may recognize one or more key features of the movable item container. For example, the motorized transport unit may, based on the detected model, identify a frame 1706, base, or the like, and/or a specific aspect of the frame (e.g., a front bar of the frame) and its orientation relative to that key feature.

Utilizing the determined relative position and/or orientation, the motorized transport unit can move itself into a desired position relative to the movable item container. Typically, during movement, the motorized transport unit can continue to use sensor data (e.g., distance measurements, video and/or image data, etc.) to continue to track its position relative to the movable item container and its orientation relative to a desired positioning and orientation relative to the movable item container to allow cooperation between the motorized transport unit and the movable item container.

Figure 18:
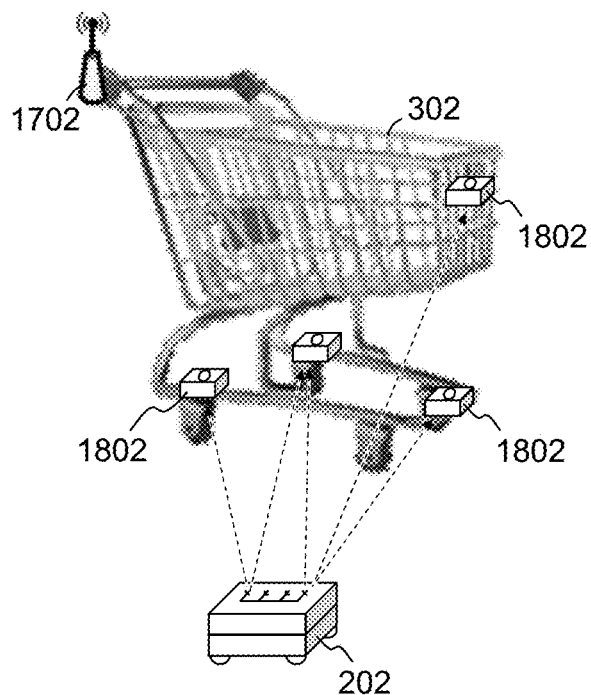
FIG. 18 illustrates some embodiments of a motorized transport unit positioned proximate a movable item container that includes one or more tags.

FIG. 18 illustrates some embodiments of a motorized transport unit 202 positioned proximate a movable item container 302 that includes one or more tags 1802, beacons or the like (e.g., RFID tag, radio beacon, distance tags providing distance information, etc.) placed at predefined locations on the movable item container. The proximity depends on the signal strength of the tags, interference, and other such factors. Again, the central computer system may provide routing instructions to guide the motorized transport unit through one or more portions of the shopping facility to a location proximate the movable item container (e.g., within a predefined threshold distance where it has been determined the motorized transport unit can accurately detect the tags). In some embodiments, the motorized transport unit wirelessly receives positioning route instructions from the central computer system. Based on the route instructions, the control circuit of the motorized transport unit can activate the motorized wheel system to move the motorized transport unit through at least a portion of the shopping facility and to position the motorized transport unit, in accordance with the positioning route instructions, proximate the movable item container such that the one or more wireless tag sensors are capable of sensing at least one of the wireless tags on the item container.

The motorized transport unit can then utilize one or more sensors (e.g., camera/s, distance sensor/s, antenna/s, directional antenna/s, other such sensors, or a combination of two or more of such sensors) to detect and/or recognize the movable item container and/or determine a relative position and/or orientation of the movable item container relative to a position and/or orientation of the motorized transport unit. In some embodiments, the motorized transport unit utilizes one or more tag sensors, directional antennas or the like to detect and locate the one or more tags 1802 (e.g., determine distance and angle of tags relative to a position and orientation of the motorized transport unit). Based on the predefined location of the tags on the movable item container, the motorized transport unit can use the determined location and orientation of the movable item container relative to the motorized transport unit as the motorized transport unit moves into a desired position relative to the movable item container so that the motorized transport unit can cooperate with and lift at least a portion of the movable item container. For example, based on the detected tags, the motorized transport unit can apply triangulation relative to the multiple tags to determine a precise location of the motorized transport unit relative to the movable item container.

Again, the location information determined from the tags may be utilized in combination with other sensor data, such as distance measurement data, image processing data and other such information. The number of tags can vary depending on one or more factors, such as but not limited to size of the movable item container, precision of the sensors of the motorized transport unit, input from the central computer system (e.g., movement and/or routing instructions, sensor data, etc.), and other such factors. In some implementations, for example, the movable item container may include three or more tags 1802 that allow the motorized transport unit and/or the central computer system to determine positioning and/or orientation of the motorized transport unit relative to the movable item container as the motorized transport unit moved into a desired position. As a specific example, in some applications four tags are secured in predefined locations on the movable item container, where three tags can be used for horizontal positioning and/or orientation while the fourth can be used for vertical positioning. Typically, the tags have unique identifiers that allow the motorized transport unit and/or the central computer system to distinguish between the tags. In some implementations, the orientation is utilized to accurately orient the motorized transport unit relative to the movable item container, such as to accurately position one or more item container coupling structures 422.

Further, in some implementations, one or more sensors of the motorized transport unit may be overridden and/or ignored. For example, a bump sensor may be ignored as the motorized transport unit moves into position relative to the movable item container. Similarly, in some instances the motorized transport unit may intentionally bump one or more parts of the movable item container (e.g., the wheels) as part of a positioning process. As such, the bump sensor may be used not as a warning but as a confirmation.

Figure 19:
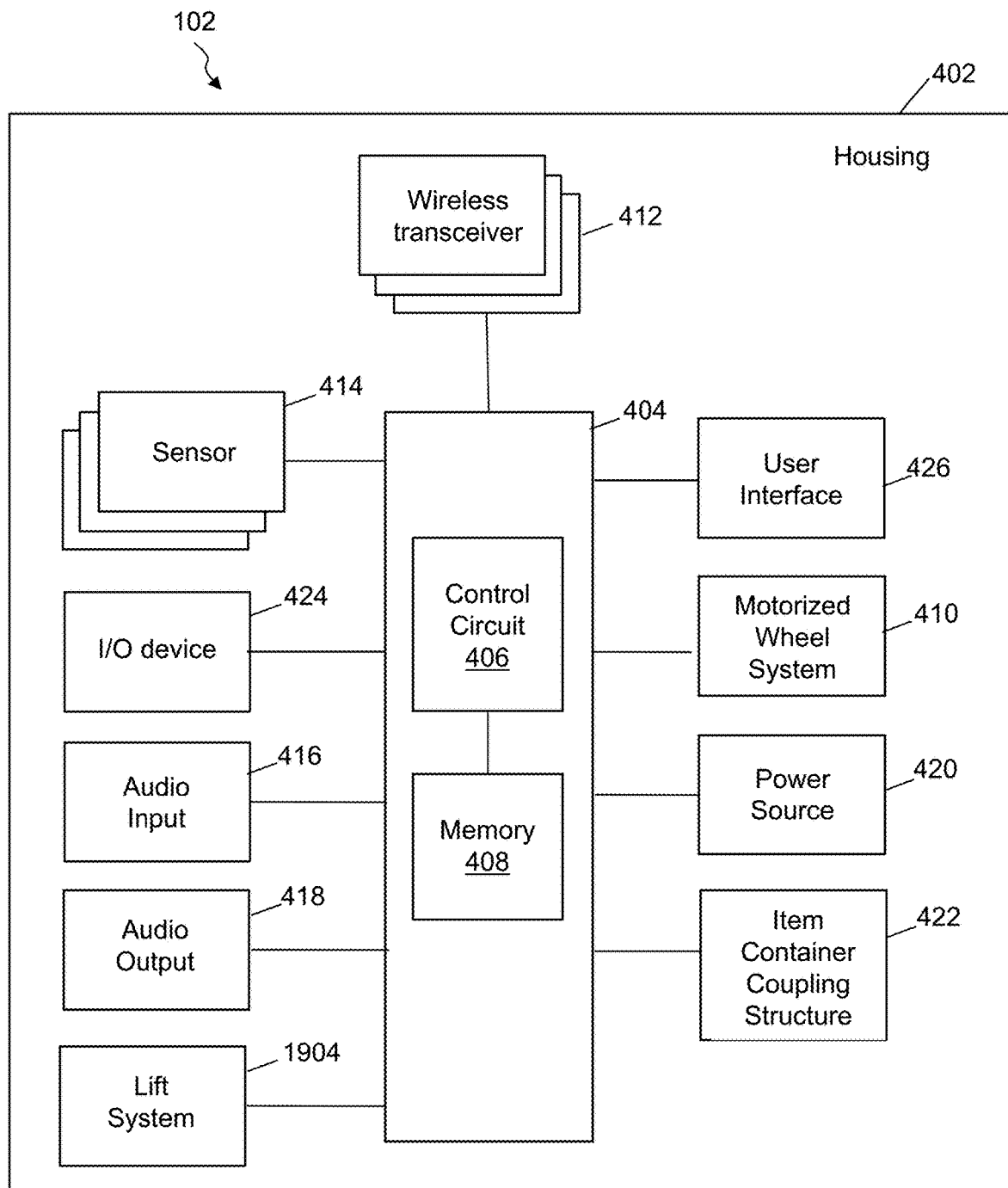
FIG. 19 illustrates an example of the motorized transport unit of FIG. 1, in accordance with some embodiments.

FIG. 19 illustrates an example of the motorized transport unit 102 of FIG. 1, in accordance with some embodiments. In this example, the motorized transport unit 102 has a housing 402 that contains (partially or fully) or at least supports and carries a number of components. These components can include a control unit 404 comprising a control circuit 406 that, like the control circuit 108 of the central computer system 106, controls the general operations of the motorized transport unit 102, and memory 408, and can include one or more of a motorized wheel system 410, wireless transceiver 412, on-board sensors 414, audio input 416, audio output 418, rechargeable power source 420, movable item container coupling structure 422, input/output (I/O) device 424, user interface 426, other such components, and typically a combination of two or more of such components.

As described above, the sensors 414 may include one or more wireless tag sensors, antennas and/or other such sensors to detect the tags 1802 cooperated with movable item container. The tag sensors couple with the control circuit such that the control circuit receives from the one or more tag sensors location information. In some implementations, the tag location information, which is typically wirelessly detected from multiple different wireless tags positioned at different positions on the movable item container, can include and/or be used to determine location and/or orientation information of the tags 1802 relative to a location of the motorized transport unit. This location information allows the control circuit 406 to identify a location and orientation of the item container relative to the motorized transport unit.

In some embodiments, the motorized transport unit further includes one or more lift systems 1904. The lift system is configured to lift a portion of the motorized transport unit. For example, in some embodiments, the lift system is cooperated with the one or more item container coupling structures 422, which lift at least the one or more item container coupling structures. When the item container coupling structures are cooperated with the movable item container, the lifting can be transferred to the movable item container to cause at least a portion of the movable item container to be lifted. Additionally or alternatively, in some embodiments, the motorized transport unit includes a frame structure with at least two frame and/or housing sections that are movable relative to each other. The lift system can couple between the two frame sections such that when activated can cause the two frame sections to at least move toward or away from each other. The control circuit 406 controls the one or more lift systems 1904. Typically, when the lift system is operated to move the frame sections toward each other the motorized transport unit is in a low profile or retracted state, and when operated to move the two frame sections away from each other the motorized transport unit is in high profile or extended state such that a height of at least a portion of the motorized transport unit is greater in the extended state than in the retracted state (e.g., see FIGS. 3A-3B).

In some embodiments, the control circuit activates the lift system to configure the motorized transport unit into the retracted state retracting the two frame sections. This can allow the control circuit to control the motorized wheel system to move the motorized transport unit in position underneath a portion of the movable item container. The motorized wheel system 410 can be activate and controlled while continuing to monitor location information (e.g., using distance sensor data, tag location data, image processing, information from the central computer system, and/or other such information) to position the motorized transport unit under the movable item container and aligned, based on the location information, relative to a frame of the movable item container.

Once the motorized transport unit is in position (e.g., using sensors, antennas, image processing, etc.), the control circuit can activate the one or more lift systems 1904 to transition to the extended state to lift on the frame 1706 of the movable item container lifting a first portion of the item container. In some embodiments, the lifting on the frame 1706 lifts a portion of the movable item container such that one or more wheels 306 of the item container are lifted off of the floor while two or more other wheels 306 of the item container remain in contact with the floor. For example, a front portion 304 of the movable item container can be lifted off of the ground by the motorized transport unit, including lifting the front wheels off the ground. The back or rear wheels 306 of the movable item container can remain on the ground. In this orientation, the motorized transport unit 202 is able to drive the movable item container through the shopping facility. Again, in these embodiments, the motorized transport unit does not bear the weight of the entire movable item container since the rear wheels 306 rest on the floor. Further, the motorized transport unit takes advantage of the rear wheels continued contact with the floor to maintain an enhanced stability and reduces the potential of tipping. The control circuit is configured to activate the motorized wheel system, in accordance with shopping route instructions received from the central computer system, to drive the item container through the shopping facility along a shopping route while the two or more wheels of the item container continue to be in contact with the floor and supporting a portion of the weight of the item container and products placed into the item container. The lift force provided by the lift system can depend on expected weight and/or load of the movable item container and the weight of the products expected to be placed into the movable item container.

The lift system 1904 can be configured with one or more lifting devices and/or systems. In some instances, the lift system includes a lift system control circuit that receives instructions from the motorized transport unit control circuit 406 and controls the one or more lifting devices. In other instances, the motorized transport unit control circuit directly controls the lifting devices. The lifting devices extend and retract the two frame and/or housing sections, one or more item container coupling structures 422, or other portion of the motorized transport unit that cooperates with the movable item container. The one or more lifting devices can include one or more hydraulic lifts, screw drives, servo-electric motors, linear servo-electric motors, or other such lifting devices or a combination of two or more of such lifting devices.

In some embodiments, the lift system comprises a plurality of hydraulic lifts that are spaced relative to each other and upon activation lift the one or more wheels 306 of the item container off of the floor. For example, the lift system may include four hydraulic lift devices, which may be positioned to correspond to each of one of the wheels of the motorized wheel system, and can be cooperatively or independently activated. The motorized transport unit can include a body or housing having a top portion and a bottom portion. In some implementations, the hydraulic lifts cooperate with at least the top portion such that when activated cause the top portion to lift relative to the bottom portion and lift the first portion of the item container.

Some applications cooperate the one or more hydraulic lift systems or other such lift systems with a track, rail, guide, groove, rod, or the like that allows a portion of the motorized transport unit (e.g., a lower portion) to rotate relative to another portion (e.g., upper portion). The lifting devices alternatively cooperated with hinges, pivots, gearing and/or other such features that allow at least some lateral movement. In other implementations, a one or more screw drives are utilized to provide the lifting force. For example, a single centrally positioned screw drive can be utilized that causes a lower portion of the motorized transport unit to spin relative to an upper portion of the motorized transport unit. Alternatively or additionally, the frame and/or housing may include an upper portion and a lower portion with cooperative threading allowing extension and retraction between the upper and lower portions as the lower portion rotates relative to the upper portion.

Figure 20:
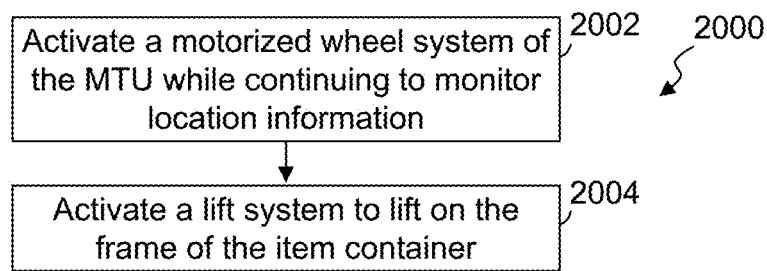
FIG. 20 illustrates a simplified flow diagram of an exemplary process of cooperating a motorized transport unit with a movable item contain such that the motorized transport unit can drive the movable item container through a shopping facility and providing customer assistance.

FIG. 20 illustrates a simplified flow diagram of an exemplary process 2000 of cooperating a motorized transport unit with a movable item contain such that the motorized transport unit can drive the movable item container through a shopping facility and providing customer assistance. In step 2002, a motorized wheel system of a motorized transport unit is activated by a control circuit. The control circuit, while activating the motorized wheel system, typically further continues to monitor location information to position the motorized transport unit under a movable item container, and aligns the motorized transport unit, based on the location information, relative to a frame of the item container. Typically, the item container is one of a plurality of movable item containers that are usable by customers and configured to be moved by customers through the shopping facility. In step 2004, a lift system is activated to lift on the frame of the item container lifting a first portion of the item container such one or more wheels of the item container are lifted off of a floor while two or more other wheels of the item container remain in contact with the floor.

Figure 21A:
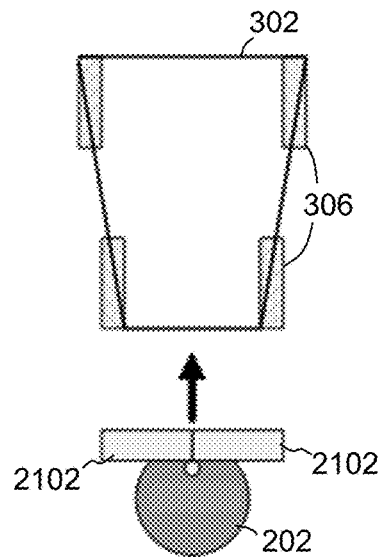
FIGS. 21A, 21B and 21C illustrate some embodiments of a motorized transport unit detachably engaging a movable item container embodied as a shopping cart.
Figure 21B:
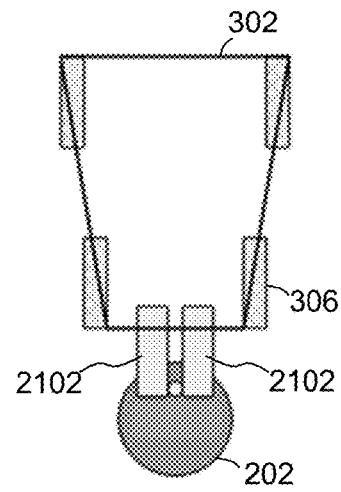
Figure 21C:
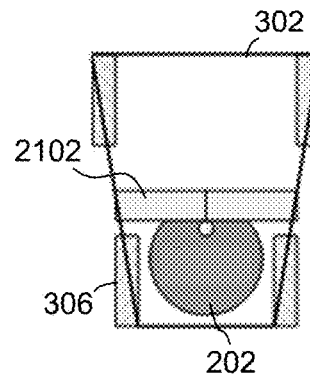

FIGS. 21A, 21B and 21C illustrate some embodiments of a motorized transport unit 202 detachably engaging a movable item container embodied as a shopping cart 302. In FIG. 3A, the motorized transport unit 202 is located proximate the movable item container with one or more arms 2102, levers, extensions or the like in a first, engagement or extended position. When in the engagement position, the arms are configured to cooperate with a base, frame 1706 or other portion of the movable item container. For example, a pair of arms may be configured with lengths sufficient to allow each arm to contact a portion of the frame (e.g., cooperatively span a distance across the frame). In some instances, the width of the motorized transport unit when the arms are in the engagement position is such that the motorized transport unit cannot get between the wheels 306 of the movable item container or can be difficult to maneuver between the wheels 306. Accordingly, as illustrated in FIG. 21B, the arms may be rotated, retracted or otherwise moved to a second, aligned or narrowed position. In the aligned position, the motorized transport unit has a narrower width allowing the motorized transport unit to more readily move between the wheels 306 of the movable item container. In some embodiments, one or more motors and/or gearing are cooperated with the arms to implement the rotation of the arms. FIGS. 21A-21C illustrate the motorized transport unit moving in under the movable item container from a first direction (e.g., front of the cart), however, it will be appreciated by those skilled in the art that the motorized transport unit can move in from any direction that provides sufficient clearance (horizontally, such as between the wheels; and vertically).

Once the motorized transport unit 202 is in position (e.g., using sensors), as illustrated in FIG. 21C, the arms can be moved back to the engagement position to allow the arms to engage parts of the frame 1706 of the movable item container. The arms can provide added support and stability when lifting at least a portion of the movable item container. In some implementations, the motorized transport unit may position itself relative to the movable item container such that the arms are adjacent to the front wheels, and potentially utilize the front wheels as a point of engagement. For example, the arms may rest against and push against the wheels or wheel housing as the motorized transport unit drives the movable item container through the shopping facility. Some applications further position the arms relative to the motorized transport unit such that the weight of the movable item container supported by the motorized transport unit is approximately centered on the motorized transport unit and/or allowing relatively balanced distribution of the weight across the wheels of the motorized transport unit.

One or more of the item container coupling structures 422 may be included on each arm 2102 allowing the item container coupling structures to be secured with the frame or corresponding coupling structures on the movable item containers. The item container coupling structure may be positioned on an end of each arm, and/or one or more item container coupling structures may be implemented at one or more locations along a length of each arm. In some embodiments, the one or more arms are rotatably cooperated with a body of the motorized transport unit, with at least one actuatable clamp positioned on each of the arms such that the arms are rotated to position the clamps relative to the frame of the item container. Additionally or alternatively, one or more item container coupling structures may be included on the housing of the motorized transport unit and/or cooperated with a frame of the motorized transport unit.

The arms are constructed of a strong, durable material, such as steel, stainless steel, other relevant alloy, or other material that is configured to support the expected weight of the movable item container and items placed into the movable item container. Cushioning may be included along some or all of the length of the arms, e.g., a rubberized or plastic coating. This cushioning can provide a soft contact between the motorized transport unit and the movable item container, limit a transfer of bumps from the motorized transport unit to the movable item container, limit potential damage to the frame of the movable item container and/or to the motorized transport unit, and the like. In some implementations, the arms may be configured to flex based on an expected weight to be supported, and/or be cooperated with the motorized transport unit with one or more springs or flexing members that provide cushioning.

The lift system 1904 may directly cooperate with the arms 2102, such that the lift system causes the arms to elevate and lift the movable item container. In other instances, however, the arms are elevated as a portion of the motorized transport unit lifts. The arms may further be configured to accommodate misalignment and/or damage to the frame of the movable item container and/or the arm. For example, the arms may be configured to extend beyond the frame or other movable item container intended to be picked up.

The item container coupling structures 422 can be substantially any relevant coupling structure that can cooperate the motorized transport unit with the movable item container. For example, the item container coupling structures may include one or more clamps, hooks, latches, posts, recesses, and other such coupling structures. Some implementations include one or more actuatable clamps controlled by the control circuit. The control circuit, in response to positioning the motorized transport unit under the item container and aligned relative to the frame of the item container, can activate the clamps to engage and removably clamp to the frame of the item container and temporarily secure the motorized transport unit with the item container.

Further, the item container coupling structures and/or the arms can be configured to accommodate slight variations between the frame of the movable item container and positioning of the motorized transport unit when trying to cooperate with the movable item container and motorized transport unit (e.g., carts may vary, for example, because of being damaged and the like). In some instances, the coupling structure and/or movable item container may include one or more guides or other such structure to help achieve desired alignment of the coupling structure and the part of the movable item container that is being secured (e.g., lateral bar of the frame). Additionally, the item container coupling structure may be configured to move horizontally and/or vertically relative to the motorized transport unit to allow for alignment. The arms may also be configured to provide for slight variations (e.g., may be able to extend or retract at least a small distance) to allow for easier cooperation. Further, the lift system may lift one side of the motorized transport unit and/or an arm higher than the other to achieve a cooperation of the coupling structure with the movable item container. Some embodiments include coupling structure sensors to ensure the coupling structures have achieved a secure cooperation with the movable item container.

In some embodiments, the sensors 414 may include one or more traction and/or slip sensors. For example, a traction sensor may be cooperated with one or more of the wheels and/or axles of the motorized transport unit and can detect and/or index the rotation of one or more wheels and/or axles of the wheels. As such, in some instances, the control circuit and/or the motorized wheel system can receive traction sensor data that may indicate a reduction in traction of one or more wheels of the motorized wheel system (e.g., can detect when a wheel is moving faster than expected). In some instances, the control circuit and/or the motorized wheel system can detect a reduction or lack of traction relative to one or more wheels based on the rate of rotation of the wheel relative to the rate of rotation of one or more other wheel (e.g., rate of rotation is different by a threshold amount).

The control circuit can be configured to take corrective action in response to a detection of a reduction or loss of traction. In some implementations, the one or more traction sensors cooperate with the motorized wheel system and are configured to detect a reduction in traction of one or more wheels of the motorized wheel system. In some embodiments, the control circuit is configured to activate one or more of the lift systems 1904 to adjust a lift height of one side or quadrant of the item container 302 relative to the one or more wheels of the motorized transport unit corresponding to the detected reduction in traction. The change in height can increase weight on the one or more wheels relative to other wheels of the motorized wheel system, which may overcome the reduction in traction. For example, some embodiments include one or more traction sensors cooperated with the motorized wheel system and configured to detect a reduction in traction of one or more wheels of the motorized wheel system. The control circuit is coupled with the one or more traction sensors, and further configured to activate the lift system to adjust a lift height of one side of the item container relative to the one or more wheels corresponding to the detected reduction in traction to increase weight on the one or more wheels relative to other wheels of the motorized wheel system.

Additionally or alternatively, the motorized wheel system can be controlled to slow down or speed up one or more wheels in attempts to enhance traction of the one or more wheels or others of the one or more wheels. Still further, one or more notifications can be communicated to the central computer system and/or to a customer or other user (e.g., through a communication to a corresponding user interface unit, a display on the movable item container, lights and/or sounds from the motorized transport unit and/or the movable item container, other such notification, or combinations of two or more of such notifications).

Similarly, the lift system may be used to balance the weight of the movable item container (and items placed in the item container). For example, one or more lifting devices can be activated to elevate one side or the other in attempts to help balance the weight. Some embodiments may include weight detectors and/or level detectors that can detect an imbalance of weight. Accordingly, the lift system can activate one or more lifting devices in attempts to at least partially compensate for the imbalance.

In some embodiments, the motorized transport unit does not lift any portion of the movable item container. Instead, the motorized transport unit can position itself relative to the movable item container and activate the one or more item container coupling structures to secure the motorized transport unit with the item container. The motorized transport unit can then drive and/or tow the movable item container. Some applications position the motorized transport unit near or at the front of the movable item container while still providing the front wheels with clearance to freely rotate and/or swing (e.g., in some instances swing 360°). The lift system may still be used, without intent to fully lift a portion of the movable item container off the floor. Instead, the lift system can be activated to increase pressure on wheels of the movable item container and allow the movable item container to achieve more traction. Further sensors can be used (e.g., pull sensors, skid sensors, traction sensor, etc.) to identify when to increase pressure on the motorized transport unit, which can trigger one or more lifting devices to increase a lift force, but not lifting the movable item container. Further, one or more sensor (e.g., distance sensors, range sensor, tilt sensors, other such sensors, or combination of two or more of such sensors) can be employed to prevent the lift system from lifting too high and lifting one or both of the front wheels 306 of the movable item container off the floor.

It can be difficult for the motorized transport unit to separate two movable item containers (e.g., shopping carts 302) when they have been forced or "seated" together. Accordingly, some embodiments utilize one or more seating blocks, bumpers, stops, or other devices to limit how compressed together the movable item containers can be.

Figure 22A:
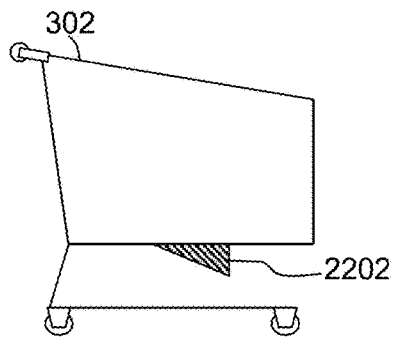
FIG. 22A illustrates an exemplary movable item container, embodied as shopping carts, with a seating block, in accordance with some embodiments.
Figure 22B:
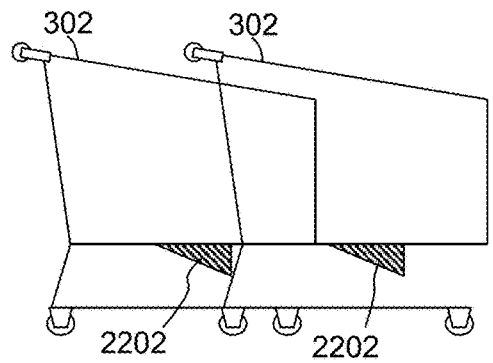
FIG. 22B illustrates some embodiments of two seated movable item containers, embodied as shopping carts.

FIG. 22A illustrates an exemplary movable item container, embodied as shopping carts 302, with a seating block 2202, in accordance with some embodiments. FIG. 22B illustrates some embodiments of two seated movable item containers, embodied as shopping carts 302. The shopping carts 302 further include seating blocks 2202. The seating blocks are positioned on the shopping carts to limit how closely two or more shopping carts can be positioned relative to each other and/or seated. Because the carts cannot be forced together too tightly, the motorized transport unit typically has sufficient power and traction to separate two seated carts. Still further, in some instances, the seating blocks maintain a distance between carts to allow the motorized transport unit to move underneath a front most cart, cooperate with the cart and move the cart away from the other one or more carts with which it is seated. This may include providing sufficient room to allow the motorized transport unit to move in under the shopping cart from the side of the cart.

In some embodiments, systems, apparatuses and methods are provided herein useful to provide customer assistance. In some embodiments, a motorized transport unit providing customer assistance at a shopping facility, comprises: a transceiver configured to wirelessly receive communications from a remote central computer system; a control circuit coupled with the transceiver; a motorized wheel system controlled by the control circuit; a lift system controlled by the control circuit; and a memory coupled to the control circuit and storing computer instructions that when executed by the control circuit cause the control circuit to: activate the motorized wheel system, while continuing to monitor location information, to position the motorized transport unit under the item container and aligned, based on the location information, relative to a frame of the item container, wherein the item container is one of a plurality of item containers that are usable by customers and configured to be moved by customers through the shopping facility; and activate the lift system to lift on the frame of the item container lifting a first portion of the item container such one or more wheels of the item container are lifted off of a floor while two or more other wheels of the item container remain in contact with the floor.

In some embodiments, the control circuit is further configured to activate the motorized wheel system, in accordance with shopping route instructions received from the central computer system, to drive the item container through the shopping facility along a shopping route while the two or more other wheels of the item container continue to be in contact with the floor and supporting a portion of the weight of the item container and products placed into the item container. In some embodiments, the motorized transport unit further comprises: actuatable clamps controlled by the control circuit; and wherein the control circuit, in response to positioning the motorized transport unit under the item container and aligned relative to the frame of the item container, is further configured to activate the clamps to engage and removably clamp to the frame of the item container and temporarily secure the motorized transport unit with the item container. In some embodiments, the motorized transport unit further comprises: one or more wireless tag sensors coupled with the control circuit; wherein the control circuit is further configured to receive, from the one or more tag sensors, the location information comprising tag location information wirelessly detected from multiple different wireless tags positioned at different positions on the item container, and to identify a location and orientation of the item container relative to the motorized transport unit based on the tag location information detected by the one or more wireless tag sensors. In some embodiments, the control circuit is further configured to: wirelessly receive positioning route instructions from the central computer system; and activate the motorized wheel system to move the motorized transport unit through at least a portion of the shopping facility and to position the motorized transport unit, in accordance with the positioning route instructions, proximate the movable item container such that the one or more tag sensors are capable of sensing at least one of the wireless tags on the item container. In some embodiments, the motorized transport unit further comprises: one or more traction sensors cooperated with the motorized wheel system and configured to detect a reduction in traction of one or more wheels of the motorized wheel system; wherein the control circuit is coupled with the one or more traction sensors, and further configured to activate the lift system to adjust a lift height of one side of the item container relative to the one or more wheels corresponding to the detected reduction in traction to increase weight on the one or more wheels relative to other wheels of the motorized wheel system. In some embodiments, the lift system comprises a plurality of hydraulic lifts that are spaced relative to each other and upon activation lift the one or more wheels of the item container off of the floor. In some embodiments, the motorized transport unit further comprises: a body having a top portion and a bottom portion; wherein the hydraulic lifts cooperate with at least the top portion such that when activated cause the top portion to lift relative to the bottom portion and lifting the first portion of the item container. In some embodiments, the motorized transport unit further comprises: a pair of arms that are rotatably cooperated with a body of the motorized transport unit; wherein at least one of the actuatable clamps is positioned on each of the arms such that the arm are rotated to position the clamps relative to the frame of the item container.

In some embodiments, a method of providing customer assistance at a shopping facility, comprises: by a control circuit: activating a motorized wheel system of a motorized transport unit, while continuing to monitor location information, to position the motorized transport unit under the item container and aligned, based on the location information, relative to a frame of the item container, wherein the item container is one of a plurality of item containers that are usable by customers and configured to be moved by customers through a shopping facility; activating a lift system to lift on the frame of the item container lifting a first portion of the item container such that one or more wheels of the item container are lifted off of a floor while two or more other wheels of the item container remain in contact with the floor.

In some embodiments, the method further comprises: activating the motorized wheel system, in accordance with shopping route instructions received from the central computer system, to drive the item container through the shopping facility along a shopping route while the two or more other wheels of the item container continue to be in contact with the floor and supporting a portion of the weight of the item container and products placed into the item container. In some embodiments, the method further comprises: activating, in response to positioning the motorized transport unit under the item container and aligned relative to the frame of the item container, actuatable clamps to engage and removably clamp to the frame of the item container and temporarily secure the motorized transport unit with the item container. In some embodiments, the method further comprises: receiving, from one or more wireless tag sensors of the motorized transport unit, the location information comprising tag location information wirelessly detected from multiple different wireless tags positioned at different positions on the item container; and identifying a location and orientation of the item container relative to the motorized transport unit based on the tag location information detected by the one or more wireless tag sensors. In some embodiments, the method further comprises: wirelessly receiving positioning route instructions from the central computer system; and activating the motorized wheel system to move the motorized transport unit through at least a portion of the shopping facility and to position the motorized transport unit, in accordance with the positioning route instructions, proximate the movable item container such that the one or more tag sensors are capable of sensing at least one of the wireless tags on the item container. In some embodiments, the method further comprises: receiving, from one or more traction sensors cooperated with the motorized wheel system, traction sensor data indicating a reduction in traction of one or more wheels of the motorized wheel system; activating the lift system to adjust a lift height of one side of the item container relative to the one or more wheels corresponding to the detected reduction in traction to increase weight on the one or more wheels relative to other wheels of the motorized wheel system. In some embodiments, the activating the lift system comprises activating each of a plurality of hydraulic lifts that are spaced relative to each other to cause, upon activation, the lifting the one or more wheels of the item container off of the floor. In some embodiments, the lift system is cooperated with a top portion of a body of the motorized transport unit; and wherein the activating the hydraulic lifts comprises lifting a top portion of the motorized transport unit relative to a bottom portion and lifting the first portion of the item container. In some embodiments, the method further comprises: rotating a pair of arms that are rotatably cooperated with a body of the motorized transport unit, wherein the at least one claim is positioned on each of the arms; and positioning the clamp, based on the rotation of the arms, relative to the frame; wherein the activating the clamps comprises activating the clamps when rotated into position relative to the frame of the item container through the rotation of the arms.

In some embodiments, a motorized transport unit providing customer assistance at a shopping facility, comprises: a transceiver configured to wirelessly receive communications from a remote central computer system; a control circuit coupled with the transceiver; a motorized wheel system controlled by the control circuit; a lift system controlled by the control circuit; and a memory coupled to the control circuit and storing computer instructions that when executed by the control circuit cause the control circuit to: activate the motorized wheel system, while continuing to monitor location information, to position the motorized transport unit under the item container and aligned, based on the location information, relative to a frame of the item container, wherein the item container is one of a plurality of item containers that are usable by customers and configured to be moved by customers through the shopping facility; and activate the lift system to lift on the frame of the item container lifting a first portion of the item container such one or more wheels of the item container are lifted off of a floor while two or more other wheels of the item container remain in contact with the floor.

In some embodiments, a method of providing customer assistance at a shopping facility, comprises: by a control circuit: activating a motorized wheel system of a motorized transport unit, while continuing to monitor location information, to position the motorized transport unit under the item container and aligned, based on the location information, relative to a frame of the item container, wherein the item container is one of a plurality of item containers that are usable by customers and configured to be moved by customers through a shopping facility; activating a lift system to lift on the frame of the item container lifting a first portion of the item container such that one or more wheels of the item container are lifted off of a floor while two or more other wheels of the item container remain in contact with the floor.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A retail facility assistance system comprising:
   a plurality of motorized transport units located in and configured to move through a retail facility space; and
   a central computer system comprising a network interface, wherein the central computer system is configured to:
      wirelessly communicate through the network interface with the plurality of motorized transport units and with a plurality of user devices, wherein each of the plurality of user devices is associated with a different user of a plurality of users; and
      temporarily associate each of the plurality of motorized transport units with at least one of the plurality of user devices;
   wherein control of movement of a respective one of the plurality of motorized transport units through the retail facility space is based at least in part on an input from the respective user device that is temporarily associated with the respective motorized transport unit.

2. The system of claim 1, wherein at least a first motorized transport unit of the plurality of motorized transport units is configured to detachably connect to a movable item container, and the first motorized transport unit is configured to move the movable item container through the retail facility space in supporting a first user associated with a respective first user device temporarily associated with the first motorized transport unit.

3. The system of claim 2, wherein the first motorized transport unit is configured to move to a position underneath the movable item container and extend a portion of the first motorized transport unit upward to engage the movable item container and lift a portion of the movable item container.

4. The system of claim 2, wherein the plurality of user devices comprise one or both of at least one retail facility provided unit and a user's mobile electronic device.

5. The system of claim 1, wherein the system further comprises:
   a location control unit;
   wherein each of the plurality of motorized transport units comprises at least one light receiver; and
   wherein the location control unit is configured to determine a location of at least a first motorized transport unit, of the plurality of motorized transport units, in the retail facility space based at least on information obtained from light detected by the at least one light receiver of the first motorized transport unit.

6. The system of claim 5, further comprising:
   a plurality of light sources distributed throughout the retail facility space and configured to emit light signals encoding the information comprising a light source identifier.

7. The system of claim 1, wherein each of the plurality of motorized transport units comprises a distance measurement unit configured to detect a distance between the respective motorized transport unit and objects surrounding the respective motorized transport unit.

8. The system of claim 7, wherein the central computer system is configured to control the movement of a first motorized transport unit of the plurality of transport units to allow the first motorized transport unit to do at least one of follow a first user of the plurality of users through the retail facility space and lead the first user through the retail facility space while the first motorized transport unit is temporarily associated with a first device, of the plurality of user devices, that is associated with the first user.

9. The system of claim 1, wherein the central computer system outputs signals to control movement of at least one of the plurality of motorized transport devices, the signals generated based on one or more of: movement instructions determined by the central computer system; and commands received from a first user device of the plurality of user devices.

10. The system of claim 1, further comprising:
    at least one motorized transport unit storage unit configured to temporarily store one or more of the plurality of motorized transport units and dispense at least one of the one or more motorized transport units.

11. The system of claim 1, wherein the central computer system is configured to automatically generate a travel route of at least one of the plurality of motorized transport units through the retail facility space based on one or more of: a user provided list of items; user selected route preferences; user profile data; and product availability information.

12. The system of claim 1, wherein the central computer system is configured to coordinate communications between a first user associated with a first motorized transport unit and a remote user not located at the retail facility space.

13. The system of claim 1, wherein the central computer system is configured to process a request from a user, of the plurality of users, for a motorized transport unit entered by the user via a user device of the plurality of user devices, determine an available motorized transport unit based on one or more of motorized transport unit location and availability and location of the user.

14. A motorized transport unit to provide retail facility assistance comprising:
    a housing;
    a locomotion system configured to enable movement of the motorized transport unit through a retail facility space;
    a rechargeable power source;
    a wireless transceiver; and
    a control unit coupled to the motorized transport system, the rechargeable power source and the wireless receiver, wherein the control unit is configured to:
       communicate with one or both of a central computer system of a retail facility assistance system and a user device that is temporarily associated with the motorized transport unit, wherein the user device is at least temporarily associated with a user; and
       control movement of the motorized transport unit through the retail facility space based at least on an input from the user device that is temporarily associated with the motorized transport unit.

15. The motorized transport unit of claim 14, further comprising a movable item container connected to the housing.

16. The motorized transport unit of claim 14, wherein the housing comprises a container coupling structure configured to detachably connect to a movable item container, and wherein the motorized transport unit is configured to move the movable item container through the retail facility space while the coupling structure is detachably connected to the movable item container.

17. A method of retail facility assistance comprising:
    communicating, by a central computer system, with one or both of a plurality of motorized transport units and a plurality of user devices, wherein the plurality of motorized transport units are located in and configured to move through a retail facility space and each of the plurality of user devices is associated with a different user of a plurality of users;

temporarily associating each user device, of the plurality of user devices, with a different one of the plurality of motorized transport units; and controlling movement of a first motorized transport unit, of the plurality of motorized transport units, that is temporarily associated with a first user device through the retail facility space based at least on an input from the first user device.

18. The method of claim 17, further comprising:

communicating, by the central computer system, one or more first instructions to cause the first motorized transport unit, to move to a movable item container and to detachably connect to the movable item container; and communicating, by the central computer system, one or more second instructions to cause the first motorized transport unit to move the movable item container through the retail facility space in supporting a first user, of the plurality of users, associated with the first user device temporarily associated with the first motorized transport unit.

19. The method of claim 18, wherein the communicating the one or more second instructions comprises communicating the one or more second instructions causing the first motorized transport unit to move to a position underneath the movable item container and extend a portion of first motorized transport unit upward to engage the movable item container and lift a portion of the movable item container.

20. The method of claim 17, further comprising:

generating, by the central computer system, control signals based on and commands received from the first user device; and wherein the controlling the movement of the first motorized transport unit comprises communicating, by the central computer system, the control signals to control the movement of first motorized transport unit.

\* \* \* \* \*

UNITED STATES PATENT AND TRADEMARK OFFICE
CERTIFICATE OF CORRECTION

| | |
|---|---|
| PATENT NO. | : 11,679,969 B2 |
| APPLICATION NO. | : 17/346954 |
| DATED | : June 20, 2023 |
| INVENTOR(S) | : Donald R. High et al. |

It is certified that error appears in the above-identified patent and that said Letters Patent is hereby corrected as shown below:

On the Title Page

On Page 10, in Item (56), under "Other Publications", in Column 2, Line 15, delete "Univeristy;" and replace with --University;--.

In the Claims

In Column 68, Claim 19, Lines 8-9, delete "of first motorized" and replace with --of the first motorized--.

In Column 68, Claim 20, Line 18, delete "of first motorized" and replace with --of the first motorized--.

Signed and Sealed this
Eleventh Day of June, 2024

Katherine Kelly Vidal
*Director of the United States Patent and Trademark Office*